(12) United States Patent
Tani et al.

(10) Patent No.: US 8,165,083 B2
(45) Date of Patent: Apr. 24, 2012

(54) COMMUNICATION SYSTEM, BASE STATION, AND MOBILE STATION

(75) Inventors: Shigenori Tani, Tokyo (JP); Ryoichi Fujie, Tokyo (JP); Tetsuya Mishuku, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 402 days.

(21) Appl. No.: 12/521,583

(22) PCT Filed: Dec. 27, 2007

(86) PCT No.: PCT/JP2007/075122
§ 371 (c)(1),
(2), (4) Date: Jun. 29, 2009

(87) PCT Pub. No.: WO2008/081865
PCT Pub. Date: Jul. 10, 2008

(65) Prior Publication Data
US 2010/0322187 A1 Dec. 23, 2010

(30) Foreign Application Priority Data
Dec. 28, 2006 (WO) .................. PCT/JP2006/326222

(51) Int. Cl.
*H04W 4/00* (2009.01)
(52) U.S. Cl. ........................................ 370/329; 370/431
(58) Field of Classification Search .......... 370/310–350; 455/422.1–466
See application file for complete search history.

(56) References Cited

U.S. PATENT DOCUMENTS

| 6,388,999 | B1 * | 5/2002 | Gorsuch et al. ............... 370/335 |
| 6,940,831 | B1 | 9/2005 | Omi et al. |
| 6,993,342 | B2 | 1/2006 | Kuchibhotla et al. |
| 2002/0191559 | A1 * | 12/2002 | Chen et al. ..................... 370/329 |
| 2004/0258070 | A1 | 12/2004 | Arima |
| 2005/0025056 | A1 | 2/2005 | Chen et al. |

FOREIGN PATENT DOCUMENTS

| CN | 1794625 A | 6/2006 |
| JP | 64 42945 | 2/1989 |
| JP | 2000 92542 | 3/2000 |
| JP | 2000 224231 | 8/2000 |

(Continued)

OTHER PUBLICATIONS

3GPP TS 36300 v0.1.0, Oct. 2006 (IDS referencce).*
Japanese Office Action issued Jul. 26, 2011, in Patent Application No. 2008-552150 (with English-language translation).

(Continued)

*Primary Examiner* — Hassan Kizou
*Assistant Examiner* — Charles C Jiang
(74) *Attorney, Agent, or Firm* — Oblon, Spivak, McClelland, Maier & Neustadt, L.L.P.

(57) ABSTRACT

A base station divides a packet into a plurality of wireless transfer blocks, determines a priority of a wireless transfer block based on a delivery acknowledged amount accumulated value, allocates wireless resources to the wireless transfer blocks based on determined priority, and transmits generated wireless transfer blocks by using allocated wireless resources. A mobile station transmits a delivery acknowledgement to the base station when the wireless transfer block is properly received and a re-transmission request when the wireless transfer block is not properly received, and reproduces the packet from received wireless transfer blocks.

18 Claims, 21 Drawing Sheets

FOREIGN PATENT DOCUMENTS

| | | |
|---|---|---|
| JP | 2001 103544 | 4/2001 |
| JP | 2001-223716 | 8/2001 |
| JP | 2004 129070 | 4/2004 |
| JP | 2004 147275 | 5/2004 |
| JP | 2005 6293 | 1/2005 |
| JP | 2005 27167 | 1/2005 |
| JP | 2006 525775 | 11/2006 |
| JP | 2007 43681 | 2/2007 |
| JP | 2007-535270 | 11/2007 |
| WO | 2006 073223 | 7/2006 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release x) 3GPP TS 36.300, V0.1.0, pp. 1-4 and 41-42, (2006).

Office Action issued Nov. 30, 2011, in Chinese Patent Application No. 200780048498.7.

* cited by examiner

FIG.15

| WIRELESS COMMUNICATION LINK QUALITY | MODULATION METHOD | ENCODING RATIO | TRANSMISSION POWER |
|---|---|---|---|
| 1 | QPSK | 1/3 | 12 |
| 2 | QPSK | 1/2 | 16 |
| 3 | QPSK | 2/3 | 20 |
| 4 | 16QAM | 1/3 | 20 |
| 5 | 16QAM | 1/2 | 20 |
| 6 | 16QAM | 2/3 | 20 |
| 7 | 64QAM | 1/2 | 20 |

FIG.16

| | | PACKET LENGTH (byte) | | | | | | |
|---|---|---|---|---|---|---|---|---|
| | | 200 | 400 | 600 | 800 | 1000 | 1200 | ... | 1600 |
| WIRELESS COMMUNICATION LINK QUALITY INFORMATION (LARGER→BETTER) | 1 | (2, 2) | (2, 4) | (2, 6) | (2, 8) | (1, 20) | (1, 22) | .. | (1, 32) |
| | 2 | .. | .. | .. | .. | .. | .. | .. | (1, 32) |
| | 3 | .. | .. | .. | .. | .. | .. | .. | (2, 16) |
| | ... | .. | .. | .. | .. | .. | .. | .. | .. |
| | 15 | .. | .. | .. | .. | .. | .. | .. | (5, 6) |
| | 16 | (6, 1) | (6, 1) | (6, 1) | (6, 2) | (5, 3) | (5, 4) | .. | (5, 6) |

FIG.22

| INDEX | SS1 VALUE (%) |
|---|---|
| 0 | NO SEGMENTATION |
| 1 | 0<SS1≦10 |
| 2 | 10<SS1≦20 |
| 3 | 20<SS1≦30 |
| 4 | 30<SS1≦40 |
| 5 | 40<SS1≦50 |
| 6 | 50<SS1≦60 |
| 7 | 60<SS1≦70 |
| 8 | 70<SS1≦80 |
| 9 | 80<SS1≦90 |
| 10 | 90<SS1 |

FIG.23

| INDEX | SS2 VALUE (BYTES) |
|---|---|
| 0 | 0<SS2≦100 |
| 1 | 100<SS2≦200 |
| 2 | 200<SS2≦300 |
| 3 | 300<SS2≦400 |
| 4 | 400<SS2≦500 |
| 5 | 500<SS2≦600 |
| 6 | 600<SS2≦700 |
| 7 | 700<SS2≦800 |
| 8 | 800<SS2≦900 |
| 9 | 900<SS2≦1000 |
| 10 | 1000<SS10≦1100 |
| 11 | 1100<SS11≦1200 |
| 12 | 1200<SS12≦1300 |
| 13 | 1300<SS13≦1400 |
| 14 | 1400<SS14 |

FIG.26

| Generic Name | Parameter | | | |
| --- | --- | --- | --- | --- |
| | Request | Indication | Response | Confirm |
| MAC-DATA | Data, BO, UE-ID type indicator, RLC Entity Info, Segmentation Status | Data, No_TB, TD (Note), Error indication | | |
| MAC-STATUS | | No_PDU, PDU_Size, TX status, Status_Report_REQ | BO, RLC Entity Info | |

NOTE: TDD only.

FIG.27

| Generic Name | Parameter | | |
|---|---|---|---|
| | Request | Indication | Response | Confirm |
| MAC-DATA | Data, BO, UE-ID type indicator, RLC Entity Info | Data, No_TB, TD (Note), Error indication | | |
| MAC-STATUS | | No_PDU, PDU_Size, TX status, Status_Report_REQ | BO, RLC Entity Info, Arrived Packet Size | |

NOTE: TDD only.

COMMUNICATION SYSTEM, BASE STATION, AND MOBILE STATION

TECHNICAL FIELD

The present invention generally relates to a communication system in which a wireless communication link is used and that aims to effectively utilize communication links. The present invention specifically relates to a communication system that realizes the effective utilization of the communication links by reducing the amount of data that is revoked in a data discarding process.

BACKGROUND ART

For example, Patent Document 1 discloses a conventional technique used for effectively utilizing communication links by reducing the amount of data that is revoked in a packet discarding process. According to the conventional communication method described in Patent Document 1, a base station control device generates wireless segments by dividing a received packet into segments each having a length corresponding to the unit of communication used on the wireless communication link. The base station control device then specifies information regarding re-transmission control into the headers of all the generated wireless segments and transmits the wireless segments to a base station. The base station generates predetermined transfer frames (wireless transfer blocks) from the wireless segments that have been received from the base station control device and transmits the generated wireless transfer blocks to a mobile station. Also, the base station determines the number of times of re-transmission of each of the wireless transfer blocks in such a manner that the closer to the end of the packet the wireless segment from which the wireless transfer block has been generated is positioned, the larger is the number of times of re-transmission. In the case where the base station fails to properly receive any one of the wireless transfer blocks within the determined number of times of re-transmission, the base station discontinues re-transmission of such a wireless transfer block and discards the wireless segment corresponding to the wireless transfer block and all the wireless segments following that wireless segment.

In other words, according to the conventional communication method described in Patent Document 1, with respect to a packet in which many of the wireless transfer blocks have already been delivered, the number of times of re-transmission for each of the remaining wireless transfer blocks that have not yet been delivered is specified to be a larger value. As a result, it is possible to lower the possibility of having the transmission of the wireless transfer blocks discontinued due to the number of times of re-transmission exceeding the determined value and the possibility of the mobile station being unable to reproduce the original packet and wasting the wireless transfer blocks that are already acknowledged as having been delivered. Thus, the wireless communication link (frequency) is effectively utilized.

To ensure that a handover is performed between base stations without missing any data, in the case where a packet fails to be delivered between a handover-origin base station and a mobile station, the packet needs to be transmitted again between a handover-destination base station and the mobile station. In this situation, however, if many of the wireless transfer blocks within the packet have already been delivered, transmitting the packet again between the handover-destination base station and the mobile station leads to a problem where the wireless transfer blocks that are already acknowledged as having been delivered are wasted and the wireless communication link (frequency) is thus wasted. In addition, it is also necessary to ensure that the downstream packet that has failed to be delivered is transferred from the handover-origin base station to the handover-destination base station.

For example, Patent Document 2 discloses a conventional technique to solve these problems. According to the technique disclosed in Patent Document 2, the actual execution of a handover is delayed until the reproduction of a packet is completed on the reception side. Thus, it is possible to lower the possibility of having short packets discarded, to prevent degradation of the utilization efficiency of the frequency as much as possible, and to prevent the increase of delays as much as possible. In other words, according to the conventional technique described in Patent Document 2, it is possible to avoid wasting the wireless communication link by executing the handover after the packet has been completed.

Patent Document 1: Japanese Patent Application Laid-open No. 2005-27167

Patent Document 2: Japanese Patent Application Laid-open No. 2000-92542

DISCLOSURE OF INVENTION

Problem to be Solved by the Invention

In wireless communication systems, however, it is not always the case that delivery acknowledgments of wireless transfer blocks for the re-transmission control are made in the order in which the wireless transfer blocks were transmitted. In some situations, there is a possibility that, while a wireless transfer block is being repeatedly re-transmitted, a following wireless transfer block may be acknowledged as having been delivered. Thus, according to the conventional communication method described in Patent Document 1 by which the number of times of re-transmission is determined based on the position of each of the wireless transfer blocks within the packet, a problem still remains where it is not possible to fully achieve the advantageous effect of reducing the possibility of wasting the wireless transfer blocks that have already been transmitted.

Further, there are two possible situations where wireless transfer blocks fail to be delivered to the reception side in a wireless communication system. In one situation, due to re-transmission control, when the number of times of re-transmission of a wireless transfer block has reached an upper limit value of the number of times of re-transmission, the party on the transmission side discards the wireless segment corresponding to such a wireless transfer block and all the wireless segments following that wireless segment. In the other situation, when a wireless segment stays in a buffer beyond a stay permitted period, the party on the transmission side discards such a wireless segment and all the wireless segments following that wireless segment. According to the conventional communication method described in Patent Document 1, only the upper limit value of the number of times of re-transmission is changed, and the stay permitted period is not taken into consideration. Thus, a problem still remains where, in the situation where a wireless transfer block stays beyond the stay permitted period before the number of times of re-transmission reaches the upper limit value, it is not possible to fully achieve the advantageous effect of reducing the possibility of wasting the wireless transfer blocks that have already been transmitted.

Further, generally speaking, in wireless communication systems, each packet is divided into a plurality of wireless transfer blocks and transmitted, and the modulation method and the encoding ratio for the wireless transfer blocks are controlled in such a manner that the error ratios of the wireless transfer blocks are maintained at a certain level. Thus, a problem arises where the error ratios of the packets vary depending on how many wireless transfer blocks constitute the packet (number of divisions of the packet). More specifically, the problem is, the larger the number of wireless transfer blocks that constitute a packet is, the higher is the error ratio of the packet.

Further, according to the conventional technique described in Patent Document 2, a handover delay period is unstable because of an impact from fluctuations in the wireless communication link quality between a mobile station and base stations, the handover delay period being a difference between a handover request time obtained by measuring the wireless communication link quality and an actual handover execution time. As a result, in the case where the wireless communication link quality is further degraded while the handover is being delayed to such an extent that the communication becomes impossible, a problem arises where the wireless communication link is wasted even more, because of the additional wireless transfer blocks that have been delivered during the delayed period.

In view of the problems described above, a first object of the present invention is to obtain a communication system that is able to, in the case where each packet is divided into a plurality of wireless transfer blocks and transmitted, effectively utilize the wireless communication link (frequency) by lowering the possibility of wasting the wireless transfer blocks that are already acknowledged as having been delivered, in a situation where some wireless transfer blocks fail to reach the transmission destination and the packet therefore fails to be reproduced.

A second object of the present invention is to obtain a communication system that is able to maintain the error ratios of the packets at a certain level, without being influenced by the number of wireless transfer blocks that constitute each of the packets.

A third object of the present invention is to obtain a communication system that is able to shorten the handover delay period so as to complete a handover before the communication becomes impossible due to degradation of wireless communication link quality.

A fourth object of the present invention is to obtain a communication system that, in the case where it seems unlikely that a packet can be completed before the communication becomes impossible, executes a handover immediately at a handover request time.

Means for Solving Problem

To solve the above problems and to achieve the object, the present invention is featured, in a communication system in which a mobile station communicates with a target station via a base station that is connected to a network, in that the base station includes a wireless transfer block generating unit that divides a packet to be transmitted into a plurality of wireless transfer blocks, a scheduler unit that determines a priority of a wireless transfer block based on a delivery acknowledged amount accumulated value indicating an accumulated value of sizes of wireless transfer blocks for which a delivery acknowledgment is obtained which indicates that the wireless transfer block reached the mobile station, and allocates wireless resources to the wireless transfer blocks constituting the packet based on determined priority, and a wireless transfer block transmitting unit that transmits the wireless transfer blocks generated by the wireless transfer block generating unit by using the wireless resources allocated by the scheduler unit, and the mobile station includes a re-transmission control unit that transmits the delivery acknowledgment to the base station when the wireless transfer block is properly received from the base station and transmits a re-transmission request to the base station when the wireless transfer block is not properly received from the base station, and a packet reproducing unit that reproduces the packet from the wireless transfer blocks received from the base station.

Effect of the Invention

According to the present invention, the priority level is determined based on the delivery acknowledged amount accumulated value indicating an accumulated value of the sizes of the wireless transfer blocks for each of which a delivery acknowledgment has been made, the delivery acknowledgment indicating that the wireless transfer block has reached the mobile station, so that a wireless resource is allocated to the wireless transfer blocks constituting the packet to be transmitted, based on the determined priority level. Thus, in the case where each packet is divided into a plurality of wireless transfer blocks and transmitted, it is possible to lower the possibility of wasting the wireless transfer blocks that are already acknowledged as having been delivered, in a situation where some wireless transfer blocks fail to reach a transmission destination and the packet therefore fails to be reproduced. Consequently, it is possible to achieve an advantageous effect of obtaining a wireless communication system that is able to effectively utilize the wireless communication link.

BRIEF DESCRIPTION OF DRAWINGS

FIG. 15 is a drawing of a wireless communication link quality information table included in a scheduler unit of a base station according to a fourth embodiment of the present invention.

FIG. 16 is a drawing of a packet table included in a scheduler of a base station according to a sixth embodiment of the present invention.

FIG. 22 is an exemplary table in which delivery acknowledged amount accumulated values are expressed by using indexes in a communication system according to a tenth embodiment of the present invention.

FIG. 23 is an exemplary table in which packet sizes are expressed by using indexes in the communication system according to the tenth embodiment of the present invention.

FIG. 26 is a drawing of transfer information (primitive) between an RLC layer and a MAC layer obtained by extending the 3GPP TS 25.321 in the case where a delivery acknowledged amount accumulated value is used in a scheduling process performed in the communication system according to the tenth embodiment of the present invention.

FIG. 27 is a drawing of transfer information (primitive) between an RLC layer and a MAC layer obtained by extending the 3GPP TS25.321 in a communication system according to a thirteenth embodiment of the present invention.

Figure 1:
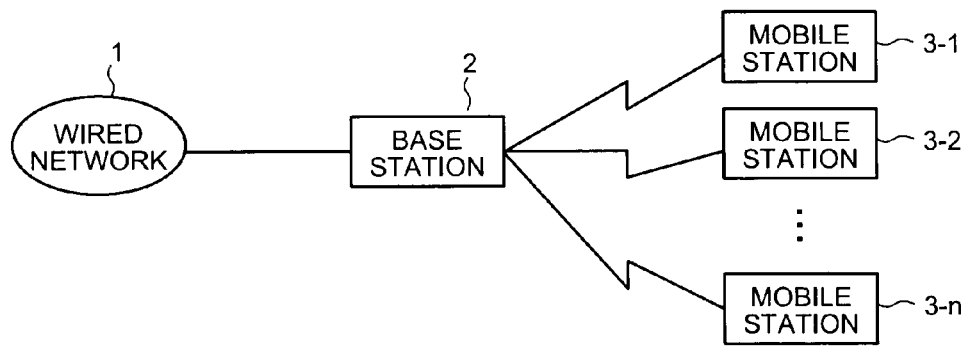
FIG. 1 is a diagram of a communication system according to a first embodiment of the present invention.

EXPLANATIONS OF LETTERS OR NUMERALS 1 wired network
2, 2a-1, 2a-m base station
3-1, 3-2, 3-n, 3a-1, 3a-2, 3a-n mobile station
5 base station control device
201 wired signal receiving unit
202, 312 packet buffer
203, 313 wireless transfer block generating unit
204, 214, 304, 314 re-transmission control unit
205, 315 re-transmission control signal receiving unit
206, 211, 301, 316 wireless signal transmitting and receiving unit
207, 317 wireless transfer block transmitting unit
208, 219 scheduler
209 wireless communication link quality information receiving unit
210 handover control unit
212, 303 re-transmission control signal transmitting unit
213, 302 wireless transfer block receiving unit
215, 305 packet reproducing unit
216 wired signal transmitting unit
217 transmission instruction transmitting unit
218 transmission request receiving unit
306 packet receiving unit
307 wireless communication link quality information transmitting unit
308 handover requesting unit
311 packet generating unit
318 transmission instruction receiving unit
319 control unit
320 transmission request transmitting unit

BEST MODE(S) FOR CARRYING OUT THE INVENTION

Exemplary embodiments of a communication system, a base station, and a mobile station according to the present invention will be explained in detail with reference to the accompanying drawings. The present invention is not limited to the exemplary embodiments. Further, methods that are obtained by combining one or more of the exemplary embodiments described below are also included in the scope of the present invention.

First Embodiment

A first embodiment of the present invention will be explained with reference to FIGS. 1 to 8. FIG. 1 is a diagram of a communication system according to the first embodiment of the present invention. In FIG. 1, the communication system includes a wired network 1, a base station 2, and mobile stations 3 (representing 3-1 to 3-n) of which the total quantity is equal to n (where n is a natural number). The wired network 1 and the base station 2 are connected to each other via a wired communication link. The base station 2 and the mobile stations 3 are connected to one another via wireless communication links. Each of the mobile stations 3 performs a mutual communication by using packets, with a fixed terminal (not shown) connected to the wired network 1 or another mobile station, via the base station 2 and the wired network 1.

Figure 2:
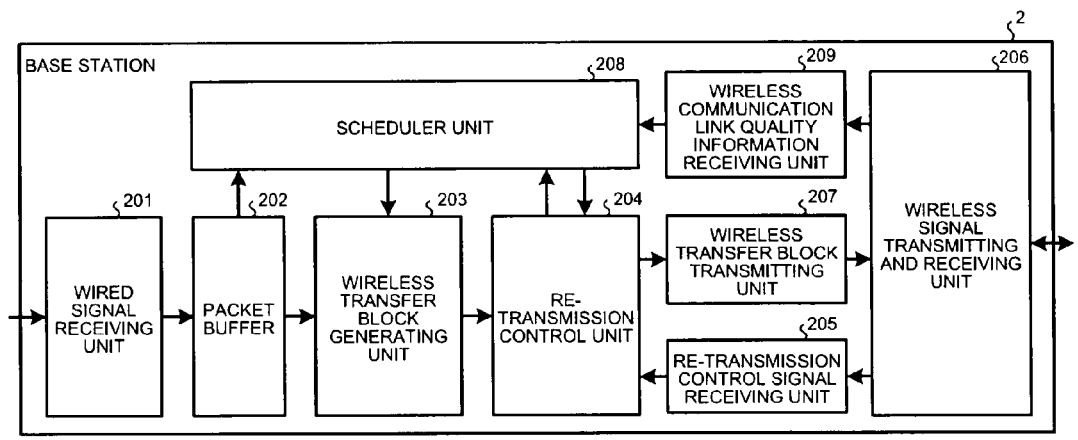
FIG. 2 is a block diagram for explaining a configuration related to a downstream communication performed by a base station shown in FIG. 1.

In the description of the first embodiment, a downstream communication will be explained in which the base station 2 transmits a packet that has been received from the wired network 1 to any one of the mobile stations 3. FIG. 2 is a block diagram for explaining a configuration related to the downstream communication performed by the base station 2 shown in FIG. 1. In FIG. 2, the base station 2 includes: a wired signal receiving unit 201 that has an interface function for the wired communication link and receives a signal (packet) from the wired network 1; a packet buffer 202 that buffers the packet that has been received by the wired signal receiving unit 201; a scheduler unit 208 that determines the sizes of wireless transfer blocks to be transmitted to the mobile stations 3 and performs a scheduling process for the wireless transfer blocks; a wireless transfer block generating unit 203 that generates, from a packet that has been selected by the scheduler unit 208, wireless transfer blocks having the sizes that have been determined by the scheduler unit 208; a re-transmission control unit 204 that exercises re-transmission control in units of wireless transfer blocks between the base station 2 and the mobile stations 3; a wireless transfer block transmitting unit 207 that transmits the wireless transfer blocks that have been generated by the wireless transfer block generating unit 203; a wireless signal transmitting and receiving unit 206 that has an interface function for the wireless communication links and transmits and receives a signal to and from the mobile stations 3; a re-transmission control signal receiving unit 205 that extracts re-transmission control information out of the signal that has been received by the wireless signal transmitting and receiving unit 206; and a wireless communication link quality information receiving unit 209 that extracts wireless communication link quality information of the downstream communication links, out of the signal that has been received by the wireless signal transmitting and receiving unit 206.

Figure 3:
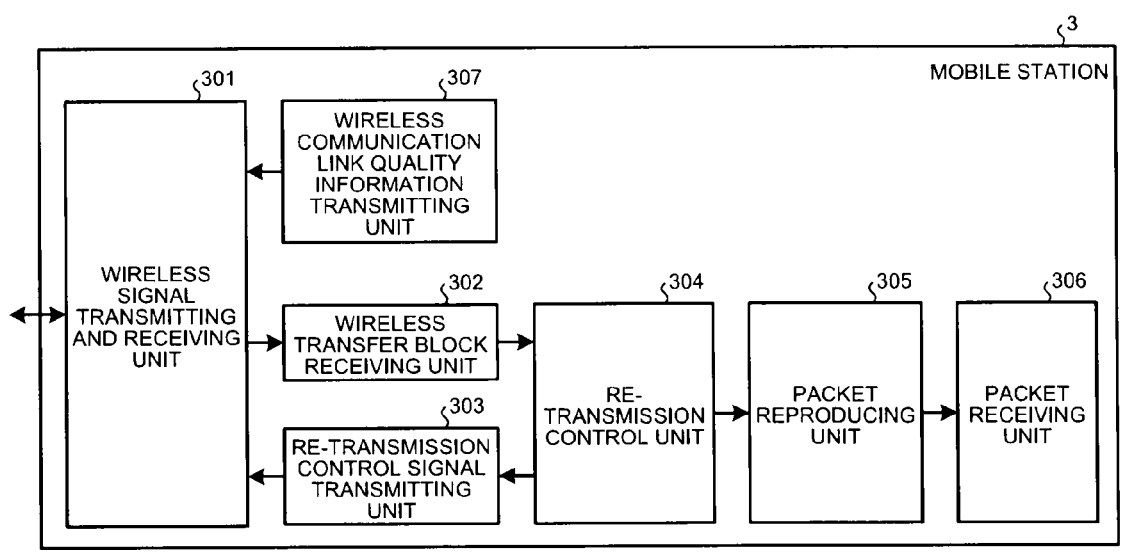
FIG. 3 is a block diagram for explaining a configuration related to a downstream communication performed by any one of mobile stations shown in FIG. 1.

FIG. 3 is a block diagram for explaining a configuration related to a downstream communication performed by any one of the mobile stations 3 shown in FIG. 3. In FIG. 3, the mobile station 3 includes: a wireless signal transmitting and receiving unit 301 that has an interface function for the wireless communication link and transmits and receives a signal to and from the base station 2; a wireless transfer block receiving unit 302 that extracts wireless transfer blocks out of the signals that have been received by the wireless signal transmitting and receiving unit 301; a re-transmission control unit 304 that exercises re-transmission control between the mobile station 3 and the base station 2; a re-transmission control signal transmitting unit 303 that transmits re-transmission control information that has been generated by the re-transmission control unit 304; a packet reproducing unit 305 that reproduces a packet from the wireless transfer blocks that have been received by the wireless transfer block receiving unit 302; a packet receiving unit 306 that receives the packet that has been reproduced by the packet reproducing unit 305 and outputs the received packet to an upper layer processing unit (not shown); and a wireless communication link quality information transmitting unit 307 that measures wireless communication link quality information of the downstream wireless communication link and transmits the measured wireless communication link quality information to the base station 2.

Next, an operation of the communication system according to the first embodiment of the present invention will be explained. When having received a packet via the wired signal receiving unit 201 included in the base station 2, the packet buffer 202 buffers the received packet and notifies the scheduler unit 208 that a new packet has been received. The scheduler unit 208 initializes a delivery acknowledged amount accumulated value and stores the initialized value therein in correspondence with the new packet.

On the other hand, when having received a signal from any one of the mobile stations 3 via the wireless signal transmitting and receiving unit 206 included in the base station 2, the wireless communication link quality information receiving unit 209 extracts the wireless communication link quality information of the downstream wireless communication link that has been measured by the wireless communication link quality information transmitting unit 307 included in the mobile station 3, out of the signal that has been received from the mobile station 3 and outputs the extracted wireless communication link quality information to the scheduler unit 208.

Further, the re-transmission control signal receiving unit 205 included in the base station 2 extracts re-transmission control information out of the signal received from the mobile station 3 via the wireless signal transmitting and receiving unit 206 and outputs the extracted re-transmission control information to the re-transmission control unit 204.

Based on the re-transmission control information, the re-transmission control unit 204 included in the base station 2 determines whether a re-transmission process should be performed in units of wireless transfer blocks. In the case where the re-transmission control information is a delivery acknowledgment indicating that the wireless transfer block has properly been received, the re-transmission control unit 204 included in the base station 2 outputs delivery acknowledgment information to the scheduler unit 208. Based on the delivery acknowledgment information, the scheduler unit 208 updates the delivery acknowledged amount accumulated value that is stored therein in correspondence with the packet. In the case where the re-transmission control information is a re-transmission request for requesting that the wireless transfer block should be re-transmitted, the scheduler unit 208 performs a predetermined re-transmission process on the wireless transfer block for which the re-transmission has been requested.

When a predetermined scheduling time for the wireless transfer blocks has come, the scheduler unit 208 included in the base station 2 determines the sizes of the wireless transfer blocks based on the wireless communication link quality information. Further, as explained in detail below, the scheduler unit 208 performs a scheduling process of determining the priority level of each of the packets based on a corresponding one of the delivery acknowledged amount accumulated values that are respectively stored therein in correspondence with the packets buffered in the packet buffer 202 and allocating a wireless resource to the wireless transfer blocks that are generated from the packets according to the determined priority levels. After that, the scheduler unit 208 outputs wireless transfer block generation information to the wireless transfer block generating unit 203, the wireless transfer block generation information indicating the packet from which the wireless transfer blocks are to be generated and the sizes of the wireless transfer blocks, the wireless transfer blocks having the wireless resources allocated thereto in the scheduling process. The scheduler unit 208 also outputs transmission information containing the information of the wireless transfer blocks and the allocated wireless resources to the re-transmission control unit 204.

The wireless transfer block generating unit 203 included in the base station 2 generates the wireless transfer blocks from the packet that is buffered in the packet buffer 202, based on the wireless transfer block generation information and outputs the generated wireless transfer blocks to the re-transmission control unit 204.

The re-transmission control unit 204 included in the base station 2 outputs the transmission information and the wireless transfer blocks to the wireless transfer block transmitting unit 207. Based on the transmission information, the wireless transfer block transmitting unit 207 transmits the wireless transfer blocks to the mobile station 3 via the wireless signal transmitting and receiving unit 206.

The wireless transfer block receiving unit 302 included in the mobile station 3 extracts the wireless transfer blocks out of the signals that have been received via the wireless signal transmitting and receiving unit 301 and outputs the extracted wireless transfer blocks to the re-transmission control unit 304. The re-transmission control unit 304 judges whether each of the wireless transfer blocks has properly been received (whether the data has an error). In the case where each of the wireless transfer blocks has properly been received, the re-transmission control unit 304 outputs the wireless transfer block to the packet reproducing unit 305 and notifies the re-transmission control signal transmitting unit 303 that the wireless transfer block has properly been received.

The packet reproducing unit 305 included in the mobile station 3 reproduces the packet from the wireless transfer blocks. When the wireless transfer block generating unit 203 included in the base station 2 generated the wireless transfer blocks, the wireless transfer block generating unit 203 has put information (wireless transfer block number) into each of the wireless transfer blocks, the information indicating in what position within the packet the wireless transfer block is placed. The reproducing unit 305 included in the mobile station 3 reproduces the packet from the wireless transfer blocks by using the information. When all the wireless transfer blocks that constitute the packet have properly been received and the packet has been reproduced, the packet reproducing unit 305 outputs the reproduced packet to the packet receiving unit 306.

On the contrary, in the case where any one of the wireless transfer blocks has not properly been received, the re-transmission control unit 304 included in the mobile station 3 discards such a wireless transfer block and notifies the re-transmission control signal transmitting unit 303 that the wireless transfer block has not properly been received.

In the case where the re-transmission control signal transmitting unit 303 included in the mobile station 3 has been notified that any one of the wireless transfer blocks has not properly been received, the re-transmission control signal transmitting unit 303 transmits a re-transmission request as the re-transmission control information to the base station 2 via the wireless signal transmitting and receiving unit 301. On the contrary, in the case where the re-transmission control signal transmitting unit 303 has been notified that each of the wireless transfer blocks has properly been received, the re-transmission control signal transmitting unit 303 transmits a delivery acknowledgment as the re-transmission control information to the base station 2 via the wireless signal transmitting and receiving unit 301.

Next, an operation of the scheduler unit 208 included in the base station 2 will be explained in detail, with reference to the flowcharts in FIGS. 4 and 6 and FIGS. 5 and 7. When the scheduler unit 208 has been notified by the packet buffer 202 that a new packet has been received (Step S100), the scheduler unit 208 initializes the delivery acknowledged amount accumulated value (in the present example, "0") and stores therein the initialized value in correspondence with the new packet (Step S101).

When the scheduler unit 208 has received delivery acknowledgment information from the re-transmission control unit 204 (Step S102), the scheduler unit 208 adds a delivery acknowledged amount to the delivery acknowledged amount accumulated value that is stored in correspondence with the packet constituted with the wireless transfer block for which the delivery acknowledgment information has been received so as to update the delivery acknowledged amount accumulated value (Step S103).

Figure 5:
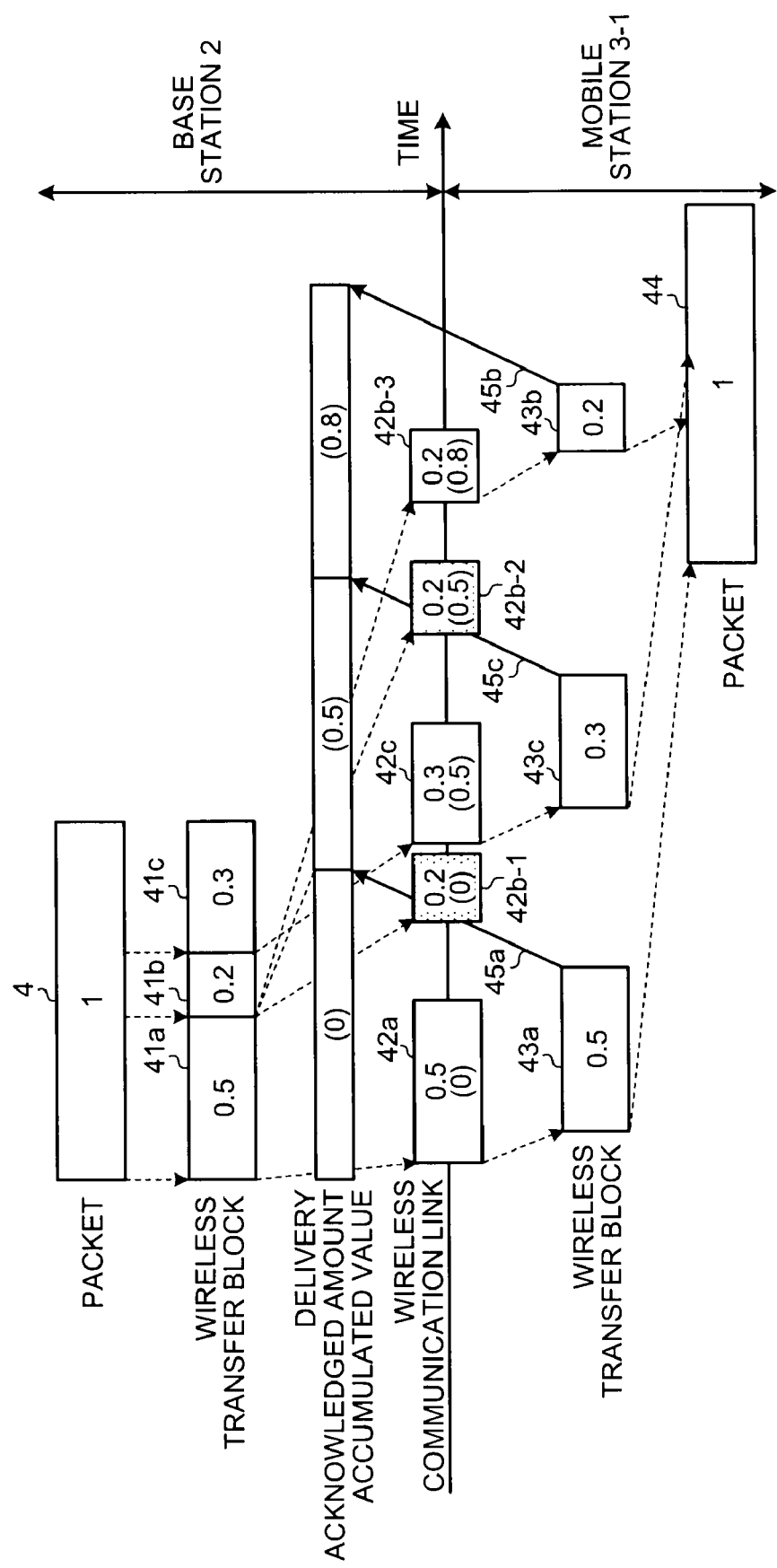
FIG. 5 is a drawing for explaining changes in a delivery acknowledged amount accumulated value while a focus is placed on one specific packet.

Next, changes in the delivery acknowledged amount accumulated value will be explained, while a focus is placed on one specific packet (packet to be transmitted to the mobile station 3-1), with reference to FIG. 5. In FIG. 5, each of the numbers shown in a packet 4 in the base station 2, wireless transfer blocks 41a to 41c, wireless transfer blocks 42a, 42b-1 to 42b-3, and 42c on the wireless communication link, wireless transfer blocks 43a, 43b, and 43c in the mobile station 3-1, and a packet 44 in the mobile station 3-1 indicates the size of the wireless transfer block or the packet that is expressed by normalizing the packet size of the packet 4 to "1". Each of the delivery acknowledged amount accumulated values and the numbers in the parentheses in the wireless transfer blocks 42a, 42b-1 to 42b-3, and 42c is an accumulated value of the delivery acknowledged amounts that is expressed by normalizing the packet 4 to "1".

When the packet 4 has arrived at the base station 2 from the wired network 1, the packet 4 is divided into the wireless transfer blocks 41a to 41c each having a size determined based on the wireless communication link quality information and transmitted onto the wireless communication link. The base station 2 determines the size of the wireless transfer block as "0.5" based on the wireless communication link quality information and transmits the first wireless transfer block 41a of the wireless transfer blocks that constitute the packet 4 onto the wireless communication link as the wireless transfer block 42a. Because the wireless transfer block 41a is the first wireless transfer block constituting the packet 4, the delivery acknowledged amount accumulated value that is stored in correspondence with the packet 4 is "0".

The mobile station 3-1 receives the wireless transfer block 42a put on the wireless communication link. Because the wireless transfer block 42a has properly been received as the wireless transfer block 43a, the mobile station 3-1 transmits a delivery acknowledgment 45a for the wireless transfer block 43a to the base station 2.

The base station 2 determines the size of the wireless transfer block as "0.2" based on the wireless communication link quality information and transmits the second wireless transfer block 41b of the wireless transfer blocks that constitute the packet 4 onto the wireless communication link as the wireless transfer block 42b-1. In this situation, because the base station 2 has not received the delivery acknowledgment 45a from the mobile station 3-1, the delivery acknowledged amount accumulated value that is stored in correspondence with the packet 4 remains "0".

When the base station 2 has received the delivery acknowledgment 45a, the base station 2 obtains the size of the corresponding wireless transfer block 41a based on the delivery acknowledgment 45a and specifies the obtained size as a delivery acknowledged amount. The base station 2 then adds the delivery acknowledged amount to the delivery acknowledged amount accumulated value so as to update the delivery acknowledged amount accumulated value.

Before receiving the delivery acknowledgment 45a, the base station 2 has transmitted the wireless transfer blocks 41a and 41b. Thus, the base station 2 needs to identify whether the delivery acknowledgment 45a is for the wireless transfer block 41a or for the wireless transfer block 41b. To indicate to which wireless transfer block the delivery acknowledgment 45a corresponds, the mobile station 3-1 puts a wireless transfer block number obtained when the mobile station 3-1 received the wireless transfer block 43a into the delivery acknowledgment 45a, as information that specifies the wireless transfer block 41a. Further, the base station 2 stores therein the size of the wireless transfer block in correspondence with the wireless transfer block number that is used when the wireless transfer block 41a is generated and obtains the size "0.5" of the wireless transfer block based on the wireless transfer block number within the delivery acknowledgment 45a and updates the delivery acknowledged amount accumulated value.

The base station 2 determines the size of the wireless transfer block as "0.3" based on the wireless communication link quality information and transmits the third (the last in this case) wireless transfer block 41c of the wireless transfer blocks that constitute the packet 4 onto the wireless communication link as the wireless transfer block 42c. In this situation, because the base station 2 has not received a delivery acknowledgment for the wireless transfer block 41b, the delivery acknowledged amount accumulated value that is stored in correspondence with the packet 4 remains "0.5".

The mobile station 3-1 receives the wireless transfer block 42b-1 put on the wireless communication link. Because the wireless transfer block 42b-1 on the wireless communication link has not properly been received, the mobile station 3-1 transmits a re-transmission request for the wireless transfer block 42b-1 to the base station 2. After that, the mobile station 3-1 receives the wireless transfer block 42c put on the wireless communication link. Because the mobile station 3-1 is able to receive the wireless transfer block 42c as the wireless transfer block 43c, the mobile station 3-1 transmits a delivery acknowledgment 45c for the wireless transfer block 43c to the base station 2.

The base station 2 receives the re-transmission request for the wireless transfer block 42b-1 and re-transmits the wireless transfer block 41b onto the wireless communication link as the wireless transfer block 42b-2. In this situation, because the base station 2 has not received the delivery acknowledgment 45c, the delivery acknowledged amount accumulated value that is stored in correspondence with the packet 4 remains "0.5".

When the base station 2 has received the delivery acknowledgment 45c, the base station 2 obtains the size of the corresponding wireless transfer block 41c based on the delivery acknowledgment 45c and specifies the obtained size as a delivery acknowledged amount. The base station 2 then adds the delivery acknowledged amount to the delivery acknowledged amount accumulated value so as to update the delivery acknowledged amount accumulated value. In the present example, because the delivery acknowledged amount accumulated value is "0.5", whereas the size of the wireless transfer block 41c is "0.3", the delivery acknowledged amount accumulated value is updated to "0.8".

The mobile station 3-1 receives the wireless transfer block 42b-2 put on the wireless communication link. Because the mobile station 3-1 is not able to properly receive the wireless transfer block 42b-2 on the communication link, either, the mobile station 3-1 transmits a re-transmission request for the wireless transfer block 42b-2 to the base station 2. The base station 2 receives the re-transmission request from the wireless transfer block 42b-2 and re-transmits the wireless transfer block 41b onto the wireless communication link, as the wireless transfer block 42b-3. In this situation, the delivery acknowledged amount accumulated value that is stored in correspondence with the packet 4 is "0.8".

The mobile station 3-1 receives the wireless transfer block 42b-3 put on the wireless communication link. Because the mobile station 3-1 is able to properly receive the wireless transfer block 42b-3 on the wireless communication link as the wireless transfer block 43b, the mobile station 3-1 transmits a delivery acknowledgment 45b for the wireless transfer block 43b to the base station 2.

When the base station 2 has received the delivery acknowledgment 45b, the base station 2 obtains the size of the corresponding wireless transfer block 41b based on the delivery acknowledgment 45b and specifies the obtained size as a delivery acknowledged amount. The base station 2 then adds the delivery acknowledged amount to the delivery acknowledged amount accumulated value so as to update the delivery acknowledged amount accumulated value. In the present example, because the delivery acknowledged amount accumulated value is "0.8", whereas the size of the wireless transfer block 41b is "0.2", the delivery acknowledged amount accumulated value becomes "1". In other words, it means that the wireless transfer blocks 41a to 41c that constitute the packet 4 have been delivered to the mobile station 3-1. Accordingly, when the delivery acknowledged amount accumulated value has become "1", the base station 2 judges that the transmission of the packet 4 has been completed and discards the delivery acknowledged amount accumulated value stored in correspondence with the packet 4.

On the other hand, the mobile station 3-1 has properly received the wireless transfer block 43b and thus has completed the reception of the wireless transfer blocks 43a to 43c that constitute the packet. Accordingly, the mobile station 3-1 reproduces the packet 44.

In the same manner as explained above while the focus is placed on the packet to be transmitted to the mobile station 3-1, every time the scheduler unit 208 included in the base station 2 has received a delivery acknowledgment from any one of the mobile stations 3, the scheduler unit 208 updates the delivery acknowledged amount accumulated value that is stored therein in correspondence with the packet constituted with the wireless transfer block corresponding to the received delivery acknowledgment.

Figure 4:
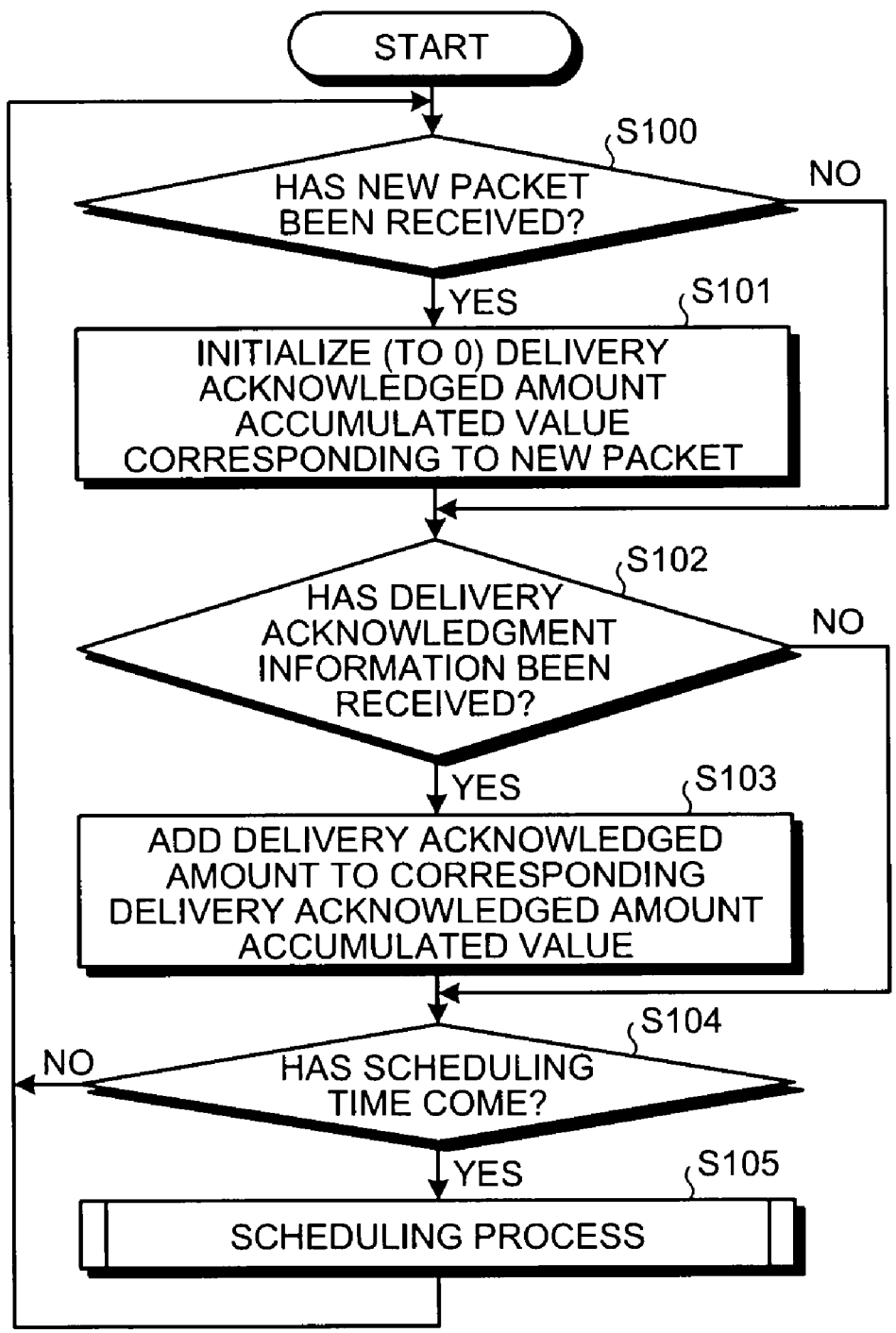
FIG. 4 is a flowchart for explaining an operation of a scheduler unit of the communication system according to the first embodiment of the present invention.

Returning to the description of FIG. 4, when a predetermined scheduling time has come (Step S104), the scheduler unit 208 performs a scheduling process of determining the priority level of each of the packets buffered in the packet buffer 202, based on a corresponding one of the delivery acknowledged amount accumulated values that are respectively stored therein in correspondence with the packets and allocating a wireless resource to the wireless transfer blocks generated from the packet according to the determined priority level (Step S105).

Figure 6:
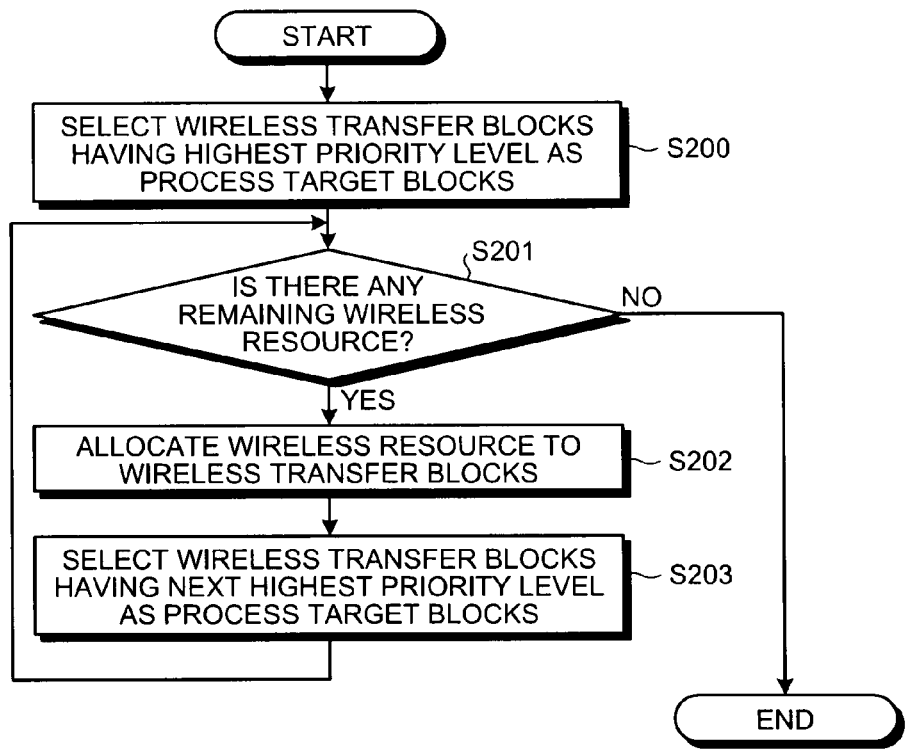
FIG. 6 is a flowchart for explaining an operation in a scheduling process performed by the scheduler unit of the communication system according to the first embodiment of the present invention.

Next, an operation in the scheduling process performed by the scheduler unit 208 will be explained in detail, with reference to the flowchart in FIG. 6. The scheduler unit 208 uses the delivery acknowledged amount accumulated value that is stored therein in correspondence with each of the packets buffered in the packet buffer 202 as the priority level, during the scheduling process of the wireless transfer blocks. More specifically, the scheduler unit 208 determines the priority level of each of the packets in such a manner that the larger the delivery acknowledged amount accumulated value is, the higher is the priority level. The scheduler unit 208 then selects the wireless transfer blocks that constitute the packet having the highest priority level as process target blocks (Step S200).

The scheduler unit 208 then judges whether there is any remaining wireless resource (Step S201). In the case where there is a remaining wireless resource, the scheduler unit 208 allocates a wireless resource to the wireless transfer blocks that have been selected as the process target blocks (Step S202).

The scheduler unit 208 then selects, as new process target blocks, the wireless transfer blocks that constitute the packet having the next highest priority level after the packet constituted with the wireless transfer blocks that are currently selected as the process target blocks (Step S203).

The scheduler unit 208 repeats the operation of allocating a wireless resource to the wireless transfer blocks that have been selected as the process target blocks and selecting, as new process target blocks, the wireless transfer blocks that constitute the packet having the next highest priority level after the packet constituted with the wireless transfer blocks that are currently selected as the process target blocks, until there is no remaining wireless resource (Steps S201 to S203).

Figure 7:
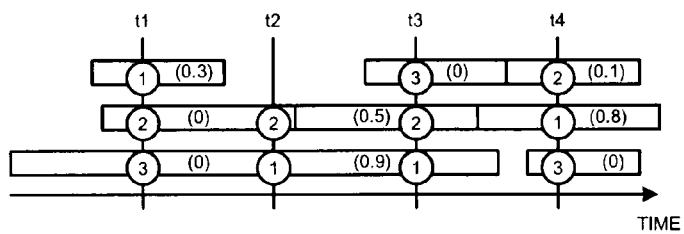
FIG. 7 is a drawing for explaining changes in priority levels in the scheduling process.

FIG. 7 is a drawing for explaining changes in the priority levels in the scheduling process, in the case where the base station 2 covers three mobile stations 3-1 to 3-3. In FIG. 7, it is indicated to which wireless transfer blocks (wireless transfer blocks to be transmitted to the mobile stations 3-1 to 3-3) a priority is given, at each of the periodical scheduling times t1 to t4, based on the delivery acknowledged amount accumulated values respectively corresponding to the packets to be transmitted to the mobile stations 3-1 to 3-3. The numerical values in the circles indicate the order in which the scheduler unit 208 allocates the wireless resources.

At a scheduling time t1, the delivery acknowledged amount accumulated value for the packet to be transmitted to the mobile station 3-1 is "0.3", while the delivery acknowledged amount accumulated value for the packet to be transmitted to the mobile station 3-2 is "0.0", and the delivery acknowledged amount accumulated value for the packet to be transmitted to the mobile station 3-3 is "0.0". The scheduler unit 208 determines the priority levels in such a manner that the higher the delivery acknowledged amount accumulated value is, the higher is the priority level. Thus, the scheduler unit 208 first determines the wireless transfer blocks constituting the packet to be transmitted to the mobile station 3-1 as the process target blocks and allocates a wireless resource thereto. Secondly, the scheduler unit 208 determines the wireless transfer blocks constituting the packet to be transmitted to the mobile station 3-2 as the process target blocks and allocates a wireless resource thereto. Lastly, the scheduler unit 208 determines the wireless transfer blocks constituting the packet to be transmitted to the mobile station 3-3 as the process target blocks and allocates a wireless resource thereto. In the case where the priority levels are equal (in this case, the mobile stations 3-1 and 3-3), the priority levels are determined in a predetermined order.

At a scheduling time t2, because all the wireless transfer blocks that constitute the packet to be transmitted to the mobile station 3-1 have been delivered to the mobile station 3-1 and the packet buffer 202 is not buffering any new packet to be transmitted to the mobile station 3-1, there is no delivery acknowledged amount accumulated value corresponding to a packet to be transmitted to the mobile station 3-1. Also, because delivery acknowledgments have been received from the mobile station 3-3 for the wireless transfer blocks that were transmitted before the scheduling time t2, the delivery acknowledged amount accumulated value corresponding to the packet to be transmitted to the mobile station 3-3 is "0.9". Because the delivery acknowledged amount accumulated value corresponding to the packet to be transmitted to the mobile station 3-2 is "0.0", the scheduler unit 208 determines the wireless transfer blocks constituting the packet to be transmitted to the mobile station 3-3 as the process target blocks and allocates a wireless resource thereto. After that, the scheduler unit 208 determines the wireless transfer blocks constituting the packet to be transmitted to the mobile station 3-2 as the process target blocks and allocates a wireless resource thereto.

At a scheduling time t3, because a packet to be transmitted to the mobile station 3-1 was buffered into the packet buffer 202 between the scheduling time t2 and the scheduling time t3, the delivery acknowledged amount accumulated value corresponding to the packet to be transmitted to the mobile station 3-1 has been initialized ("0"). Also, because delivery acknowledgments have been received from the mobile station 3-2 for the wireless transfer blocks that were transmitted before the scheduling time t3, the delivery acknowledged amount accumulated value corresponding to the packet to be transmitted to the mobile station 3-2 is "0.5". Thus, the scheduler unit 208 first determines the wireless transfer blocks constituting the packet that has the highest priority level (having the largest delivery acknowledged amount accumulated value) and is to be transmitted to the mobile station 3-3 as the process target blocks and allocates a wireless resource thereto. Secondly, the scheduler unit 208 determines the wireless transfer blocks constituting the packet that has the next highest priority level and is to be transmitted to the mobile station 3-2 as the process target blocks and allocates a wireless resource thereto. Lastly, the scheduler unit 208 determines the wireless transfer blocks constituting the packet that has the lowest priority level and is to be transmitted to the mobile station 3-1 as the process target blocks and allocates a wireless resource thereto.

At a scheduling time t4, because delivery acknowledgments were received from the mobile stations 3-1 and 3-2 between the scheduling time t3 and the scheduling time t4, the delivery acknowledged amount accumulated value corresponding to the packet to be transmitted to the mobile station 3-1 is "0.1", while the delivery acknowledged amount accumulated value corresponding to the packet to be transmitted to the mobile station 3-2 is "0.8". Also, because a packet to be transmitted to the mobile station 3-3 was newly buffered into the packet buffer 202 after all the wireless transfer blocks that constitute the packet to be transmitted to the mobile station 3-3 have been delivered to the mobile station 3-3, the delivery acknowledged amount accumulated value corresponding to the packet to be transmitted to the mobile station 3-3 is "0.0".

The scheduler unit 208 first determines the wireless transfer blocks constituting the packet that has the highest priority level and is to be transmitted to the mobile station 3-2 as the process target blocks and allocates a wireless resource thereto. Secondly, the scheduler unit 208 determines the wireless transfer blocks constituting the packet that has the next highest priority level and is to be transmitted to the mobile station 3-1 as the process target blocks and allocates a wireless resource thereto. Lastly, the scheduler unit 208 determines the wireless transfer blocks that have the lowest priority level and are to be transmitted to the mobile station 3-3 as the process target blocks and allocates a wireless resource thereto.

As explained above, according to the first embodiment, the priority levels are determined based on the delivery acknowledged amount accumulated values each indicating an accumulated value of the sizes of the wireless transfer blocks for each of which a delivery acknowledgment has been made, the delivery acknowledgment indicating that the wireless transfer block has reached the mobile station. The wireless resources are allocated to the wireless transfer blocks that constitute each of the packets to be transmitted, based on the determined priority levels. As a result, in the case where each packet is divided into a plurality of wireless transfer blocks and transmitted, it is possible to lower the possibility of wasting the wireless transfer blocks that are already acknowledged as having been delivered, in the situation where some wireless transfer blocks fail to reach the corresponding mobile station 3 and the packet therefore fails to be reproduced. Consequently, it is possible to effectively utilize the wireless communication link.

Also, according to the first embodiment, the priority levels are determined in such a manner that the larger the delivery acknowledged amount accumulated value is, the higher is the priority level, so that the wireless transfer blocks that belong to a packet in which delivery acknowledgments have been received for a larger percentage thereof are transmitted with a higher priority. Thus, in the case where there is no other choice but to discard some wireless transfer blocks, the wireless transfer blocks that belong to a packet in which delivery acknowledgments have been received for a smaller percentage thereof are discarded. Thus, it is possible to reduce the quantity of the wireless transfer blocks that are discarded due to the mobile station 3 being unable to assemble the packet. Thus, it is possible to effectively utilize the frequency or to improve the throughput on the packet level.

According to the first embodiment, the values obtained by normalizing the packet are used as the delivery acknowledged amounts. However, another arrangement is acceptable in which the actual data amounts are used as the delivery acknowledged amounts.

Figure 8:
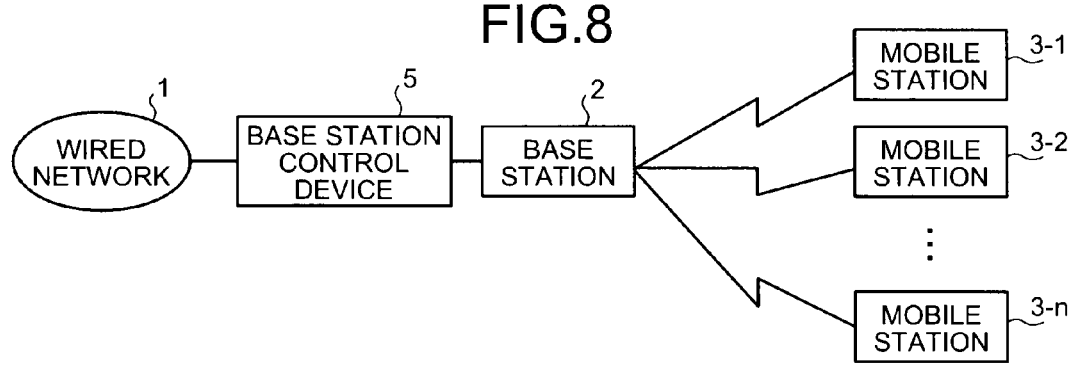
FIG. 8 is a diagram of another example of a communication system according to the present invention.

Also, in the first embodiment, the example is explained in which the base station 2 divides the packet that has been received from the wired network 1 into the wireless transfer blocks. However, another communication system as shown in FIG. 8 is also applicable in which a base station control device 5 is provided between the wired network 1 and the base station 2 shown in FIG. 1, so that the base station control device 5 divides the packet that has been received from the wired network 1 into a plurality of divided segments and transmits the divided segments to the base station 2, and the base station 2 generates wireless transfer blocks from the plurality of divided segments.

In this situation, the base station control device 5 puts an identifier into each of the divided segments so that the positions at which packets are separated from one another are indicated. By using these identifiers, the base station 2 is able to obtain the packet size of each packet made up of the plurality of divided segments.

Second Embodiment

A second embodiment of the present invention will be explained, with reference to FIGS. 9 to 12. In the first embodiment described above, the downstream communication is explained in which the base station 2 transmits, to the mobile station 3, the packet that has been received from the wired network 1. In the second embodiment, an upstream communication will be explained in which any one of the mobile stations 3 transmits a packet to the wired network 1 via the base station 2. The configuration of the communication system according to the second embodiment is the same as that of the communication system according to the first embodiment shown in FIG. 1. Thus, the explanation thereof will be omitted.

Figure 9:
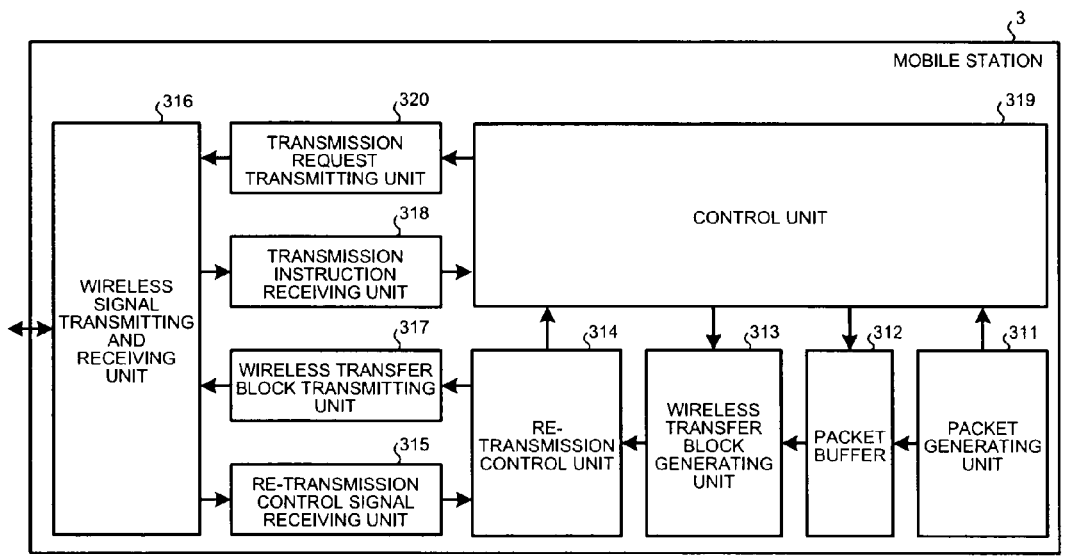
FIG. 9 is a block diagram for explaining an upstream communication performed by a mobile station according to a second embodiment of the present invention.

FIG. 9 is a block diagram for explaining a configuration related to an upstream communication performed by any one of the mobile stations 3 included in a communication system according to the present invention. In FIG. 9, the mobile station 3 includes: a packet generating unit 311 that generates a packet to be transmitted; a packet buffer 312 that buffers the packet that has been generated by the packet generating unit 311; a wireless transfer block generating unit 313 that generates wireless transfer blocks from the packet that is buffered in the packet buffer 312 according to an instruction from a control unit 319; a re-transmission control unit 314 that exercises re-transmission control between the mobile station 3 and the base station 2 in units of wireless transfer blocks; a wireless transfer block transmitting unit 317 that transmits the wireless transfer blocks that have been generated by the wireless transfer block generating unit 313; a transmission request transmitting unit 320 that transmits a transmission request to the base station 2; a wireless signal transmitting and receiving unit 316 that has an interface function for the wireless communication link and transmits and receives a signal to and from the base station 2; a re-transmission control signal receiving unit 315 that extracts re-transmission control information out of the signal that has been received by the wireless signal transmitting and receiving unit 316; a transmission instruction receiving unit 318 that extracts a transmission instruction out of the signal that has been received by the wireless signal transmitting and receiving unit 316; and a control unit 319 that controls the transmission of the wireless transfer blocks based on the transmission instructions that have been extracted by the transmission instruction receiving unit 318 and also exercises overall control over the constituent elements of the mobile station 3.

Figure 10:
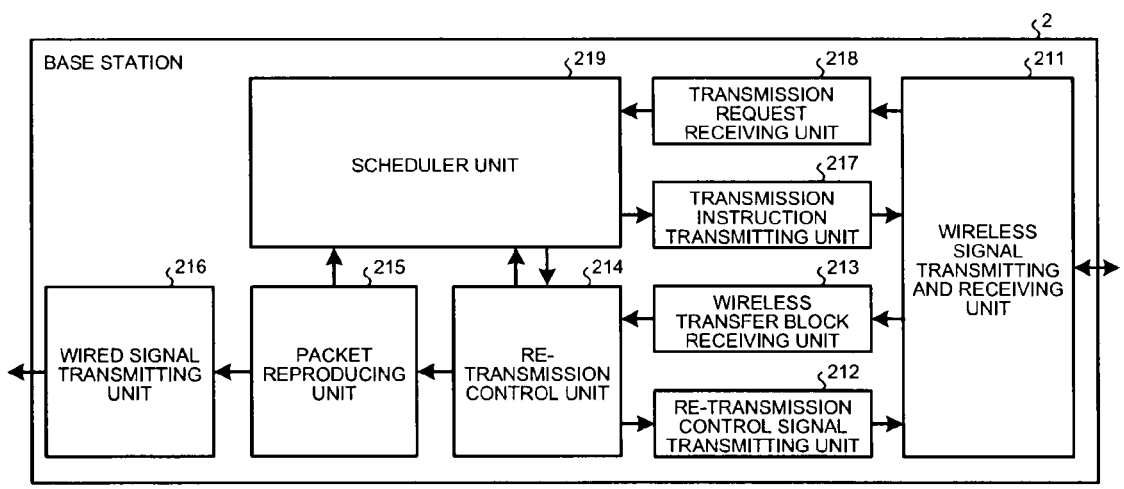
FIG. 10 is a block diagram for explaining an upstream communication performed by a base station according to the second embodiment of the present invention.

FIG. 10 is a block diagram for explaining a configuration related to the upstream communication performed by the base station 2 included in the communication system according to the present invention. In FIG. 10, the base station 2 includes: a wireless signal transmitting and receiving unit 211 that has an interface function for the wireless communication link and transmits and receives a signal to and from any one of the mobile stations 3; a transmission request receiving unit 218 that extracts a transmission request out of the signal that has been received by the wireless signal transmitting and receiving unit 211; a wireless transfer block receiving unit 213 that extracts wireless transfer blocks out of the signals that have been received by the wireless signal transmitting and receiving unit 211; a re-transmission control unit 214 that exercises re-transmission control between the base station 2 and the mobile stations 3; a re-transmission control signal transmitting unit 212 that transmits re-transmission control information that has been generated by the re-transmission control unit 214; a packet reproducing unit 215 that reproduces a packet from the wireless transfer blocks that have been received by the wireless transfer block receiving unit 213; a wired signal transmitting unit 216 that has an interface function for the wired communication link and transmits the packet that has been reproduced by the packet reproducing unit 215 to the wired network 1; a scheduler unit 219 that performs a scheduling process for the wireless transfer blocks that have been transmitted by the mobile stations 3, based on the transmission request that has been extracted by the transmission request receiving unit 218 and the delivery states of the packets; and a transmission instruction transmitting unit 217 that transmits, to the mobile stations 3, the information that has been scheduled by the scheduler unit 219 as a transmission instruction.

Next, an operation of the communication system according to the second embodiment of the present invention will be explained. First, an operation that is performed when the mobile station 3 has got a packet that needs to be transmitted will be explained.

When the mobile station 3 has received, from an upper layer processing unit (not shown), data to be transmitted, the packet generating unit 311 included in the mobile station 3 generates a packet from the data to be transmitted and outputs the generated packet to the packet buffer 312.

The packet buffer 312 included in the mobile station 3 notifies the control unit 319 that the packet buffer 312 is buffering the new packet. More specifically, the control unit 319 generates a transmission request indicating that the new packet is being buffered, i.e., the mobile station 3 has got a packet that needs to be transmitted to the base station 2 and outputs the generated transmission request to the transmission request transmitting unit 320. The control unit 319 puts packet size information indicating the size of the packet into the transmission request. The transmission request transmitting unit 320 included in the mobile station 3 transmits the transmission request to the base station 2 via the wireless signal transmitting and receiving unit 316.

When having received the transmission request via the wireless signal transmitting and receiving unit 211 included in the base station 2, the transmission request receiving unit 218 outputs the received transmission request to the scheduler unit 219. The scheduler unit 219 stores therein a delivery acknowledged amount accumulated value and the packet size in correspondence with the mobile station 3 that transmitted the transmission request. In this situation, the scheduler unit 219 initializes the delivery acknowledged amount accumulated value and stores the initialized value therein.

Next, an operation performed by the mobile station 3 to transmit the wireless transfer blocks that constitute the packet will be explained. When having received a transmission instruction via the wireless signal transmitting and receiving unit 316 included in the mobile station 3, the transmission instruction receiving unit 318 outputs the received transmission instruction to the control unit 319. The control unit 319 outputs the wireless transfer block size contained in the transmission instruction to the wireless transfer block generating unit 313, as wireless transfer block generation information.

The wireless transfer block generating unit 313 included in the mobile station 3 generates wireless transfer blocks from the packet buffered in the packet buffer 312, based on the wireless transfer block generation information and outputs the generated wireless transfer blocks to the re-transmission control unit 314.

When having received the wireless transfer blocks, the re-transmission control unit 314 included in the mobile station 3 performs a process that is required when the re-transmission process is performed. After that, the re-transmission control unit 314 outputs the wireless transfer blocks to the wireless transfer block transmitting unit 317. The wireless transfer block transmitting unit 317 transmits the wireless transfer blocks to the base station 2 via the wireless signal transmitting and receiving unit 316.

The wireless transfer block receiving unit 213 included in the base station 2 extracts the wireless transfer blocks out of the signals that have been received via the wireless signal transmitting and receiving unit 211 and outputs the extracted wireless transfer blocks to the re-transmission control unit 214. The re-transmission control unit 214 judges whether each of the wireless transfer blocks has properly been received. In the case where each of the wireless transfer blocks has properly been received, the re-transmission control unit 214 outputs the wireless transfer block to the packet reproducing unit 215. Also, the re-transmission control unit 214 notifies the re-transmission control signal transmitting unit 212 that the wireless transfer block has properly been received and also notifies the scheduler unit 219 of delivery acknowledgment information containing information that identifies the mobile station 3 from which the wireless transfer block that has properly been received was transmitted and the size of the wireless transfer block that has been received.

When all the wireless transfer blocks that constitute the packet have properly been received and the packet has been reproduced, the packet reproducing unit 215 included in the base station 2 transmits the reproduced packet to the wired network 1 via the wired signal transmitting unit 216.

When the scheduler unit 219 included in the base station 2 has been notified that each of the wireless transfer blocks has properly been received, the scheduler unit 219 updates the delivery acknowledged amount accumulated value that is stored therein in correspondence with the mobile station 3.

On the contrary, in the case where any one of the wireless transfer blocks has not properly been received, the re-transmission control unit 214 included in the base station 2 discards such a wireless transfer block and notifies the re-transmission control signal transmitting unit 212 that the wireless transfer block has not properly been received.

In the case where the re-transmission control signal transmitting unit 212 included in the base station 2 has been notified that any one of the wireless transfer blocks has not properly been received, the re-transmission control signal transmitting unit 212 transmits a re-transmission request as the re-transmission control information to the mobile station 3 via the wireless signal transmitting and receiving unit 211. On the contrary, in the case where the re-transmission control signal transmitting unit 212 has been notified that each of the wireless transfer blocks has properly been received, the re-transmission control signal transmitting unit 212 transmits a delivery acknowledgment as the re-transmission control information to the mobile station 3 via the wireless signal transmitting and receiving unit 211.

Based on the re-transmission control information that has been received via the wireless signal transmitting and receiving unit 316 and the re-transmission control signal receiving unit 315, the re-transmission control unit 314 included in the mobile station 3 determines whether a re-transmission process should be performed in units of wireless transfer blocks. In the case where the re-transmission control information is a re-transmission request for requesting that the wireless transfer block should be re-transmitted, the re-transmission control unit 314 performs the predetermined re-transmission process on the wireless transfer block for which the re-transmission has been requested.

Next, an operation of the scheduler unit 219 included in the base station 2 will be explained in detail, with reference to the flowchart in FIG. 11 and FIG. 12. When the scheduler unit 219 has received a transmission request from the transmission request receiving unit 218 (Step S300), the scheduler unit 219 stores therein a delivery acknowledged amount accumulated value that has been initialized (in this case, "0") and packet size information contained in the transmission request in correspondence with the mobile station 3 that transmitted the transmission request (Step S301).

When the scheduler unit 219 has been notified by the re-transmission control unit 214 that each of the wireless transfer blocks has properly been received (delivery acknowledgment information has been transmitted to the mobile station 3) (Step S302), the scheduler unit 219 adds a delivery acknowledged amount to the delivery acknowledged amount accumulated value that has been stored therein in correspondence with the mobile station 3 to which the delivery acknowledgment is transmitted so as to update the delivery acknowledged amount accumulated value (Step S303).

Next, changes in the delivery acknowledged amount accumulated value in the case where a focus is placed on a packet transmitted from the mobile station 3-1 will be explained with reference to FIG. 12. In FIG. 12, each of the numbers shown in a packet 6 in the mobile station 3-1, wireless transfer blocks 61*a*, 61*b*-1 to 61*b*-3, and 61*c*, wireless transfer blocks 62*a*, 62*b*-1 to 62*b*-3, and 62*c* on the wireless communication link, wireless transfer blocks 63*a* to 63*c* in the base station 2, and a packet 64 in the base station 2 indicates the size of the wireless transfer block or the packet that is expressed by normalizing the packet size of the packet 6 to "1". Each of the delivery acknowledged amount accumulated values and the numbers in the parentheses in the wireless transfer blocks 62*a*, 62*b*-1 to 62*b*-3, and 62*c* is an accumulated value of the delivery acknowledged amounts that is expressed by normalizing the packet 6 to "1".

When the packet 6 to be transmitted has been generated, the mobile station 3-1 transmits a transmission request 65 to the base station 2. When having received the transmission request 65, the base station 2 specifies the delivery acknowledged amount accumulated value that has been stored in correspondence with the mobile station 3-1 to "0". The base station 2 transmits, to the mobile station 3-1, transmission instructions 66*a*, 66*b*-1 to 66*b*-3, and 66*c* containing the information of the wireless transfer block sizes (wireless transfer block size information) that have been determined based on the wireless communication link quality information at the predetermined scheduling times and the information of the wireless resources (wireless resource information) that have been allocated during the scheduling process.

When having received the transmission instruction 66*a* indicating the wireless transfer block size information as "0.5", the mobile station 3-1 generates the wireless transfer block 61*a* of which the size is "0.5" as the first wireless transfer block that constitutes the packet 6. The mobile station 3-1 then transmits the generated wireless transfer block 61*a* onto the wireless communication link as the wireless transfer block 62*a*.

The base station 2 receives the wireless transfer block 62*a* that has been put on the wireless communication link. Because the wireless transfer block 62*a* has properly been received as the wireless transfer block 63*a*, a delivery acknowledged amount "0.5" is added to the delivery acknowledged amount accumulated value "0.0" corresponding to the mobile station 3-1, so that the delivery acknowledged amount accumulated value is updated to "0.5".

When having received the transmission instruction 66*b*-1 indicating the wireless transfer block size information as "0.2", the mobile station 3-1 generates the wireless transfer block 61*b*-1 of which the size is "0.2" as the second wireless transfer block that constitutes the packet 6 and transmits the generated wireless transfer block 61*b*-1 onto the wireless communication link as the wireless transfer block 62*b*-1.

The base station 2 receives the wireless transfer block 62*b*-1 that has been put on the wireless communication link. Because the base station 2 is not able to properly receive the wireless transfer block 62*b*-1, the base station 2 transmits a re-transmission request to the mobile station 3-1. Because the wireless transfer block 62*b*-1 has not properly been received, the delivery acknowledged amount accumulated value corresponding to the mobile station 3-1 remains "0.5".

When having received the transmission instruction 66*c* indicating the wireless transfer block size information as "0.3", the mobile station 3-1 generates the wireless transfer block 61*c* of which the size is "0.3" as the third (in this case, the last) wireless transfer block that constitutes the packet 6 and transmits the generated wireless transfer block 61*c* onto the wireless communication link as the wireless transfer block 62*c*.

The base station 2 receives the wireless transfer block 62*c* that has been put on the wireless communication link. Because the wireless transfer block 62*c* has properly been received as the wireless transfer block 63*c*, a delivery acknowledged amount "0.3" is added to the delivery acknowledged amount accumulated value "0.5" corresponding to the mobile station 3-1, so that the delivery acknowledged amount accumulated value is updated to "0.8".

When having received the transmission instruction 66*b*-2 indicating the wireless transfer block size information as "0.2", the mobile station 3-1 transmits the wireless transfer block 61*b*-2 that is the second wireless transfer block that constitutes the packet 6 for which a re-transmission has been requested, onto the wireless communication link as the wireless transfer block 62*b*-2.

The base station 2 receives the wireless transfer block 62*b*-2 that has been put on the wireless communication link. Because the base station 2 is not able to properly receive the wireless transfer block 62*b*-2, the base station 2 transmits a re-transmission request to the mobile station 3-1. Because the wireless transfer block 62*b*-2 has not properly been received, the delivery acknowledged amount accumulated value corresponding to the mobile station 3-1 remains "0.8".

When having received the transmission instruction 66*b*-3 indicating the wireless transfer block size information as "0.2", the mobile station 3-1 transmits the wireless transfer block 61*b*-3 that is the second wireless transfer block that constitutes the packet 6 for which a re-transmission has been requested, onto the wireless communication link as the wireless transfer block 62*b*-3.

The base station 2 receives the wireless transfer block 62*b*-3 that has been put on the wireless communication link. Because the wireless transfer block 62*b*-3 has properly been received as the wireless transfer block 63*b*, a delivery acknowledged amount "0.2" is added to the delivery acknowledged amount accumulated value "0.8" corresponding to the mobile station 3-1. As a result, the delivery acknowledged amount accumulated value has become "1". It means that the wireless transfer blocks 61*a* to 61*c* that constitute the packet 6 have been delivered. Accordingly, when the delivery acknowledged amount accumulated value has become "1", the base station 2 judges that the reception of all the wireless transfer blocks that constitute the packet has been completed and discards the delivery acknowledged amount accumulated value that has been stored in correspondence with the mobile station 3-1. Subsequently, the base station 2 reproduces the packet 64 by using the wireless transfer blocks 63*a* to 63*c*.

In the same manner as explained above while the focus is placed on the packet transmitted from the mobile station 3-1, when the scheduler unit 219 included in the base station 2 has received a transmission request from any one of the mobile stations 3, the scheduler unit 219 initializes the delivery acknowledged amount accumulated value that is stored in correspondence with the mobile station 3. Every time a wireless transfer block has properly been received, the scheduler unit 219 updates the corresponding delivery acknowledged amount accumulated value.

Figure 11:
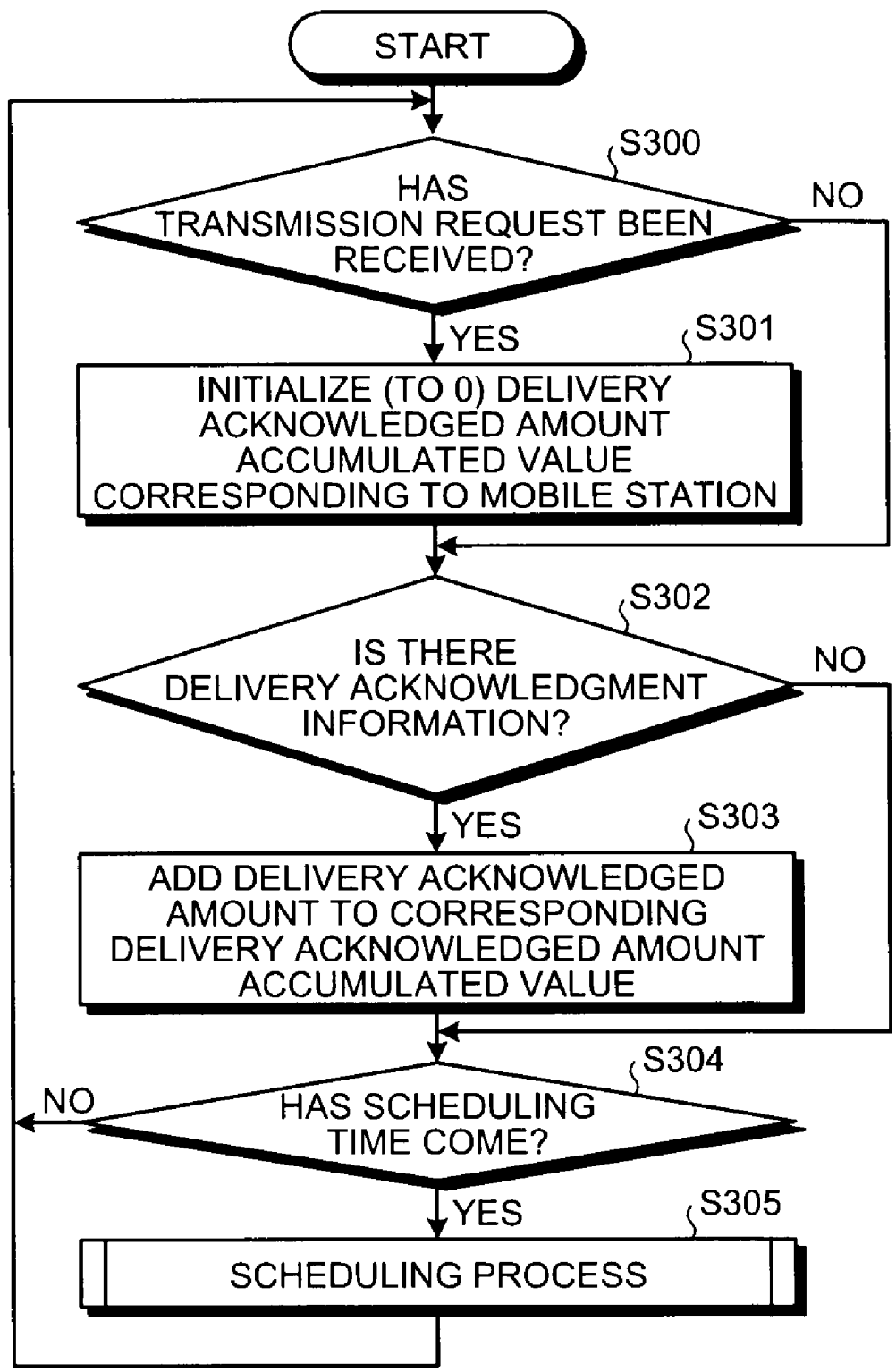
FIG. 11 is a flowchart for explaining an operation of a scheduler of the base station according to the second embodiment of the present invention.
Figure 12:
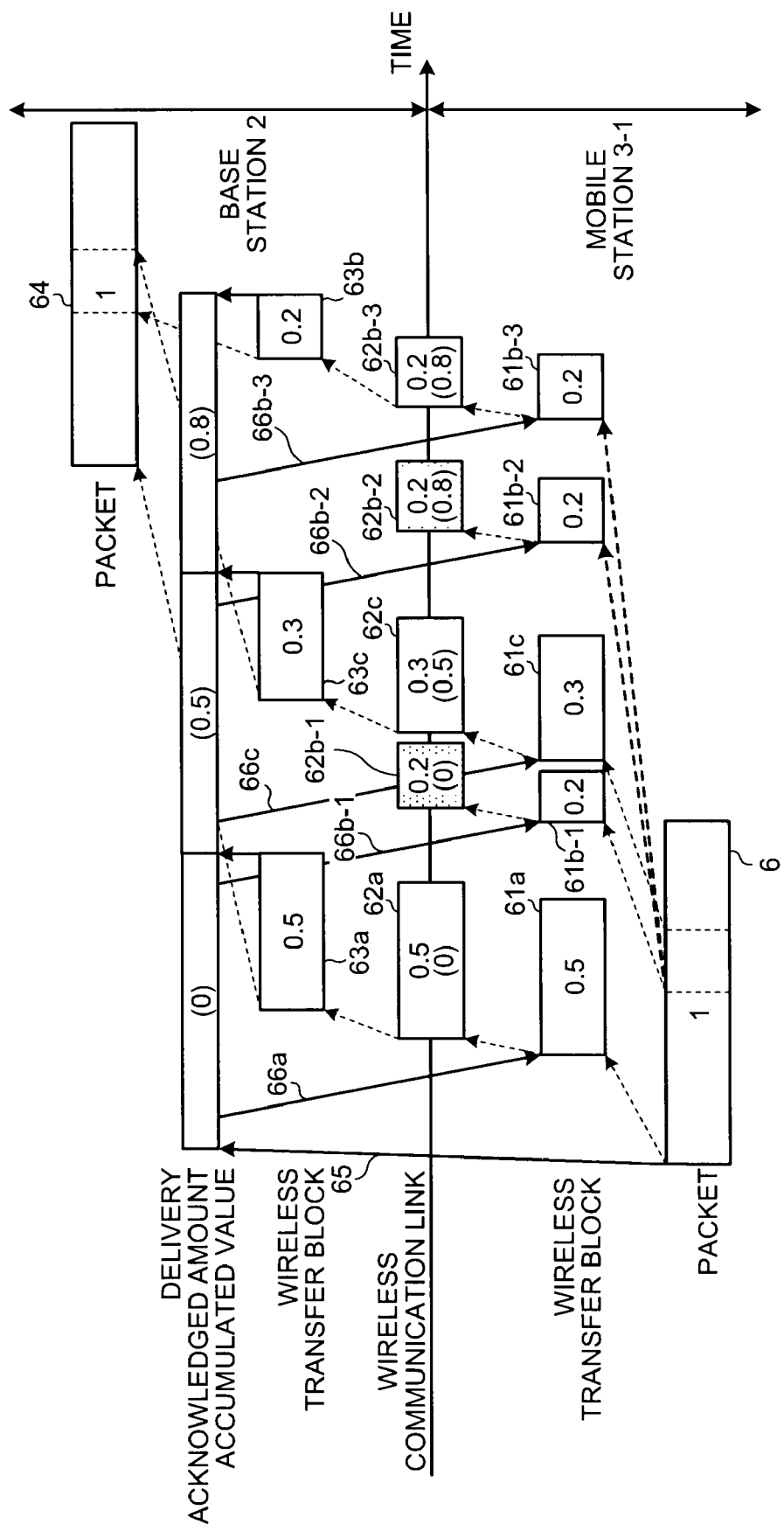
FIG. 12 is a drawing for explaining changes in a delivery acknowledged amount accumulated value while a focus is placed on a packet transmitted from a mobile station.

Returning to the description of FIG. 11, when the predetermined scheduling time has come (Step S304), the scheduler unit 219 performs a scheduling process of determining the priority level of each of the packets based on a corresponding one of the delivery acknowledged amount accumulated values that are respectively stored therein in correspondence with the mobile stations 3 and allocating a wireless resource to each of the mobile stations 3 according to the determined priority levels (Step S305). The scheduling process is the same as the operation explained above with reference to the flowchart in FIG. 6. Thus, the explanation thereof will be omitted.

As explained above, according to the second embodiment, the base station 2 determines the sizes of the wireless transfer blocks based on the packet length contained in the transmission request that has been received from each of the mobile stations 3 and the wireless communication link quality information. The base station 2 also determines the priority levels based on the delivery acknowledged amount accumulated values each indicating an accumulated value of the sizes of the wireless transfer blocks that have properly been received among the wireless transfer blocks transmitted by each of the mobile stations 3. The base station 2 then allocates the wireless resources to the wireless transfer blocks that constitute each of the packets to be transmitted by the mobile stations 3 based on the determined priority levels. The base station 2 transmits the transmission instructions containing the sizes of the wireless transfer blocks and the allocation of the wireless resources to each of the mobile stations 3. Each of the mobile stations 3 generates the wireless transfer blocks by dividing the packet to be transmitted, based on the wireless transfer block sizes contained in the transmission instructions. Each of the mobile stations 3 then transmits, to the base station 2, the generated wireless transfer blocks based on the allocation of the wireless resources contained in the transmission instructions. As a result, in the case where each packet is divided into a plurality of wireless transfer blocks and transmitted, it is possible to lower the possibility of wasting the wireless transfer blocks that are already acknowledged as having been delivered, in the situation where some wireless transfer blocks fail to reach the transmission destination and the packet therefore fails to be reproduced. Consequently, it is possible to effectively utilize the wireless communication link.

Also, according to the second embodiment, the priority levels are determined in such a manner that the larger the delivery acknowledged amount accumulated value is, the higher is the priority level, so that the wireless transfer blocks that belong to a packet in which delivery acknowledgments have been received for a larger percentage thereof are transmitted with a higher priority. Thus, in the case where there is no other choice but to discard some wireless transfer blocks, the wireless transfer blocks that belong to a packet in which delivery acknowledgments have been received for a smaller percentage thereof are discarded. Thus, it is possible to reduce the quantity of the wireless transfer blocks that are discarded due to the base station 2 being unable to assemble the packet. Thus, it is possible to effectively utilize the frequency or to improve the throughput on the packet level.

In the second embodiment, the example is explained in which the mobile station 3 divides the packet into the wireless transfer blocks. However, another communication system as shown in FIG. 8 is also applicable in which the base station control device 5 is provided between the wired network 1 and the base station 2 shown in FIG. 1. In this situation, the wireless transfer block generating unit 313 included in the mobile station 3 generates divided segments by dividing the packet to be transmitted and further generates the wireless transfer blocks by dividing the generated divided segments. The packet reproducing unit 215 included in the base station 2 reproduces the divided segments from the wireless transfer blocks and transmits the reproduced divided segments to the base station control device 5, so that the base station control device 5 reproduces the packet from the divided segments.

Third Embodiment

Next, a third embodiment of the present invention will be explained, with reference to FIGS. 13 and 14. In the first and the second embodiments described above, the wireless resources are allocated by determining the priority levels in such a manner that the priority levels of such wireless transfer blocks are high that constitute a packet in which delivery acknowledgments have been received for a larger percentage thereof. As a result, it is possible to reduce the quantity of the wireless transfer blocks that are discarded due to incapability of reproducing the packet. Consequently, it is possible to effectively utilize the frequency and to improve the throughput on the packet level.

In the methods described above, however, the stay permitted period after the packet has reached the base station 2 from the wired network 1 or after the mobile station 3 has got the packet that needs to be transmitted is not taken into consideration. Thus, in the case where the stay permitted period has expired before the number of times of re-transmission has reached the upper limit value, it is not possible to lower the possibility of wasting the wireless transfer blocks that have already been transmitted.

To solve this problem, according to the third embodiment, the stay permitted period is taken into consideration to determine the priority levels during the scheduling process of allocating the wireless transfer blocks to the wireless resources. More specifically, the stay permitted period is specified for a time period from the time at which a packet has arrived at a transmission-side device and to the time at which a delivery acknowledgment is made, so that any packets that have exceeded the stay permitted period are discarded. In addition, a time period that elapses before the staying packet is discarded due to the packet's exceeding the stay permitted period will be referred to as a stay suspended period.

The configuration of the communication system according to the third embodiment is the same as that of the communication system shown in FIG. 1. Thus, the explanation thereof will be omitted. Also, the configurations of the base station 2 and the mobile station 3 that perform a downstream communication are the same as those of the base station 2 and the mobile station 3 according to the first embodiment shown in FIGS. 2 and 3. The configurations of the base station 2 and the mobile station 3 that perform an upstream communication are the same as those of the base station 2 and the mobile station 3 according to the second embodiment shown in FIGS. 10 and 9. Thus, the explanation thereof will be omitted.

The difference between the third embodiment and the first or the second embodiment described above is only the operation of determining the priority levels during the scheduling process that is explained above with reference to the flowchart in FIG. 6. Thus, in the following sections, only the operation in the scheduling process including the operation of determining the priority levels will be explained, while using a downstream communication as an example.

When having been notified by the packet buffer 202 that a new packet has been received, the scheduler unit 208 initializes the delivery acknowledged amount accumulated value and stores the initialized value therein. The scheduler unit 208 also starts measuring the stay permitted period for the new packet by using a clocking function included in the base station 2, so that the scheduler unit 208 is able to always keep track of the stay permitted period of each of the packets.

Figure 13:
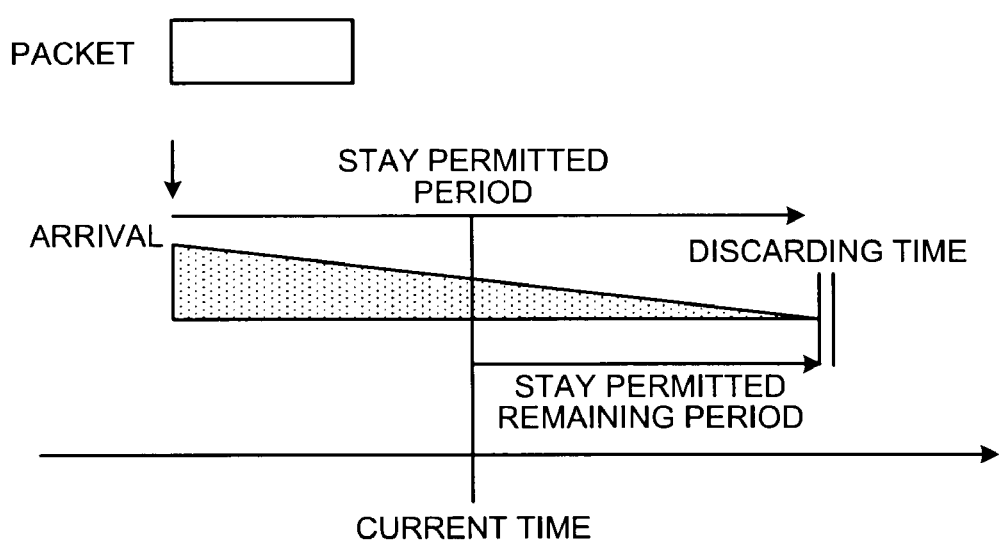
FIG. 13 is a drawing for explaining an example of a stay permitted period while a focus is placed on one specific packet, according to a third embodiment of the present invention.
Figure 14:
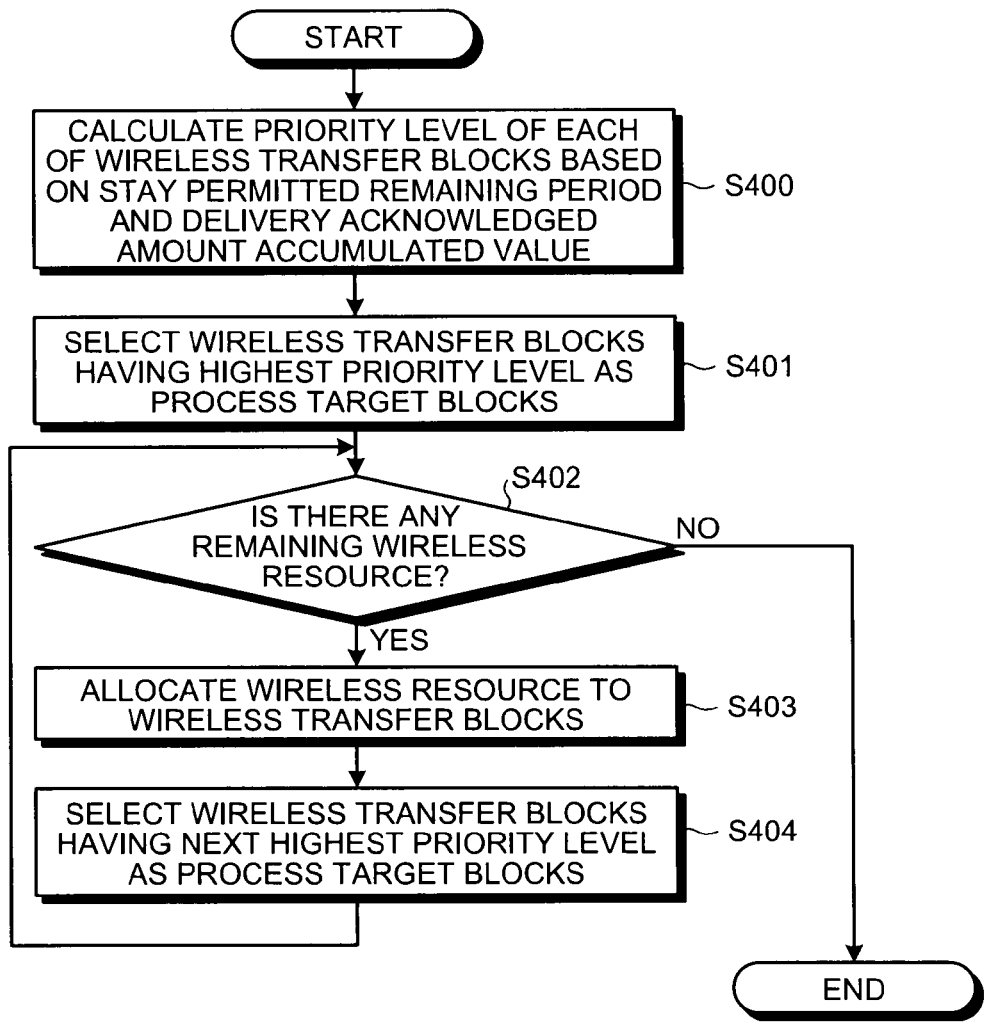
FIG. 14 is a flowchart for explaining an operation in a scheduling process performed by a scheduler unit of a base station according to the third embodiment of the present invention.

FIG. 13 is a drawing for explaining an example of the stay permitted period while a focus is placed on one specific packet. In FIG. 13, for the packet that has been buffered into the packet buffer 202 included in the base station 2, the stay permitted period starts being measured when the packet has arrived. In the case where it is not possible to receive, from the mobile station 3, the delivery acknowledgments for all the wireless transfer blocks constituting the packet within the stay permitted period after the arrival of the packet, the scheduler unit 208 discards the corresponding packet. The closer the current time gets to the discarding time, the shorter the stay permitted remaining period becomes. The scheduler unit 208 allocates the wireless resources to the wireless transfer blocks in such a manner that the shorter the stay permitted remaining period is, the higher is the priority level.

Next, an operation in the scheduling process according to the third embodiment will be explained, with reference to the flowchart in FIG. 14. The scheduler unit 208 calculates the priority level of each of the wireless transfer blocks that constitute a packet, based on the stay permitted remaining period and the delivery acknowledged amount accumulated value (Step S400). More specifically, the scheduler unit 208 calculates a priority level Ptotal of each of the wireless transfer blocks by using an expression shown below, with coefficients of two priority level indexes for the stay permitted remaining period and the delivery acknowledged amount accumulated value.

$$P\text{total} = \alpha \times P\text{act} + B \times P\text{delay} \quad \text{(Expression)}$$

In the expression shown above, "Pact" denotes a priority level based on the delivery acknowledged amount accumulated value, whereas "Pdelay" denotes a priority level based on the stay permitted remaining period. "α" denotes a coefficient (weight) for the priority level based on the delivery acknowledged amount accumulated value, whereas "B" denotes a coefficient (weight) for the priority level based on the stay permitted remaining period. In other words, the scheduler unit 208 determines the priority levels in such a manner that the priority level based on the delivery acknowledged amount accumulated value becomes higher as the delivery acknowledged amount accumulated value becomes larger and in such a manner that the priority level based on the stay permitted remaining period becomes higher as the stay permitted remaining period becomes shorter. The scheduler unit 208 then uses a value obtained by weighting the priority level based on the delivery acknowledged amount accumulated value and the priority level based on the stay permitted remaining period and adding the weighted values together, as the priority level of the wireless transfer block.

The scheduler unit 208 selects the wireless transfer blocks that constitute the packet having the highest priority level as the process target blocks (Step S401). In other words, the scheduler unit 208 selects the process target blocks on the basis that a wireless transfer block having a small value for the priority level Ptotal calculated by using the expression above, as a wireless transfer block having a high priority level.

The scheduler unit 208 judges whether there is any remaining wireless resource (Step S402). In the case where there is a remaining wireless resource, the scheduler unit 208 allocates a wireless resource to the wireless transfer blocks that have been selected as the process target blocks (Step S403).

The scheduler unit 208 then selects, as new process target blocks, the wireless transfer blocks that constitute the packet having the next highest priority level after the packet constituted with the wireless transfer blocks that are currently selected as the process target blocks (Step S404).

The scheduler unit 208 repeats the operation of allocating a wireless resources to the wireless transfer blocks that have been selected as the process target blocks and selecting, as new process target blocks, the wireless transfer blocks that constitute the packet having the next highest priority level after the packet constituted with the wireless transfer blocks that are currently selected as the process target blocks, until there is no remaining wireless resource (Steps S402 to S404).

As explained above, according to the third embodiment, the priority levels are determined based on the stay permitted remaining periods and the delivery acknowledged amount accumulated values, the stay permitted remaining periods each indicating the time period from a current time to a time until which the wireless transfer blocks are permitted to stay. Thus, it is possible to inhibit discarding of wireless transfer blocks caused by a packet's exceeding the stay permitted period. As a result, in the case where each packet is divided into a plurality of wireless transfer blocks and transmitted, it is possible to lower the possibility of wasting the wireless transfer blocks that are already acknowledged as having been delivered, in the situation where some wireless transfer blocks fail to reach the transmission destination and the packet therefore fails to be reproduced. Consequently, it is possible to effectively utilize the wireless communication link.

According to the third embodiment, the priority levels are determined based on the stay permitted remaining periods and the delivery acknowledged amount accumulated values. However, another arrangement is acceptable in which the priority levels are determined based on the wireless communication link quality information and the delivery acknowledged amount accumulated values or a combination of the wireless communication link quality information, the stay permitted remaining periods, and the delivery acknowledged amount accumulated values. In the case where the wireless communication link quality information is used, the priority levels may be determined in such a manner that the better the state of the communication link is according to the wireless communication link quality information, the higher is the priority level.

Fourth Embodiment

A fourth embodiment of the present invention will be explained, with reference to FIG. 15. According to the first to the third embodiments, the priority levels with which the wireless resources are allocated to the wireless transfer blocks constituting the packets are determined by using the delivery acknowledged amount accumulated values or the stay permitted remaining periods. According to the fourth embodiment, transmission quality is controlled by using the priority levels.

The configuration of the communication system according to the fourth embodiment is the same as that of the communication system shown in FIG. 1. Thus, the explanation thereof will be omitted. Also, the configurations of the base station 2 and the mobile station 3 that perform a downstream communication are the same as those of the base station 2 and the mobile station 3 according to the first embodiment shown in FIGS. 2 and 3. The configurations of the base station 2 and the mobile station 3 that perform an upstream communication are the same as those of the base station 2 and the mobile station 3 according to the second embodiment shown in FIGS. 10 and 9. Thus, the explanation thereof will be omitted.

The difference between the fourth embodiment and the first or the third embodiment described above is that the wireless communication link quality information that has been extracted by the wireless communication link quality information receiving unit 209 is corrected by using the priority levels that have been determined by the scheduler unit 208 based on the delivery acknowledged amounts and the stay permitted remaining periods, so that the transmission quality is controlled by using the corrected wireless communication link quality information. Thus, in the following sections, only the controlling of the transmission quality will be explained, while using a downstream communication as an example.

The scheduler unit 208 includes a wireless communication link quality information table to control the transmission quality by using the wireless communication link quality information. As shown in FIG. 15, in the wireless communication link quality information table, a modulation method, an encoding ratio, and a transmission power are registered in correspondence with each of wireless communication link quality values. The scheduler unit 208 corrects the wireless communication link quality information that has been extracted by the wireless communication link quality information receiving unit 209, selects the modulation method, the encoding ratio, and the transmission power that are registered in correspondence with the corrected wireless communication link quality information, and notifies the wireless transfer block transmitting unit 207 of the selected items. The wireless transfer block transmitting unit 207 transmits the wireless transfer blocks via the wireless signal transmitting and receiving unit 206 by using the modulation method, the encoding ratio, and the transmission power that have been indicated in the notification.

Next, an operation to correct the wireless communication link quality information will be explained. The scheduler unit 208 receives the wireless communication link quality information from the wireless communication link quality information receiving unit 209. The scheduler unit 208 determines the priority levels of the wireless transfer blocks that constitute the packets by using the delivery acknowledged amounts or the stay permitted remaining periods, as explained in the first to the third embodiments described above.

The scheduler unit 208 corrects the wireless communication link quality information by adding predetermined values to the wireless communication link quality information corresponding to wireless transfer blocks having higher priority levels. For example, the scheduler unit 208 adds "2" to the value of wireless communication link quality information corresponding to the wireless transfer block having the highest priority level and adds "1" to the value of the wireless communication link quality information corresponding to the wireless transfer block having the next highest priority level. As a result, the wireless transfer block that has the highest priority level and had a wireless communication link quality information value "4" now has a wireless communication link quality information value "6". Similarly, the wireless transfer block that has the second highest priority level and had a wireless communication link quality information value "3" now has a wireless communication link quality information value "4". Accordingly, the wireless transfer block having the highest priority level is transmitted by using the modulation method "16 Quadrature Amplitude Modulation (16QAM)", an encoding ratio "2/3", and a transmission power "20". The wireless transfer block having the second highest priority level is transmitted by using the modulation method "16QAM", an encoding ratio "1/3", and a transmission power "20".

As explained above, according to the fourth embodiment, the wireless communication link quality information is corrected by adding the predetermined values to the wireless communication link quality information of the wireless transfer blocks having higher priority levels, so that the transmission quality is selected based on the corrected wireless communication link quality information. Thus, it is possible to raise the possibility of being successfully received for the wireless transfer blocks having higher priority levels. As a result, it is possible to reduce the quantity of the wireless transfer blocks that are discarded due to incapability of assembling the packet. Consequently, it is possible to effectively utilize the frequency or to improve the throughput on the packet level.

According to the fourth embodiment, the wireless communication link quality information is corrected by adding the predetermined values to the values of the wireless communication link quality information according to the priority levels. However, another arrangement is acceptable in which the wireless communication link quality information is corrected by subtracting predetermined values from the values of the wireless communication link quality information. In this situation, the wireless communication link quality information values are corrected, starting with the wireless communication link quality information value corresponding to the wireless transfer block having the lowest priority level and in the ascending order of the priority levels. In other words, the wireless communication link quality information is corrected relative to the priority levels.

Also, according to the fourth embodiment, the transmission quality is represented by the modulation method, the encoding ratio, or the transmission power. However, it is acceptable to use the frequency or a space diversity effect as the transmission quality.

Fifth Embodiment

In commonly-used communication systems, re-transmission control is exercised between the transmission side and the reception side, and the wireless transfer blocks that have exceeded the upper limit value of the number of times of re-transmission are discarded without being re-transmitted. Thus, the wireless transfer blocks that have exceeded the upper limit value of the number of times of re-transmission never reach the reception side. Thus, a problem arises where it is not possible to reproduce the packet, and the other wireless transfer blocks are wasted.

To solve this problem, according to a fifth embodiment of the present invention, the upper limit value of the number of times of re-transmission for wireless transfer blocks is controlled by using the priority levels that are determined based on the number of times of delivery and the stay permitted remaining period. The configuration of the communication system according to the fifth embodiment is the same as that of the communication system shown in FIG. 1. Thus, the explanation thereof will be omitted. Also, the configurations of the base station 2 and the mobile station 3 that perform a downstream communication are the same as those of the base station 2 and the mobile station 3 according to the first embodiment shown in FIGS. 2 and 3. The configurations of the base station 2 and the mobile station 3 that perform an upstream communication are the same as those of the base station 2 and the mobile station 3 according to the second embodiment shown in FIGS. 10 and 9. Thus, the explanation thereof will be omitted.

The difference between the fifth embodiment and the first to the fourth embodiments described above is that the scheduler unit 208 or 219 corrects the upper limit value of the number of times of re-transmission by using the priority levels that have been determined by using the delivery acknowledged amounts and the stay permitted remaining periods, so that the re-transmission process is controlled by using the corrected upper limit value of the number of times of re-transmission. Thus, in the following sections, only the operation of determining the upper limit value used in the transmission and re-transmission control will be explained, while using a downstream communication as an example.

As explained in the first to the third embodiments above, the scheduler unit 208 determines the priority levels of the wireless transfer blocks that constitute the packets by using the delivery acknowledged amounts or the stay permitted remaining periods. The scheduler unit 208 corrects the upper limit value of the number of times of re-transmission by adding a predetermined value to the upper limit value of the number of times of re-transmission for the wireless transfer blocks having higher priority levels. The scheduler unit 208 notifies the re-transmission control unit 204 of the corrected upper limit value of the number of times of re-transmission.

The re-transmission control unit 204 exercises re-transmission control by using the upper limit value of the number of times of re-transmission that has been indicated in the notification. In other words, the re-transmission control unit 204 stores therein the number of times each wireless transfer block is transmitted to the mobile station 3, so that, when the number of times of re-transmission has exceeded the upper limit value of the number of times of re-transmission, the re-transmission control unit 204 discards such a wireless transfer block.

As explained above, according to the fifth embodiment, in the case where a plurality of wireless transfer blocks are generated from each packet and transmitted, the upper limit value of the number of times of re-transmission is raised to a larger value according to the priority level. Thus, a larger upper limit value of the number of times of re-transmission is specified for such wireless transfer blocks that belongs to a packet in which delivery acknowledgments have been received for a larger percentage thereof. As a result, it is possible to lower the possibility of wasting the wireless transfer blocks that are already acknowledged as having been delivered, in the situation where some wireless transfer blocks fail to reach the mobile station 3 and the packet therefore fails to be reproduced. Consequently, it is possible to effectively utilize the wireless communication link.

Also, in the case where there is no other choice but to discard some wireless transfer blocks, the wireless transfer blocks that belong to a packet in which delivery acknowledgments have been received for a smaller percentage thereof are discarded. Thus, it is possible to reduce the quantity of the wireless transfer blocks that are discarded due to the mobile station 3 being unable to assemble the packet. Consequently, it is possible to effectively utilize the frequency or to improve the throughput on the packet level.

In the description of the fifth embodiment, the downstream communication is used as the example. However, for an upstream communication, the scheduler unit 219 determines the upper limit value of the number of times of re-transmission for the wireless transfer blocks according to the priority levels, in the same manner as described for the downstream communication. In this situation, the scheduler unit 219 notifies the mobile station 3 of the upper limit value of the number of times of re-transmission that has been determined, so that the re-transmission control unit 314 included in the mobile station 3 exercises the re-transmission control by using the upper limit value of the number of times of re-transmission that has been indicated in the notification.

Sixth Embodiment

In a sixth embodiment of the present invention, the transmission quality for wireless transfer blocks is changed according to the number of wireless transfer blocks that constitute each packet, so that the error ratios of the packets are maintained at a certain level. The configuration of the communication system according to the sixth embodiment is the same as that of the communication system shown in FIG. 1. Thus, the explanation thereof will be omitted. Also, the configurations of the base station 2 and the mobile station 3 that perform a downstream communication are the same as those of the base station 2 and the mobile station 3 according to the first embodiment shown in FIGS. 2 and 3. The configurations of the base station 2 and the mobile station 3 that perform an upstream communication are the same as those of the base station 2 and the mobile station 3 according to the second embodiment shown in FIGS. 10 and 9. Thus, the explanation thereof will be omitted.

In the description of the sixth embodiment, only the operation of determining the number of wireless transfer blocks that constitute each of the packets (packet dividing number) and the transmission quality, based on the packet length and the wireless transmission quality information will be explained.

The scheduler unit 208 includes a packet table from which the number of wireless transfer blocks and a transmission quality value can be selected according to a packet length. As shown in FIG. 16, in the packet table, transmission quality indexes and packet dividing numbers are registered in correspondence with packet lengths and wireless communication link quality information values. In FIG. 16, in the case where the wireless communication link quality information value is "1" and the packet length is "200 bytes", the transmission quality index is registered as "2", whereas the packet dividing number is registered as "2". As another example, in the case where the wireless communication link quality information value is "1" and the packet length is "400 bytes", the transmission quality index is registered as "2", whereas the packet dividing number is registered as "4".

When having been notified by the packet buffer 202 that a new packet has been received, the scheduler unit 208 conducts a search in the packet table shown in FIG. 16 by using the packet length of the new packet and the wireless communication link quality information provided by the wireless communication link quality information receiving unit 209 and selects a transmission quality index and a packet dividing number.

The scheduler unit 208 selects a modulation method, an encoding ratio, or a transmission power that is predetermined, according to the selected transmission quality index and notifies the wireless transfer block transmitting unit 207 of the selected item. Also, the scheduler unit 208 notifies the wireless transfer block generating unit 203 of the selected packet dividing number. The wireless transfer block generating unit 203 divides the packet into as many sections as the packet dividing number indicated in the notification, so as to generate wireless transfer blocks.

The wireless transfer block transmitting unit 207 transmits, via the wireless signal transmitting and receiving unit 206, the wireless transfer blocks that have been generated by the wireless transfer block generating unit 203, by using the modulation method, the encoding ratio, or the transmission power that has been indicated in the notification from the scheduler unit 208, while using the wireless resource that has been allocated by the scheduler unit 208 during the scheduling process as explained in the first to the third embodiments described above.

As explained above, according to the sixth embodiment, the sizes of the wireless transfer blocks into which each of the packets is divided and the transmission quality are selected based on the packet length and the wireless communication link quality information. Thus, even if the packet length or the wireless communication quality has changed, it is possible to inhibit degradation of the error ratios of the packets.

According to the sixth embodiment, the transmission quality is represented by the modulation method, the encoding ratio, or the transmission power. However, it is acceptable to use the frequency or a space diversity effect as the transmission quality.

Also, in the description of the sixth embodiment, the scheduler unit 208 selects the transmission quality index and the packet dividing number, at the point in time when a new packet has been received from the packet buffer 202. However, another arrangement is acceptable in which a transmission quality index and a packet dividing number are obtained every time a wireless transfer block is transmitted, by using the most updated wireless communication link quality information at that point in time.

Further, the description of the sixth embodiment does not mention the timing with which the wireless transfer blocks into which the packet has been divided are transmitted. However, to maintain the accuracy of the transmission quality index and the packet dividing number that are determined at the point in time when the new packet has been received, an arrangement is acceptable in which a group of wireless transfer blocks that are obtained by dividing one packet are collectively transmitted in a short period of time during which the wireless communication link quality changes little.

Seventh Embodiment

Next, a seventh embodiment of the present invention will be explained with reference to FIGS. 17 to 19. In the first to the sixth embodiments described above, the example in which the mobile stations are connected to one base station is explained. An object of the seventh embodiment is to shorten the handover delay period (difference between a handover request time obtained by on measuring wireless communication link quality and the actual handover execution time) before completion of the delivery of a packet, by raising the priority levels of the wireless transfer blocks that have not yet been delivered when a handover is requested so that the connection between a mobile station and a currently-connected base station should be handed over to another base station.

Figure 17:
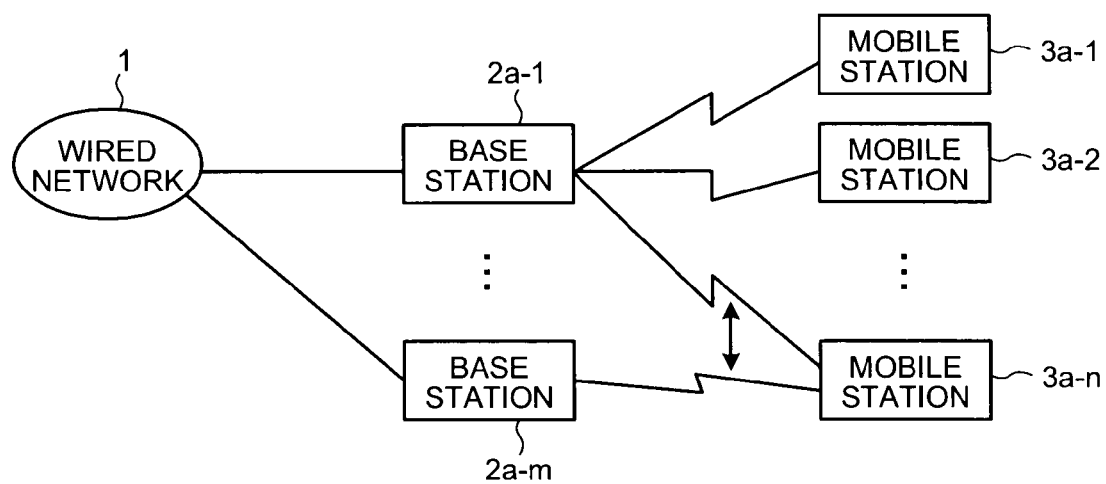
FIG. 17 is a diagram of a communication system according to a seventh embodiment of the present invention.
Figure 18:
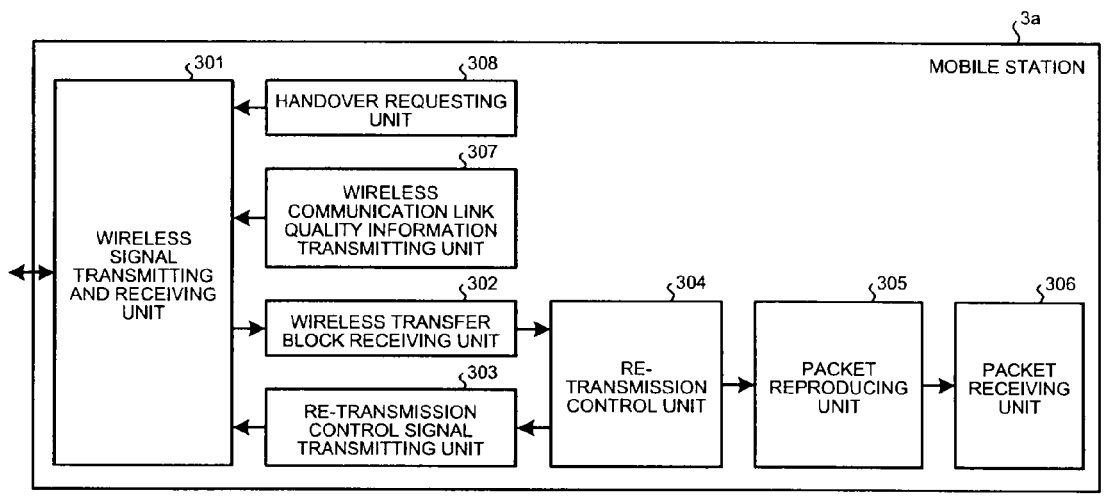
FIG. 18 is a block diagram for explaining a configuration related to a downstream communication performed by any one of mobile stations shown in FIG. 17.

FIG. 17 is a diagram of a communication system according to the seventh embodiment of the present invention. In FIG. 17, the communication system includes the wired network 1, base stations 2a (representing 2a-1 to 2a-m) of which the total quantity is equal to m (1<m, where m is a natural number), and mobile stations 3a (representing 3a-1 to 3a-n) of which the total quantity is equal to n. The wired network 1 and the base stations 2a are connected to one another via wired communication links. The base stations 2a and the mobile stations 3a are connected to one another via wireless communication links. Each of the mobile stations 3a performs a mutual communication by using packets, with a fixed terminal (not shown) connected to the wired network 1 or another mobile station, via any one of the base stations 2a and the wired network 1. Also, as each of the mobile stations 3a moves around, the connection thereof is subject to a handover performed between the base stations 2a.

In the seventh embodiment, a downstream communication in which the base station 2a transmits, to a mobile station 3a, a packet that has been received from the wired network 1 will be explained. FIG. 18 is a block diagram for explaining a configuration related to a downstream communication performed by any one of the mobile stations 3a shown in FIG. 17. In the configuration related to the downstream communication performed by the mobile station 3a shown in FIG. 18, a handover requesting unit 308 that requests a handover from the base station 2a is added to the configuration related to the downstream communication performed by the mobile station 3 shown in FIG. 3 explained above according to the first embodiment. The constituent components having the same functions as those in the configuration related to the downstream communication performed by the mobile station 3 shown in FIG. 3 explained above according to the first embodiment will be referred to by using the same reference characters, and the explanation of the common features will be omitted.

Once every predetermined period, the handover requesting unit 308 measures wireless communication link quality between the mobile station 3a that includes the handover requesting unit 308 and the base station 2a that is currently communicating with the mobile station 3a and between the mobile station 3a and another base station 2a that is positioned adjacent to the currently-communicating base station 2a and is able to communicate with the mobile station 3a. The handover requesting unit 308 then judges whether a handover from the currently-communicating base station 2a to the other base station 2a should be requested, based on the measured wireless communication link quality. In the case where the handover requesting unit 308 has judged that the handover should be requested, the handover requesting unit 308 transmits a handover request to the base station 2a, via the wireless signal transmitting and receiving unit 301.

Figure 19:
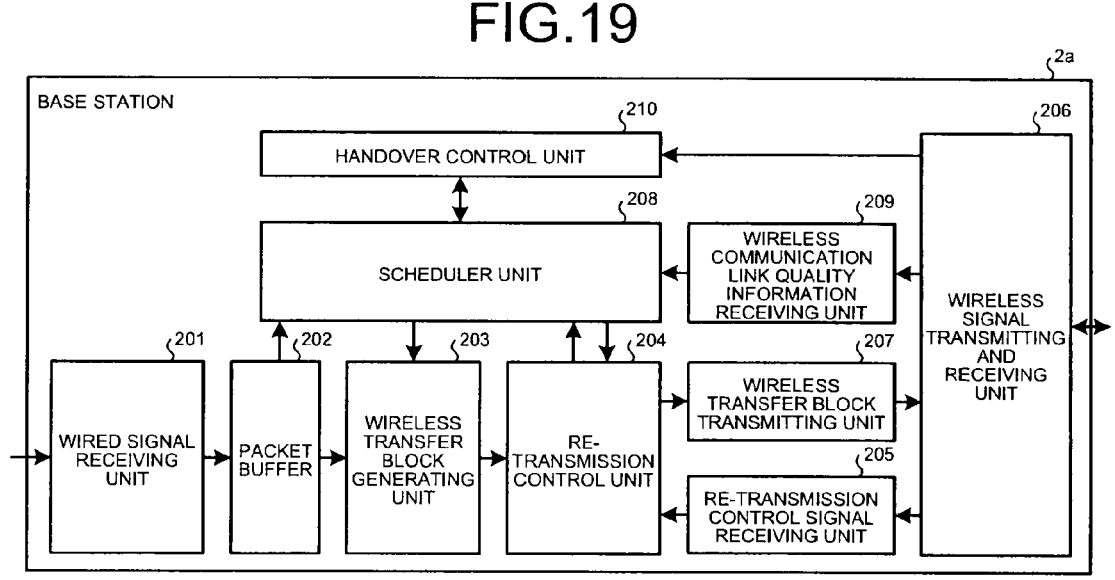
FIG. 19 is a block diagram for explaining a configuration related to a downstream communication performed by the any one of base stations shown in FIG. 17.

FIG. 19 is a block diagram for explaining a configuration related to the downstream communication performed by any one of the base stations 2a shown in FIG. 17. In the configuration related to the downstream communication performed by the base station 2a shown in FIG. 19, a handover control unit 210 that performs a handover process is added to the configuration related to the downstream communication performed by the base station 2 shown in FIG. 2 explained above according to the first embodiment. The constituent components having the same functions as those in the configuration related to the downstream communication performed by the base station 2 shown in FIG. 2 explained above according to the first embodiment will be referred to by using the same reference characters, and the explanation of the common features will be omitted.

When the handover control unit 210 has received the handover request from the mobile station 3a via the wireless signal transmitting and receiving unit 206, the handover control unit 210 outputs the received handover request to the scheduler unit 208. Also, when the handover control unit 210 has received a handover execution permission from the scheduler unit 208, the handover control unit 210 performs a process to execute the handover.

When the scheduler unit 208 has received the handover request from the handover control unit 210, the scheduler unit 208 raises the priority level and/or the transmission quality of the mobile station 3a that has made the handover request and performs a scheduling process on the wireless transfer blocks. Also, when the delivery of the packet to the mobile station 3a that has made the handover request has been completed, the scheduler unit 208 outputs a handover execution permission to the handover control unit 210.

Next, an operation of the communication system according to the seventh embodiment of the present invention will be explained. The difference between the seventh embodiment and the first or the third to the sixth embodiments described above is only the operation performed by the mobile station 3a in a handover. Thus, in the following sections, only the operation related to the handover will be explained.

When a measuring time that is scheduled once every predetermined period has come, the handover requesting unit 308 included in any one of the mobile stations 3a measures the wireless communication link quality between the mobile station 3a that includes the handover requesting unit 308 and the base station 2a that is currently connected to the mobile station 3a and between the mobile station 3a and another base station 2a that is positioned adjacent to the currently-communicating base station 2a and is able to communicate with the mobile station 3a. The handover requesting unit 308 then judges whether a handover should be executed, based on the measured wireless communication link quality. The handover requesting unit 308 judges whether a handover should be executed by using any commonly-used conventional technique. For example, in the case where the wireless communication link quality with the currently-connected base station 2a is equal to or lower than a predetermined threshold value, and also there is, among the base stations 2a that are able to communicate with the mobile station 3a, another base station 2a that has better wireless communication link quality than the wireless communication link quality with the currently-connected base station 2a, the handover requesting unit 308 judges that a handover should be executed. In the case where the handover requesting unit 308 has judged that a handover should be executed, the handover requesting unit 308 transmits a handover request to the base station 2a, via the wireless signal transmitting and receiving unit 301.

When having received the handover request, the handover control unit 210 included in the base station 2a outputs the received handover request to the scheduler unit 208. At the point in time when the scheduler unit 208 has received the handover request, the scheduler unit 208 raises the priority levels of undelivered wireless transfer blocks that constitute a packet that has not yet been delivered that is to be transmitted to the mobile station 3a that transmitted the handover request. As a result, in the scheduling process performed at the scheduling time, it is possible to specify the priority level of the mobile station 3a that transmitted the handover request so as to be the highest, without being dependent on the delivery acknowledged amount accumulated values. Consequently, it is possible to allocate the wireless resources while giving a higher priority to the wireless transfer blocks to be transmitted to the mobile station 3a that transmitted the handover request.

The scheduler unit 208 included in the base station 2a also specifies the transmission quality for the mobile station 3a that transmitted the handover request so as to be higher than the current transmission quality. The transmission quality may be represented by the modulation method, the encoding ratio, or the transmission power. For example, in the case where any one selected from "64QAM", "16QAM", and "Quadrature Phase Shift Keying (QPSK)" may be used as the modulation method and if the modulation method "64QAM" is currently specified for the mobile station 3a that transmitted the handover request, the scheduler unit 208 selects the modulation method "16QAM" or the modulation method "QPSK". Also, in the case where any one selected from "1/3", "1/2", and "2/3" may be used as the encoding ratio, and if the encoding ratio "2/3" is currently specified for the mobile station 3a that transmitted the handover request, the scheduler unit 208 selects the encoding ratio "1/3" or the encoding ratio "1/2". As for the transmission power, the scheduler unit 208 specifies a transmission power that is larger than the current transmission power.

When the delivery of the packet to the mobile station 3a that transmitted the handover request has been completed, the scheduler unit 208 included in the base station 2a outputs a handover execution permission to the handover control unit 210. When having received the handover execution permission, the handover control unit 210 starts the process to execute the handover.

As explained above, according to the seventh embodiment, when a handover request has been received from the mobile station 3a, the priority levels and/or the transmission quality of the undelivered wireless transfer blocks that constitute the packet that is currently being transmitted to the mobile station that transmitted the handover request are raised, without being dependent on the delivery acknowledged amount accumulated values. In addition, the handover is executed after the packet that is currently being transmitted to the mobile station that transmitted the handover request has finished being transmitted. As a result, it is possible to shorten the handover delay period. Thus, it is possible to raise the possibility of being able to execute the handover before the wireless communication link quality becomes lower. Consequently, it is possible to improve the communication quality.

In addition, it is also possible to reduce the number of undelivered packets in the downstream communication that need to be transferred between the base stations. Thus, it is possible to reduce the communication amount in the transmission path between the base stations.

In the description of the seventh embodiment, the example of the downstream communication in which the base station 2a transmits user data to the mobile station 3a is explained. However, it is possible to apply the present invention to an upstream communication in which a mobile station 3a transmits user data to the base station 2a. In this example also, it is possible to achieve the same advantageous effect. In this situation, the functions related to the upstream communication performed by the mobile station 3 shown in FIG. 9 explained above according to the second embodiment are configured so as to include the handover requesting unit 308 according to the seventh embodiment. The functions related to the upstream communication performed by the base station 2 shown in FIG. 10 explained above according to the second embodiment are configured so as to include the handover control unit 210 according to the seventh embodiment.

Eighth Embodiment

Figure 20:
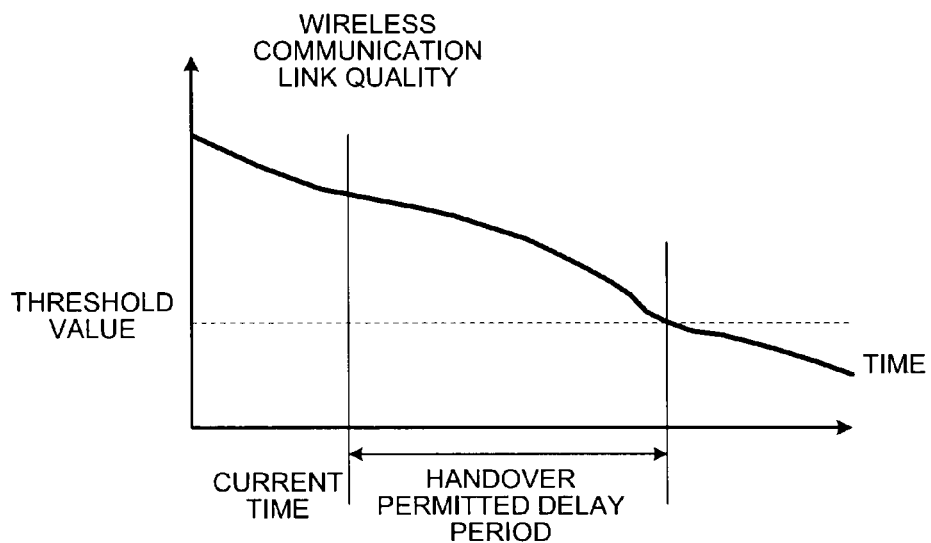
FIG. 20 is a chart for explaining a relationship between degradation of wireless communication link quality and time.
Figure 21:
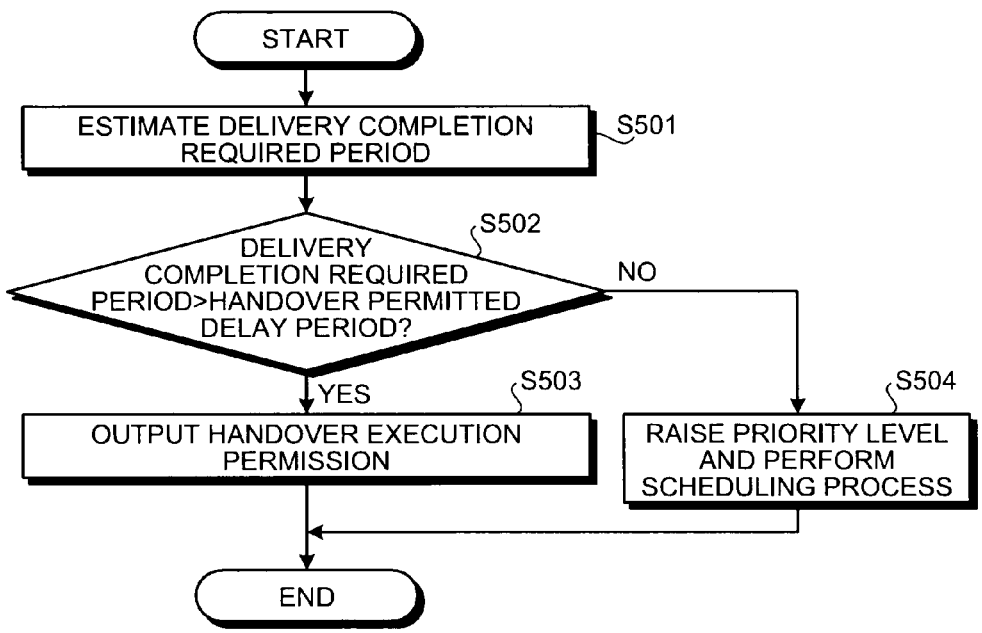
FIG. 21 is a flowchart for explaining an operation of a scheduler of a base station according to an eighth embodiment of the present invention.

An eighth embodiment of the present invention will be explained, with reference to FIGS. 20 and 21. According to the eighth embodiment, a handover process is efficiently performed, while a handover delay permitted period is taken into consideration. The configuration of the communication system according to the eighth embodiment is the same as that of the communication system according to the seventh embodiment. Thus, the explanation thereof will be omitted. Also, the configurations of the mobile stations 3a according to the eighth embodiment are the same as those of the mobile stations 3a according to the seventh embodiment. However, in addition to the functions of the handover requesting unit 308 according to the seventh embodiment described above, the handover requesting unit 308 further has a function to estimate the handover delay permitted period.

The configurations of the base stations 2a according to the eighth embodiment are the same as those of the base stations 2a according to the seventh embodiment. However, in addition to the functions of the scheduler unit 208 according to the seventh embodiment described above, the scheduler unit 208 further has a function of judging whether a handover should be executed after the undelivered wireless transfer blocks constituting a packet to be transmitted to the mobile station 3a that transmitted a handover request have been transmitted, based on a delivery completion required period that has been calculated based on a handover delay permitted period contained in the handover request and the current traffic load status.

Next, an operation of the communication system according to the eighth embodiment of the present invention will be explained. The operation of the communication system according to the eighth embodiment is similar to the operation of the communication system according to the seventh embodiment described above. The difference is that the handover requesting unit 308 included in the mobile station 3a obtains the handover permitted delay period and notifies the base station 2a of the obtain handover permitted delay period, so that the scheduler unit 208 included in the base station 2a performs a scheduling process based on the handover permitted delay period that has been indicated in the notification. Thus, in the following sections, only the difference will be explained.

First, an operation of the handover requesting unit 308 included in any one of the mobile stations 3a will be explained, with reference to FIG. 20. FIG. 20 is a chart for explaining a relationship between degradation of wireless communication link quality and time. As the mobile station 3a moves around, because the distance between the base station 2a and the mobile station 3a may become larger or because the wireless environment between the base station 2a and the mobile station 3a changes, the wireless communication link quality between the base station 2a and the mobile station 3a is degraded over the course of time, as shown in FIG. 20. When the measuring time that is scheduled once very predetermined period has come, the handover requesting unit 308 measures the wireless communication link quality between the mobile station 3a that includes the handover requesting unit 308 and the base station 2a that is currently connected to the mobile station 3a and between the mobile station 3a and another base station 2a that is positioned adjacent to the currently-communicating base station 2a and is able to communicate with the mobile station 3a. The handover requesting unit 308 is storing therein a predetermined number of wireless communication link quality values that have been measured prior to the current measuring time. When the handover requesting unit 308 has judged that a handover should be requested (at the current time in FIG. 20), the handover requesting unit 308 estimates a handover permitted delay period based on the wireless communication link quality values that have been measured prior to the current time and stored therein. More specifically, the handover requesting unit 308 calculates the speed at which the wireless communication link quality is degraded, based on the stored wireless communication link quality values. The handover requesting unit 308 then calculates the handover permitted delay period that indicates the time period from the current time to the time at which the wireless communication link quality becomes equal to or lower than a predetermined threshold value (value of the wireless communication link quality that allows communication to be performed), in the case where the wireless communication link quality is degraded at the calculated degradation speed of the wireless communication link quality. The handover requesting unit 308 transmits the handover request that contains the calculated handover permitted delay period.

Next, an operation of the scheduler unit 208 included in the base station 2a will be explained, with reference to FIG. 21. When having received the handover request that contains the handover permitted delay period from the handover control unit 210, the scheduler unit 208 estimates a delivery completion required period for the undelivered packet, based on the current traffic load status and the data amount of the undelivered wireless transfer blocks constituting the undelivered packet to be transmitted to the mobile station 3a that transmitted the handover request (Step S501).

The scheduler unit 208 compares the estimated delivery completion required period with the handover permitted delay period contained in the handover request. According to the result of the comparing process, in the case where the delivery completion required period is longer than the handover permitted delay period (Step S502: Yes), in other words, in the case where it is not possible to transmit all the undelivered wireless transfer blocks constituting the undelivered packet within the handover permitted delay period, the scheduler unit 208 judges that it is not possible for the mobile station 3a to complete the packet before the handover is executed even if the transmission of the undelivered wireless transfer blocks is continued. Thus, the scheduler unit 208 outputs a handover execution permission to the handover control unit 210 so that the handover is started immediately (Step S503).

On the contrary, in the case where the delivery completion required period is equal to or shorter than the handover permitted delay period (Step S502: No), in other words, in the case where it is possible to transmit all the undelivered wireless transfer blocks constituting the undelivered packet within the handover permitted delay period, the scheduler unit 208 judges that it is possible for the mobile station 3a to complete the packet before the handover is executed. Accordingly, in the same manner as described in the seventh embodiment, the scheduler unit 208 raises the priority levels and/or the transmission quality of the undelivered wireless transfer blocks constituting the undelivered packet to be transmitted to the mobile station 3a that transmitted the handover request, and performs a scheduling process (Step S504).

As explained above, according to the eighth embodiment, the mobile station 3a calculates the speed at which the wireless communication link quality is degraded, based on the wireless communication link quality, and estimates, based on the calculated speed, the handover permitted delay period during which the mobile station 3a is able to communicate with the currently-connected base station. The mobile station 3a then transmits the handover request that contains the estimated handover permitted delay period. The base station 2a calculates the delivery completion required period that is required to transmit the undelivered wireless transfer blocks constituting the packet that is currently being transmitted to the mobile station that transmitted the handover request. In the case where the delivery completion required period is equal to or shorter than the handover permitted delay period contained in the handover request, the base station 2a raises the priority levels and/or the transmission quality of the undelivered wireless transfer blocks constituting the packet that is currently being transmitted to the mobile station that transmitted the handover request, without being dependent on the delivery acknowledged amount accumulated values. The handover is executed after the packet that is currently being transmitted to the mobile station that transmitted the handover request has finished being transmitted. On the contrary, in the case where the delivery completion required period is longer than the handover permitted delay period contained in the handover request, the handover is executed immediately. Thus, it is possible to avoid the situation in which it is not possible to complete the packet even though the handover has been delayed.

In the eighth embodiment, in the case where the delivery completion required period is equal to or shorter than the handover permitted delay period, the priority levels and/or the transmission quality of the undelivered wireless transfer blocks constituting the undelivered packet to be transmitted to the mobile station 3a that transmitted the handover request are raised, and the scheduling process is performed. However, in the case where there is a leeway in the handover permitted delay period, because it is sufficient if the undelivered wireless transfer blocks constituting the undelivered packet are transmitted within the handover permitted delay period, it is acceptable to raise the priority levels according to the handover permitted delay period and the delivery completion required period.

More specifically, for example, an arrangement is acceptable in which, in the case where the handover permitted delay period is shorter than a predetermined value, the scheduling process is performed by using raised priority levels, whereas, in the case where the handover permitted delay period is equal to or longer than the predetermined value, the scheduling process is performed without changing the priority levels, i.e., by using the priority levels that have been determined based on the delivery acknowledged amount accumulated values. It is also acceptable use the difference between the handover permitted delay period and the delivery completion required period. As a result, it is possible to avoid the situation in which the priority levels of other mobile stations that have not requested a handover are caused to be unreasonably low because of the handover request. Thus, it is possible to avoid significantly losing impartiality to the mobile stations.

Ninth Embodiment

According to the second embodiment described above, in an upstream communication, when the scheduler unit 219 included in the base station 2 has been notified by the re-transmission control unit 214 that each of the wireless transfer blocks has properly been received, the scheduler unit 219 updates the delivery acknowledged amount accumulated value stored in correspondence with the mobile station 3 and performs the scheduling process based on the delivery acknowledged amount accumulated value that has been updated.

According to a ninth embodiment of the present invention, however, the mobile station 3 manages the delivery acknowledged amount accumulated value, and when the mobile station 3 has received, from the base station 2, a delivery acknowledgment indicating that each of the wireless transfer blocks has properly been received, the mobile station 3 updates the delivery acknowledged amount accumulated value and notifies the base station 2 of the updated value, so that the scheduler unit 219 included in the base station 2 performs a scheduling process based on the delivery acknowledged amount accumulated value that has been indicated in the notification.

The communication system according to the ninth embodiment is the same as the communication system according to the first embodiment shown in FIG. 1. Thus, the explanation thereof will be omitted. Also, the mobile station 3 and the base station 2 according to the ninth embodiment are the same as the mobile station 3 and the base station 2 according to the second embodiment shown in FIGS. 9 and 10; however, there are differences as follows: The control unit 319 included in the mobile station 3 stores therein the delivery acknowledged amount accumulated value of the mobile station 3 so that when the control unit 319 has received, from the base station 2, a delivery acknowledgment indicating that each of the wireless transfer blocks has properly been received, the control unit 319 updates the delivery acknowledged amount. Also, the control unit 319 included in the mobile station 3 exercises control so that the delivery acknowledged amount accumulated value is transmitted to the base station 2 when a predetermined transmission request reporting time has come.

Next, an operation of the communication system according to the ninth embodiment of the present invention will be explained. First, an operation in which the mobile station 3 notifies the base station 2 of the delivery acknowledged amount accumulated value, so that the base station 2 performs a scheduling process will be explained.

When the mobile station 3 has received, from an upper layer processing unit (not shown), data to be transmitted, the packet generating unit 311 included in the mobile station 3 generates a packet from the data to be transmitted and outputs the generated packet to the packet buffer 312. The packet buffer 312 included in the mobile station 3 buffers the packet.

When the predetermined transmission request reporting time has come, the control unit 319 included in the mobile station 3 generates a transmission request that contains the stored delivery acknowledged amount accumulated value and the packet size information and outputs the generated transmission request to the transmission request transmitting unit 320. The transmission request transmitting unit 320 transmits the transmission request to the base station 2 via the wireless signal transmitting and receiving unit 316.

When having received the transmission request via the wireless signal transmitting and receiving unit 211 included in the base station 2, the transmission request receiving unit 218 outputs the received transmission request to the scheduler unit 219. The scheduler unit 219 stores therein the delivery acknowledged amount accumulated value and the packet size information in correspondence with the mobile station 3 that transmitted the transmission request.

When the predetermined scheduling time has come, the scheduler unit 219 included in the base station 2 performs a scheduling process of determining the priority level of each of the packets based on a corresponding one of the delivery acknowledged amount accumulated values that are respectively stored in correspondence with the mobile stations 3 and allocating a wireless resource to each of the mobile stations 3 according to the determined priority levels. The scheduling process is the same as the operation explained above with reference to the flowchart in FIG. 6. Thus, the explanation thereof will be omitted. The transmission instruction transmitting unit 217 transmits, to each of the mobile stations 3, a transmission instruction that contains the information of the wireless transfer block size (wireless transfer block size information) that has been determined by the scheduler unit 219 based on the wireless communication link quality information and the packet size information and the information of the wireless resource (wireless resource information) that has been allocated during the scheduling process.

Also, another arrangement is acceptable in which the mobile station 3 puts a target packet size into the transmission request, so that the scheduler unit 219 included in the base station 2 performs the scheduling process in such a manner that, in the case where two or more of the mobile stations 3 have an equal delivery acknowledged amount accumulated value, a higher priority is given to one of the mobile stations 3 having a larger packet size.

Next, an operation performed by the mobile station 3 to transmit the wireless transfer blocks that constitute a packet will be explained. When having received a transmission instruction via the wireless signal transmitting and receiving unit 316 included in the mobile station 3, the transmission instruction receiving unit 318 outputs the received transmission instruction to the control unit 319. The control unit 319 outputs the wireless transfer block size contained in the transmission instruction to the wireless transfer block generating unit 313, as the wireless transfer block generation information.

Based on the wireless transfer block generation information, the wireless transfer block generating unit 313 included in the mobile station 3 generates wireless transfer blocks from the packet that is buffered in the packet buffer 312 and outputs the generated wireless transfer blocks to the re-transmission control unit 314.

When having received the wireless transfer blocks, the re-transmission control unit 314 included in the mobile station 3 performs a process that is required when the re-transmission process is performed. After that, the re-transmission control unit 314 outputs the wireless transfer blocks to the wireless transfer block transmitting unit 317. The wireless transfer block transmitting unit 317 transmits the wireless transfer blocks to the base station 2 via the wireless signal transmitting and receiving unit 316.

The wireless transfer block receiving unit 213 included in the base station 2 extracts the wireless transfer blocks out of the signals that have been received via the wireless signal transmitting and receiving unit 211 and outputs the extracted wireless transfer blocks to the re-transmission control unit 214. The re-transmission control unit 214 judges whether each of the wireless transfer blocks has properly been received. In the case where each of the wireless transfer blocks has properly been received, the re-transmission control unit 214 outputs the wireless transfer block to the packet reproducing unit 215. Also, the re-transmission control unit 214 notifies the re-transmission control signal transmitting unit 212 that the wireless transfer block has properly been received.

When all the wireless transfer blocks that constitute the packet have properly been received and the packet has been reproduced, the packet reproducing unit 215 included in the base station 2 transmits the reproduced packet to the wired network 1 via the wired signal transmitting unit 216.

On the contrary, in the case where any one of the wireless transfer blocks has not properly been received, the re-transmission control unit 214 included in the base station 2 discards such a wireless transfer block and notifies the re-transmission control signal transmitting unit 212 that the wireless transfer block has not properly been received.

In the case where the re-transmission control signal transmitting unit 212 included in the base station 2 has been notified that any one of the wireless transfer blocks has not properly been received, the re-transmission control signal transmitting unit 212 transmits a re-transmission request as the re-transmission control information to the mobile station 3 via the wireless signal transmitting and receiving unit 211. On the contrary, in the case where the re-transmission control signal transmitting unit 212 has been notified that each of the wireless transfer blocks has properly been received, the re-transmission control signal transmitting unit 212 transmits a delivery acknowledgment as the re-transmission control information to the mobile station 3 via the wireless signal transmitting and receiving unit 211.

Based on the re-transmission control information that has been received via the wireless signal transmitting and receiving unit 316 and the re-transmission control signal receiving unit 315, the re-transmission control unit 314 included in the mobile station 3 determines whether a re-transmission process should be performed in units of wireless transfer blocks. In the case where the re-transmission control information is a re-transmission request for requesting that the wireless transfer block should be re-transmitted, the re-transmission control unit 314 performs the predetermined re-transmission process on the wireless transfer block for which the re-transmission has been requested.

When having been notified by the re-transmission control unit 314 that each of the wireless transfer blocks has properly been received by the base station 2 (the mobile station 3 has received a delivery acknowledgment), the control unit 319 adds a delivery acknowledged amount to the stored delivery acknowledged amount accumulated value so as to update the delivery acknowledged amount accumulated value. In the case where a delivery acknowledgment has been received for all the wireless transfer blocks that constitute one packet, the control unit 319 initializes the delivery acknowledged amount accumulated value.

As explained above, according to the ninth embodiment, the base station 2 determines the sizes of the wireless transfer blocks based on the packet length contained in the transmission request that has been received from each of the mobile stations 3 and the wireless communication link quality information. The base station 2 also determines the priority levels based on the delivery acknowledged amount accumulated values each of which is contained in a transmission request and indicates an accumulated value of the sizes of the wireless transfer blocks for each of which a delivery acknowledgment has been received from the base station 2. The base station 2 then allocates the wireless resources to the wireless transfer blocks that constitute each of the packets to be transmitted by the mobile stations 3 based on the determined priority levels. The base station 2 then transmits the transmission instructions containing the sizes of the wireless transfer blocks and the allocation of the wireless resources to each of the mobile stations 3. Each of the mobile stations 3 generates the wireless transfer blocks by dividing the packet to be transmitted, based on the wireless transfer block sizes contained in the transmission instructions. Each of the mobile stations 3 then transmits, to the base station 2, the generated wireless transfer blocks based on the allocation of the wireless resources contained in the transmission instructions. In other words, each of the mobile stations 3 manages the delivery acknowledged amount accumulated value and, in the case where the mobile station 3 has received, from the base station 2, a delivery acknowledgment indicating that each of the wireless transfer blocks has properly been received, the mobile station 3 updates the delivery acknowledged amount accumulated value and notifies the base station 2 of the updated value, so that the base station 2 performs the scheduling process based on the delivery acknowledged amount accumulated value indicated in the notification. As a result, in the case where each packet is divided into a plurality of wireless transfer blocks and transmitted, it is possible to lower the possibility of wasting the wireless transfer blocks that are already acknowledged as having been delivered, in the situation where some wireless transfer blocks fail to reach the transmission destination and the packet therefore fails to be reproduced. Consequently, it is possible to effectively utilize the wireless communication link.

Also, because the mobile station 3 is configured so as to manage the delivery acknowledged amount accumulated value and notifies the base station 2 of the delivery acknowledged amount accumulated value, even in the case where an error has occurred during the transmission of a delivery acknowledgment from the base station 2 to the mobile station 3, there will be no discrepancy between the actual delivery acknowledged amount accumulated value and the delivery acknowledged amount accumulated value recognized by the scheduler. Thus, it is possible to perform the scheduling process by using accurate delivery acknowledged amount accumulated values.

Another arrangement is acceptable in which, when the mobile station 3 has received a transmission request, the mobile station 3 selects a logical channel having a higher priority level based on the delivery acknowledged amount accumulated value and the packet size information that have been stored therein so that the wireless transfer blocks are generated from the data in the logical channel.

Yet another arrangement is acceptable in which, like in the third embodiment described above, the scheduler unit 219 takes the "stay permitted remaining period" into consideration. In this situation, the mobile station 3 notifies the base station 2 of the "stay permitted remaining period", together with the delivery acknowledged amount accumulated value and the packet size information.

Tenth Embodiment

A tenth embodiment of the present invention will be explained with reference to FIGS. 22 to 26. In the description of the tenth embodiment, an example will be explained in which the communication system according to the ninth embodiment described above is applied to the 3GPP Long Term Evolution. First, a wireless interface that is used by each of the mobile stations 3 to notify the base station 2 of the delivery acknowledged amount accumulated value and the packet size information will be explained. The delivery acknowledged amount accumulated value denotes an accumulated value of the sizes of the wireless transfer blocks for each of which a delivery acknowledgment has been made, i.e., the percentage of the portion of the packet for which delivery acknowledgments have been made. The packet size denotes the size of the packet that serves as the target. In the following sections, the delivery acknowledged amount accumulated value and the packet size may be collectively referred to as a "segmentation status".

The 3GPP Long Term Evolution includes a buffer status report that reports the status of the transmission buffer in a mobile station. By using this buffer status report as a transmission request, each of the mobile stations 3 notifies the base station 2 of the total data amount of the packets that have been stored in the packet buffer 312 and the segmentation status.

More specifically, when the predetermined transmission request reporting time has come, the control unit 319 notifies the transmission request transmitting unit 320 of the total data amount of the packets that have been stored in the packet buffer 312, the delivery acknowledged amount accumulated value, and the packet size. After that, the transmission request transmitting unit 320 generates the buffer status report based on the total data amount, the delivery acknowledged amount accumulated value, and the packet size that have been indicated in the notification and transmits the generated buffer status report to the base station 2 via the wireless signal transmitting and receiving unit 316. When the transmission request receiving unit 218 included in the base station 2 has received the buffer status report via the wireless signal transmitting and receiving unit 211, the transmission request receiving unit 218 extracts the segmentation status out of the buffer status report and outputs the extracted segmentation status to the scheduler unit 219.

The transmission request reporting time at which each of the mobile stations 3 transmits the buffer status report to the base station 2 may be when the mobile station 3 has got a packet that needs to be transmitted, or once every predetermined period, or when segmentation has been performed. The predetermined period may be defined depending on a maximum wireless transfer block size specified by the base station 2.

Also, another arrangement is acceptable in which the buffer status report is submitted in units of the plurality of logical channels within the mobile station 3. Yet another arrangement is acceptable in which the buffer status report is submitted only for one or more specific channels (e.g., channels having high priority levels). Yet another arrangement is acceptable in which a buffer status report is submitted for the plurality of logical channels collectively in units of the mobile stations 3.

When the delivery acknowledged amount accumulated value and the packet size are put into the buffer status report, if the delivery acknowledged amount accumulated value and the packet size value are put into the buffer status report as they are, it is necessary to use one byte or more. However, in the case where no data is stored in the packet buffer 312 (there is no data that has been segmented), the area used for the buffer status report to store the segmentation status therein is wasted. To avoid wasting the area, another arrangement is acceptable in which the buffer status report includes a control bit indicating whether there is a segmentation status so that the number of bits can be reduced. Also, in the case where a buffer status report is generated for a plurality of logical channels collectively, if there is no segmented data for any of the logical channels, an arrangement is acceptable in which the buffer status report includes a control bit that is used in common among the logical channels.

Further, to reduce the number of bits used for the segmentation status, another arrangement is acceptable in which, as shown in FIGS. 22 and 23, the delivery acknowledged amount accumulated value and the packet size value are indicated by using indexes. FIG. 22 is an exemplary table in which the delivery acknowledged amount accumulated values are expressed by using indexes. In FIG. 22, SS1 denotes the delivery acknowledged amount accumulated value. In the case where there is no segment, the index "0" is used. The situation in which "0%<the delivery acknowledged amount accumulated value≦10%" is satisfied is expressed by an index "1". The situation in which "10%<the delivery acknowledged amount accumulated value≦20%" is satisfied is expressed by an index "2". The situation in which "20%<the delivery acknowledged amount accumulated value≦30%" is satisfied is expressed by an index "3". The situation in which "30%<the delivery acknowledged amount accumulated value≦40%" is satisfied is expressed by an index "4". As explained here, the delivery acknowledged amount accumulated values are brought into correspondence with the indexes in increments of 10%. According to this arrangement, it is possible to express the delivery acknowledged amount accumulated value by using 4 bits, whereas 7 bits would be necessary if the delivery acknowledged amount value were literally expressed.

FIG. 23 is an exemplary table in which the packet sizes are expressed by using indexes. In FIG. 23, SS2 denotes the packet size. The situation in which "0 bytes<the packet size≦100 bytes" is satisfied is expressed by an index "0". The situation in which "100 bytes<the packet size≦200 bytes" is satisfied is expressed by an index "1". The situation in which "200 bytes<the packet size≦300 bytes" is satisfied is expressed by an index "2". The situation in which "300 bytes<the packet size≦400 bytes" is satisfied is expressed by an index "3". As explained here, the packet size values are brought into correspondence with the indexes in increments of 100 bytes. According to this arrangement, it is possible to express the number of bytes in the packet by using 4 bits, whereas 11 or more bits would be necessary if the number of bytes in the packet were literally expressed.

Figure 24:
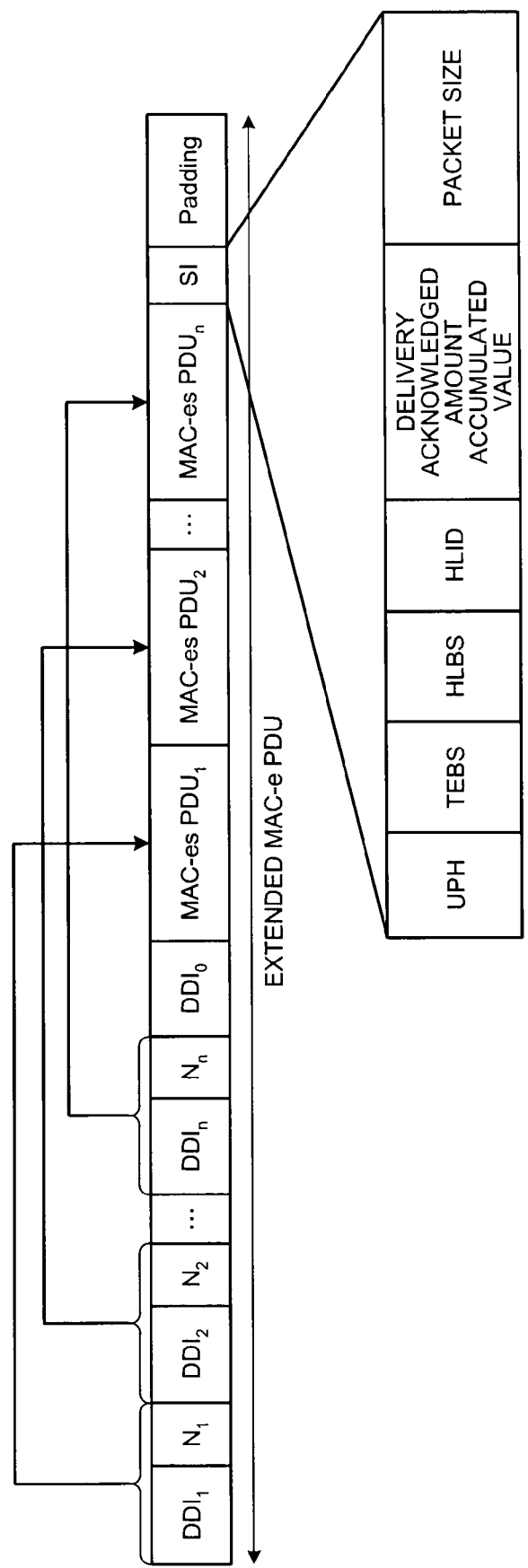
FIG. 24 is a drawing of an exemplary format of an extended MAC-e PDU used by the communication system according to the tenth embodiment of the present invention.

FIG. 24 is a drawing for explaining an example of an MAC-e PDU format that is obtained by extending the MAC-e PDU described in the 3GPP TS 25.321 and is used for transmitting the buffer status report. In FIG. 24, the extended MAC-e PDU is configured so as to include: as many fields as the number of MAC-es PDUs (in this case, n fields, where n is a natural number), each field being made up of a DDI field storing therein the channel ID and the size of a corresponding MAC-es PDU and an N field storing therein the number of corresponding MAC-es PDUs; a $DDI_0$ field storing therein information that indicates whether there is scheduling information; MAC-es PDU fields of which the total quantity is equal to n; an SI field storing therein the scheduling information; and a Padding field storing therein a padding. The SI field is configured so as to include: a UE Power Headroom (UPH) field storing therein a remaining amount value of the transmission power of the mobile station 3; a Total Enhanced Dedicated Channel Buffer Status (TEBS) field storing therein the total volume of all the buffers within the mobile station 3; a Highest priority Logical channel Buffer Status (HLBS) field storing therein the data amount in the buffer corresponding to the channel ID having the highest priority level; a Highest priority Logical channel ID (HLID) field storing therein the channel ID having the highest priority level; a delivery acknowledged amount accumulated value field storing therein the delivery acknowledged amount accumulated value; and a packet size field storing therein the packet size. By using the extended MAC-e PDU configured in this manner, it is possible for the mobile station 3 to notify the base station 2 of the segmentation status.

In the description above, the example is explained in which the segmentation status is reported by using the buffer status report that reports the status of the packet buffer 312 (transmission buffer) included in the mobile station 3 to the base station 2; however, another arrangement is acceptable in which the segmentation status is reported to the base station 2 with separate reporting timing by using MAC layer control information (MAC Control PDU), instead of the buffer status report.

Figure 25:
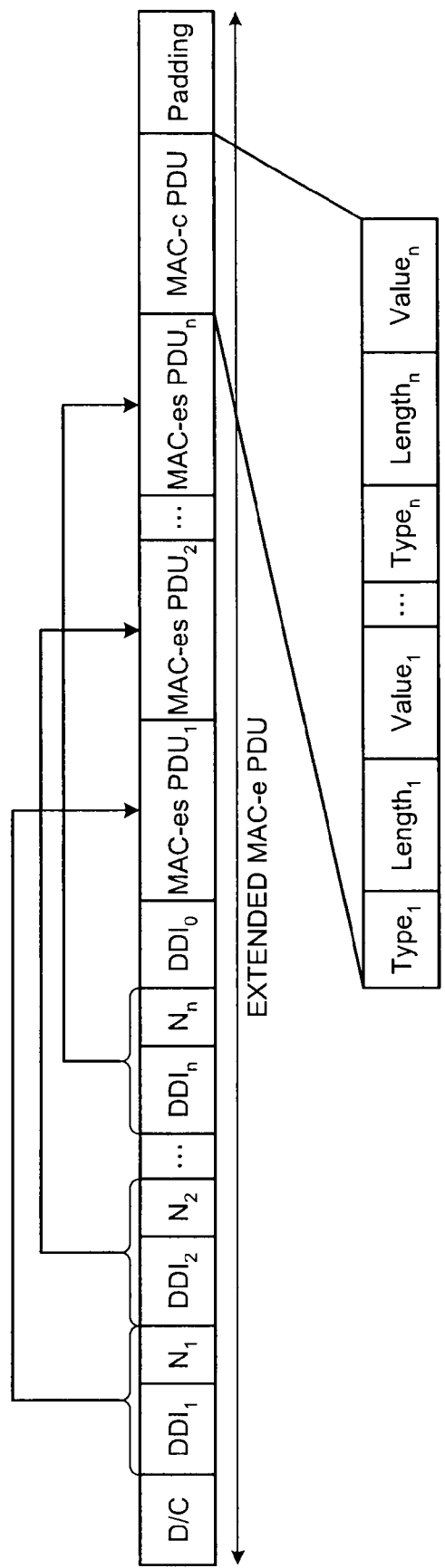
FIG. 25 is a drawing of another exemplary format of an extended MAC-e PDU used by the communication system according to the tenth embodiment of the present invention.

FIG. 25 is a drawing for explaining another example of a configuration of an extended MAC-e PDU format that is obtained by extending the MAC-e PDU described in the 3GPP TS25.321 in the case where a MAC Control PDU is used to transmit the buffer status report. In FIG. 25, the extended MAC-e PDU is configured so as to include: a D/C field storing therein information that indicates whether the following information is data information or control information; as many fields as the number of MAC-es PDUs (in this case, n fields, where n is a natural number), each field being made up of a DDI field storing therein the channel ID and the size of a corresponding MAC-es PDU and an N field storing therein the number of corresponding MAC-es PDUs; a $DDI_0$ field storing therein information that indicates whether there is scheduling information; MAC-es PDU fields of which the total quantity is equal to n; a MAC-c PDU field storing therein the MAC layer control information; and a Padding field storing therein a padding. The MAC-c PDU is configured so as to include as many fields as n, each field being made up of a Type field storing therein the type of the MAC Control PDU of the corresponding Value, a Length field storing therein the length of the corresponding Value, and a Value field storing therein the MAC control information. When storing the segmentation status (delivery acknowledged amount accumulated value and packet size) into the Value field, the transmission request transmitting unit 320 included in the mobile station 3 stores "SSTAT" into the Type field so as to indicate that the segmentation status is contained. In the case where "SSTAT" is stored in the Type field, the transmission request receiving unit 218 included in the base station 2 is able to recognize that the segmentation status is stored in the corresponding Value field. In this manner, the mobile station 3 is able to notify the base station 2 of the segmentation status.

Next, an inter-layer interface will be explained. Generally speaking, in the base stations 2 and the mobile stations 3, the functions are realized as layers. Processes in the layers are performed by exchanging information among the layers. In the following sections, information transmitted between a Radio Link Control (RLC) layer and a Medium Access Control (MAC) layer will be explained. The RLC layer realizes the control over the packet buffer 312 and the segmenting process performed by the control unit 319 included in the mobile station 3 as well as the re-transmission process performed by the re-transmission control unit 314. The MAC layer realizes the process performed by the control unit 319 to provide information that is necessary when the base station 2 realizes the scheduling process and the wireless transmission controlling process.

The delivery acknowledged amount accumulated value and the packet size are transmitted between the RLC layer and the MAC layer. In other words, the segmentation status that is explained above with the wireless interface is also exchanged between the RLC layer and the MAC layer. Between the RLC layer and the MAC layer also, an arrangement is acceptable in which the segmentation status is submitted in units of the plurality of logical channels within the mobile station 3. Yet another arrangement is acceptable in which the segmentation status is submitted only for one or more specific channels (e.g., channels having higher priority levels). Yet another arrangement is acceptable in which a segmentation status is submitted for the plurality of logical channels collectively in units of the mobile stations 3.

Like the transmission request reporting time, the time at which the segmentation status is submitted may be when the mobile station 3 has got a packet that needs to be transmitted, or once every predetermined period, or when segmentation has been performed.

FIG. 26 is a drawing of transfer information (primitive) between the RLC layer and the MAC layer obtained by extending the 3GPP TS25.321. In FIG. 26, "Request", "Indication", "Response", and "Confirm" are defined as parameters. Under the heading of "Request" for MAC-DATA, Data, Buffer Occupancy (BO), User Equipment Identifier (UE-ID), Type Indicator, RLC Entity Info, and Segmentation Status are listed. Further, under the heading of "Indication" for MAC-DATA, Data, Transport Block Number (No_TB), TD (Note), and Error Indication are listed. In addition, under the heading of "Indication" for MAC-STATUS, Packet Data Unit Number (No_PDU), Packet Data Unit Size (PDU_Size), Tx Status, and Status_Report_REQ are listed. Under the heading of "Response" for MAC-STATUS, Buffer Occupancy (BO) and RLC Entity Info are listed. In other words, for the transfer from the RLC layer to the MAC layer, "Segmentation Status" is added as a "Request" parameter.

As explained above, according to the tenth embodiment, the buffer status report is used as the transmission request, and the segmentation status is contained in the "Request" parameter by extending the 3GPP TS25.321, as the transfer information between the layers. Thus, it is possible to transfer the information that is required in the scheduling process, without having to apply a significant modification to conventional wireless interfaces and conventional inter-layer interfaces.

Eleventh Embodiment

In the ninth embodiment described above, the mobile station 3 manages the delivery acknowledged amount accumulated value, and when the mobile station 3 has received, from the base station 2, the delivery acknowledgment indicating that each of the wireless transfer blocks has properly been received, the mobile station 3 updates the delivery acknowledged amount accumulated value and notifies the base station 2 of the updated value. As a result, the scheduler unit 219 included in the base station 2 performs the scheduling process based on the delivery acknowledged amount accumulated value indicated in the notification. In an eleventh embodiment of the present invention, however, an example will be explained in which a transmitted data amount accumulated value will be used, instead of the delivery acknowledged amount accumulated value.

The communication system according to the eleventh embodiment is the same as the communication system according to the first embodiment shown in FIG. 1. Thus, the explanation thereof will be omitted. Also, the mobile station 3 and the base station 2 according to the eleventh embodiment are the same as the mobile station 3 and the base station 2 according to the second embodiment shown in FIGS. 9 and 10; however, there are differences as follows: The control unit 319 included in the mobile station 3 stores therein the transmitted data amount accumulated value of the mobile station 3 and updates the transmitted data amount accumulated value when each of the wireless transfer blocks has been transmitted. Also, the control unit 319 included in the mobile station 3 exercises control so that the transmitted data amount accumulated value is transmitted to the base station 2 when the predetermined transmission request reporting time has come. In the present example, the transmitted data amount accumulated value denotes the amount of the data that has been transmitted by the mobile station 3, in other words, an accumulated value of the sizes of the wireless transfer blocks that have been transmitted by the mobile station 3.

Next, an operation of the communication system according to the eleventh embodiment of the present invention will be explained. First, the operation in which the mobile station 3 notifies the base station 2 of the transmitted data amount accumulated value so that the base station 2 performs the scheduling process will be explained.

When the mobile station 3 has received, from an upper layer processing unit (not shown), data to be transmitted, the packet generating unit 311 included in the mobile station 3 generates a packet from the data to be transmitted and outputs the generated packet to the packet buffer 312. The packet buffer 312 included in the mobile station 3 buffers the packet.

When the predetermined transmission request reporting time has come, the control unit 319 included in the mobile station 3 generates a transmission request that contains the stored transmitted data amount accumulated value and the packet size information and outputs the generated transmission request to the transmission request transmitting unit 320. The transmission request transmitting unit 320 transmits the transmission request to the base station 2 via the wireless signal transmitting and receiving unit 316.

When having received the transmission request via the wireless signal transmitting and receiving unit 211 included in the base station 2, the transmission request receiving unit 218 outputs the received transmission request to the scheduler unit 219. The scheduler unit 219 stores therein the transmitted data amount accumulated value and the packet size information in correspondence with the mobile station 3 that transmitted the transmission request.

When the predetermined scheduling time has come, the scheduler unit 219 included in the base station 2 performs a scheduling process of determining the priority level of each of the packets based on a corresponding one of the transmitted data amount accumulated values that are respectively stored in correspondence with the mobile stations 3 and allocating a wireless resource to each of the mobile stations 3 according to the determined priority levels. The scheduling process is the same as the operation explained above with reference to the flowchart in FIG. 6. Thus, the explanation thereof will be omitted. The transmission instruction transmitting unit 217 transmits, to each of the mobile stations 3, the information of the wireless transfer block size (wireless transfer block size information) that has been determined by the scheduler unit 219 based on the wireless communication link quality information and the packet size information and the information that has been scheduled during the scheduling process, as a transmission instruction.

Also, another arrangement is acceptable in which the mobile station 3 puts a target packet size into the transmission request, so that the scheduler unit 219 included in the base station 2 performs the scheduling process in such a manner that, in the case where two or more of the mobile stations 3 have an equal transmitted data amount accumulated value, a higher priority is given to one of the mobile stations 3 having a larger packet size.

Next, an operation performed by the mobile station 3 to transmit the wireless transfer blocks that constitute a packet will be explained. When having received a transmission instruction via the wireless signal transmitting and receiving unit 316 included in the mobile station 3, the transmission instruction receiving unit 318 outputs the received transmission instruction to the control unit 319. The control unit 319 outputs the wireless transfer block size contained in the transmission instruction to the wireless transfer block generating unit 313, as the wireless transfer block generation information. Also, the control unit 319 adds the wireless transfer block size contained in the transmission instruction to the stored transmitted data amount accumulated value so as to update the transmitted data amount accumulated value. When all the wireless transfer blocks that constitute one packet have been registered as transmitted, the control unit 319 initializes the transmitted data amount accumulated value.

Based on the wireless transfer block generation information, the wireless transfer block generating unit 313 included in the mobile station 3 generates wireless transfer blocks from the packet that is buffered in the packet buffer 312 and outputs the generated wireless transfer blocks to the re-transmission control unit 314.

When having received the wireless transfer blocks, the re-transmission control unit 314 included in the mobile station 3 performs a process that is required when the re-transmission process is performed. After that, the re-transmission control unit 314 outputs the wireless transfer blocks to the wireless transfer block transmitting unit 317. The wireless transfer block transmitting unit 317 transmits the wireless transfer blocks to the base station 2 via the wireless signal transmitting and receiving unit 316.

The wireless transfer block receiving unit 213 included in the base station 2 extracts the wireless transfer blocks out of the signals that have been received via the wireless signal transmitting and receiving unit 211 and outputs the extracted wireless transfer blocks to the re-transmission control unit 214. The re-transmission control unit 214 judges whether each of the wireless transfer blocks has properly been received. In the case where each of the wireless transfer blocks has properly been received, the re-transmission control unit 214 outputs the wireless transfer block to the packet reproducing unit 215. Also, the re-transmission control unit 214 notifies the re-transmission control signal transmitting unit 212 that the wireless transfer block has properly been received.

When all the wireless transfer blocks that constitute the packet have properly been received and the packet has been reproduced, the packet reproducing unit 215 included in the base station 2 transmits the reproduced packet to the wired network 1 via the wired signal transmitting unit 216.

On the contrary, in the case where any one of the wireless transfer blocks has not properly been received, the re-transmission control unit 214 included in the base station 2 discards such a wireless transfer block and notifies the re-transmission control signal transmitting unit 212 that the wireless transfer block has not properly been received.

In the case where the re-transmission control signal transmitting unit 212 included in the base station 2 has been notified that any one of the wireless transfer blocks has not properly been received, the re-transmission control signal transmitting unit 212 transmits a re-transmission request as the re-transmission control information to the mobile station 3 via the wireless signal transmitting and receiving unit 211. On the contrary, in the case where the re-transmission control signal transmitting unit 212 has been notified that each of the wireless transfer blocks has properly been received, the re-transmission control signal transmitting unit 212 transmits a delivery acknowledgment as the re-transmission control information to the mobile station 3 via the wireless signal transmitting and receiving unit 211.

Based on the re-transmission control information that has been received via the wireless signal transmitting and receiving unit 316 and the re-transmission control signal receiving unit 315, the re-transmission control unit 314 included in the mobile station 3 determines whether a re-transmission process should be performed in units of wireless transfer blocks. In the case where the re-transmission control information is a re-transmission request for requesting that the wireless transfer block should be re-transmitted, the re-transmission control unit 314 performs the predetermined re-transmission process on the wireless transfer block for which the re-transmission has been requested.

As explained above, according to the eleventh embodiment, the base station 2 determines the sizes of the wireless transfer blocks based on the packet length contained in the transmission request that has been received from each of the mobile stations 3 and the wireless communication link quality information. The base station 2 also determines the priority levels based on the transmitted data amount accumulated values each of which is contained in a transmission request and indicates an accumulated value of the sizes of the wireless transfer blocks that have been transmitted by the corresponding one of the mobile stations 3 to the base station 2. The base station 2 allocates the wireless resources to the wireless transfer blocks that constitute each of the packets to be transmitted by the mobile stations 3, based on the determined priority levels. The base station 2 then transmits the transmission instructions containing the sizes of the wireless transfer blocks and the allocation of the wireless resources to the mobile stations 3. Each of the mobile stations 3 generates the wireless transfer blocks by dividing the packet to be transmitted, based on the wireless transfer block sizes contained in the transmission instructions. Each of the mobile stations 3 then transmits, to the base station 2, the generated wireless transfer blocks based on the allocation of the wireless resources contained in the transmission instructions. In other words, each of the mobile stations 3 notifies the base station 2 of the transmitted data amount accumulated value indicating an accumulated value of the sizes of the wireless transfer blocks that have been transmitted to the base station 2, so that the base station 2 performs the scheduling process based on the transmitted data amount accumulated value indicated in the notification. As a result, in the case where each packet is divided into a plurality of wireless transfer blocks and transmitted, it is possible to lower the possibility of wasting the wireless transfer blocks that are already acknowledged as having been delivered, in the situation where some wireless transfer blocks fail to reach the transmission destination and the packet therefore fails to be reproduced. Consequently, it is possible to effectively utilize the wireless communication link.

In the case where the communication system according to the eleventh embodiment is applied to the 3GPP Long Term Evolution, the transmitted data amount accumulated value may be used instead of the delivery acknowledged amount accumulated value according to the tenth embodiment that is used when the ninth embodiment is applied to the 3GPP Long Term Evolution. With this arrangement, it is possible to transfer the information that is required in the scheduling process without having to apply a significant modification to conventional wireless interfaces and conventional inter-layer interfaces.

Another arrangement is acceptable in which, when the mobile station 3 has received a transmission request, the mobile station 3 selects a logical channel having a higher priority level based on the transmitted data amount accumulated value that has been stored therein so that the wireless transfer blocks are generated from the data in the logical channel.

Yet another arrangement is acceptable in which, like in the third embodiment described above, the scheduler unit 219 takes the "stay permitted remaining period" into consideration. In this situation, the mobile station 3 notifies the base station 2 of the "stay permitted remaining period", together with the transmitted data amount accumulated value.

Twelfth Embodiment

According to the second embodiment described above, in an upstream communication, when the scheduler unit 219 included in the base station 2 has been notified by the re-transmission control unit 214 that each of the wireless transfer blocks has properly been received, the scheduler unit 219 updates the delivery acknowledged amount accumulated value stored in correspondence with the mobile station 3 and performs the scheduling process based on the delivery acknowledged amount accumulated value that has been updated.

According to a twelfth embodiment of the present invention, in an upstream communication, the scheduler unit 219 included in the base station 2 performs the scheduling process by using, instead of the delivery acknowledged amount accumulated value of the wireless transfer blocks that are acknowledged as having been delivered, an accumulated value of the sizes of the wireless transfer blocks that are transmitted by the mobile station 3 with the wireless resources that have been allocated during the scheduling process, in other words, by using the transmitted data amount accumulated value that is an accumulated value of the sizes of the wireless transfer blocks that are transmitted by the mobile station 3 according to transmission instructions.

The communication system according to the twelfth embodiment is the same as the communication system according to the first embodiment shown in FIG. 1. Thus, the explanation thereof will be omitted. Also, the mobile station 3 and the base station 2 according to the twelfth embodiment are the same as the mobile station 3 and the base station 2 according to the second embodiment shown in FIGS. 9 and 10; however, there are differences as follows: When the scheduler unit 219 included in the base station 2 has been notified by the re-transmission control unit 214 that each of the wireless transfer blocks has properly been received, the scheduler unit 219 does not update the delivery acknowledged amount accumulated value stored in correspondence with the mobile station 3. Instead, after performing the scheduling process, the scheduler unit 219 adds a wireless transfer block size that has been allocated during the scheduling process to the transmitted data amount accumulated value stored in correspondence with the mobile station 3 so as to update the transmitted data amount accumulated value. In the next scheduling process, the scheduler unit 219 allocates a wireless resource by using the updated transmitted data amount accumulated value.

Next, an operation of the communication system according to the twelfth embodiment of the present invention will be explained. First, an operation that is performed when the mobile station 3 has got a packet that needs to be transmitted will be explained.

When the mobile station 3 has received, from an upper layer processing unit (not shown), data to be transmitted, the packet generating unit 311 included in the mobile station 3 generates a packet from the data to be transmitted and outputs the generated packet to the packet buffer 312.

The packet buffer 312 included in the mobile station 3 notifies the control unit 319 that a new packet is being buffered. The control unit 319 generates a transmission request to indicate that a new packet is being buffered, i.e., that the mobile station 3 has got a packet that needs to be transmitted to the base station 2 and outputs the generated transmission request to the transmission request transmitting unit 320. The control unit 319 puts packet size information indicating the size of the packet into the transmission request. The transmission request transmitting unit 320 included in the mobile station 3 transmits the transmission request to the base station 2 via the wireless signal transmitting and receiving unit 316.

When having received the transmission request via the wireless signal transmitting and receiving unit 211 included in the base station 2, the transmission request receiving unit 218 outputs the received transmission request to the scheduler unit 219. The scheduler unit 219 stores therein the transmitted data amount accumulated value and the packet size in correspondence with the mobile station 3 that transmitted the transmission request. In this situation, the scheduler unit 219 initializes the transmitted data amount accumulated value and stores the initialized value therein.

Next, an operation performed by mobile station 3 to transmit the wireless transfer blocks that constitute the packet will be explained. When having received a transmission instruction via the wireless signal transmitting and receiving unit 316 included in the mobile station 3, the transmission instruction receiving unit 318 outputs the received transmission instruction to the control unit 319. The control unit 319 outputs the wireless transfer block size contained in the transmission instruction to the wireless transfer block generating unit 313, as the wireless transfer block generation information.

Based on the wireless transfer block generation information, the wireless transfer block generating unit 313 included in the mobile station 3 generates wireless transfer blocks from the packet that is buffered in the packet buffer 312 and outputs the generated wireless transfer blocks to the re-transmission control unit 314.

When having received the wireless transfer blocks, the re-transmission control unit 314 included in the mobile station 3 performs a process that is required when the re-transmission process is performed. After that, the re-transmission control unit 314 outputs the wireless transfer blocks to the wireless transfer block transmitting unit 317. The wireless transfer block transmitting unit 317 transmits the wireless transfer blocks to the base station 2 via the wireless signal transmitting and receiving unit 316.

The wireless transfer block receiving unit 213 included in the base station 2 extracts the wireless transfer blocks out of the signals that have been received via the wireless signal transmitting and receiving unit 211 and outputs the extracted wireless transfer blocks to the re-transmission control unit 214. The re-transmission control unit 214 judges whether each of the wireless transfer blocks has properly been received. In the case where each of the wireless transfer blocks has properly been received, the re-transmission control unit 214 outputs the wireless transfer block to the packet reproducing unit 215. Also, the re-transmission control unit 214 notifies the re-transmission control signal transmitting unit 212 that the wireless transfer block has properly been received.

When all the wireless transfer blocks that constitute the packet have properly been received and the packet has been reproduced, the packet reproducing unit 215 included in the base station 2 transmits the reproduced packet to the wired network 1 via the wired signal transmitting unit 216.

On the contrary, in the case where any one of the wireless transfer blocks has not properly been received, the re-transmission control unit 214 included in the base station 2 discards such a wireless transfer block and notifies the re-transmission control signal transmitting unit 212 that the wireless transfer block has not properly been received.

In the case where the re-transmission control signal transmitting unit 212 included in the base station 2 has been notified that any one of the wireless transfer blocks has not properly been received, the re-transmission control signal transmitting unit 212 transmits a re-transmission request as the re-transmission control information to the mobile station 3 via the wireless signal transmitting and receiving unit 211. On the contrary, in the case where the re-transmission control signal transmitting unit 212 has been notified that each of the wireless transfer blocks has properly been received, the re-transmission control signal transmitting unit 212 transmits a delivery acknowledgment as the re-transmission control information to the mobile station 3 via the wireless signal transmitting and receiving unit 211.

Based on the re-transmission control information that has been received via the wireless signal transmitting and receiving unit 316 and the re-transmission control signal receiving unit 315, the re-transmission control unit 314 included in the mobile station 3 determines whether a re-transmission process should be performed in units of wireless transfer blocks. In the case where the re-transmission control information is a re-transmission request for requesting that the wireless transfer block should be re-transmitted, the re-transmission control unit 314 performs the predetermined re-transmission process on the wireless transfer block for which the re-transmission has been requested.

Next, an operation of the scheduler unit 219 included in the base station 2 will be explained. When the predetermined scheduling time has come, the scheduler unit 219 included in the base station 2 performs a scheduling process of determining the priority level of each of the packets based on a corresponding one of the transmitted data amount accumulated values that are respectively stored in correspondence with the mobile stations 3 and allocating a wireless resource to each of the mobile stations 3 according to the determined priority levels. The scheduling process is similar to the scheduling process according to the first embodiment explained above with reference to the flowchart in FIG. 6; however, there are differences as follows: According to the first embodiment, the delivery acknowledged amount accumulated values are used as the priority levels when the scheduling process is performed on the wireless transfer blocks. In contrast, according to the twelfth embodiment, the transmitted data amount accumulated values are used as the priority levels when the scheduling process is performed on the wireless transfer blocks. Thus, the explanation will be omitted.

When the scheduling process has been finished, the scheduler unit 219 adds the wireless transfer block size that has been allocated during the scheduling process to the transmitted data amount accumulated value stored in correspondence with the corresponding one of the mobile stations 3 so as to update the transmitted data amount accumulated value. When all the wireless transfer blocks that constitute one packet have been registered as transmitted, the scheduler unit 219 initializes the transmitted data amount accumulated value that is stored in correspondence with the mobile station 3 registered as having finished the transmission.

As explained above, according to the twelfth embodiment, the base station 2 determines the sizes of the wireless transfer blocks based on the packet length contained in the transmission request that has been received from each of the mobile stations 3 and the wireless communication link quality information. The base station 2 also determines the priority levels based on the transmitted data amount accumulated values that are respectively kept in correspondence with the mobile stations 3 and each of which indicates an accumulated value of the wireless transfer block sizes that are contained in the transmission instructions transmitted to the corresponding one of the mobile stations 3. The base station 2 allocates the wireless resources to the wireless transfer blocks that constitute each of the packets to be transmitted by the mobile stations 3 based on the determined priority levels. The base station 2 then transmits the transmission instructions containing the sizes of the wireless transfer blocks and the allocation of the wireless resources to each of the mobile stations 3. Each of the mobile stations 3 generates the wireless transfer blocks by dividing the packet to be transmitted, based on the wireless transfer block sizes contained in the transmission instructions. Each of the mobile stations 3 then transmits, to the base station 2, the generated wireless transfer blocks based on the allocation of the wireless resources contained in the transmission instructions. In other words, the base station 2 performs the scheduling process by using the transmitted data amount accumulated value that is an accumulated value of the sizes of the wireless transfer blocks to be transmitted by each of the mobile stations 3 according to the transmission instructions. As a result, in the case where each packet is divided into a plurality of wireless transfer blocks and transmitted, it is possible to lower the possibility of wasting the wireless transfer blocks that are already acknowledged as having been delivered, in the situation where some wireless transfer blocks fail to reach the transmission destination and the packet therefore fails to be reproduced. Consequently, it is possible to effectively utilize the wireless communication link.

Another arrangement is acceptable in which, like in the third embodiment described above, the scheduler unit 219 takes the "stay permitted remaining period" into consideration. In this situation, the mobile station 3 notifies the base station 2 of the "stay permitted remaining period".

Thirteenth Embodiment

A thirteenth embodiment of the present invention will be explained with reference to FIG. 27. In the thirteenth embodiment, an example in which the communication system according to the twelfth embodiment described above is applied to the 3GPP Long Term Evolution will be explained. The scheduler unit 219 included in the base station 2 performs the scheduling process by using the transmitted data amount accumulated value that is the amount of data within the packet that has already been transmitted. Thus, each of the mobile stations 3 needs to notify the base station 2 of the total data amount of the packets that are stored in the packet buffer 312 and the size of the packet to arrive at the base station 2 (arriving packet size). First, a wireless interface that is used by each of the mobile stations 3 to notify the base station 2 of the total data amount and the arriving packet size will be explained.

As explained in the tenth embodiment above, the 3GPP Long Term Evolution includes a buffer status report that reports the status of the transmission buffer in a mobile station. By using the buffer status report as a transmission request, each of the mobile stations 3 notifies the base station 2 of the total data amount of the packets that have been stored in the packet buffer 312 and the arriving packet size.

More specifically, when the predetermined transmission request reporting time has come, the control unit 319 notifies the transmission request transmitting unit 320 of the total data amount of the packets that have been stored in the packet buffer 312 and the packet size of the packet that is the target of the transmission request (arriving packet size). After that, the transmission request transmitting unit 320 generates the buffer status report based on the total data amount and the arriving packet size that have been indicated in the notification and transmits the generated buffer status report to the base station 2 via the wireless signal transmitting and receiving unit 316. When the transmission request receiving unit 218 included in the base station 2 has received the buffer status report via the wireless signal transmitting and receiving unit 211, the transmission request receiving unit 218 extracts the arriving packet size out of the buffer status report and outputs the extracted arriving packet size to the scheduler unit 219.

The transmission request reporting time at which at which each of the mobile stations 3 transmits the buffer status report to the base station 2 may be when the mobile station 3 has got a packet that needs to be transmitted, or once every predetermined period, or when segmentation has been performed. The predetermined period may be defined depending on a maximum wireless transfer block size specified by the base station 2.

Also, another arrangement is acceptable in which the buffer status report is submitted in units of the plurality of logical channels within the mobile station 3. Yet another arrangement is acceptable in which the buffer status report is submitted only for one or more specific channels (e.g., channels having higher priority levels). Yet another arrangement is acceptable in which a buffer status report is submitted for the plurality of logical channels collectively in units of the mobile stations 3.

When the arriving packet size is put into the buffer status report, if the arriving packet size value is put into the buffer status report as it is, it is necessary to use one byte or more. However, in the case where no data is stored in the packet buffer 312 (there is no data that has been segmented), the area used for the buffer status report to store the arriving packet size therein is wasted. To avoid wasting the area, another arrangement is acceptable in which the buffer status report includes a control bit indicating whether there is a segmentation status so that the number of bits can be reduced. Also, in the case where a buffer status report is generated for a plurality of logical channels collectively, if there is no segmented data for any of the logical channels, an arrangement is acceptable in which the buffer status report includes a control bit that is used in common among the logical channels. Also, to avoid wasting the area, yet another arrangement is acceptable in which the buffer status report includes a control bit indicating whether there is an arriving packet size so that the number of bits can be reduced. Also, in the case where a buffer status report is generated for a plurality of logical channels collectively, if there is no segmented data for any of the logical channels, an arrangement is acceptable in which the buffer status report includes a control bit that is used in common among the logical channels.

Further, to reduce the number of bits used for the arriving packet size, another arrangement is acceptable in which the arriving packet size is indicated by using an index. In this situation, in the same manner as according to the tenth embodiment described above with reference to FIG. 23 where the packet size is expressed by using an index, the arriving packet sizes are brought into correspondence with indexes, in increments of a predetermined number of bytes (in the example shown in FIG. 23, in increments of 100 bytes). With this arrangement, it is possible to reduce the number of bits compared to the example in which the arriving packet size value is literally expressed.

The extended MAC-e PDU format used for transferring the buffer status report according to the thirteenth embodiment is similar to the extended MAC-e PDU format according to the tenth embodiment explained above with reference to FIG. 24. Thus, only the differences will be explained: According to the thirteenth embodiment, in the case where the packet size is reported by using the extended MAC-e PDU obtained by extending the MAC-e PDU described in 3GPP TS25.321 used for transmitting the buffer status report, the delivery acknowledged amount accumulated value field in the SI field within the extended MAC-e PDU shown in FIG. 24 is deleted, so that the SI field is configured so as to include a UPH field, a TEBS field, an HLBS field, an HLID field, and a packet size field. Also, according to the thirteenth embodiment, in the case where the packet size is reported with separate reporting timing by using MAC layer control information, the packet size may be stored into the Value field in the extended MAC-e PDU according to the tenth embodiment explained with reference to FIG. 25.

Next, an inter-layer interface will be explained. According to the tenth embodiment described above, the delivery acknowledged amount accumulated value and the packet size are transmitted between the RLC layer and the MAC layer. According to the thirteenth embodiment, however, the arriving packet size is transmitted between the RLC layer and the MAC layer. In other words, the arriving packet size that is explained above with the wireless interface is also exchanged between the RLC layer and the MAC layer. An arrangement is acceptable in which the arriving packet size is submitted in units of the plurality of logical channels within the mobile station 3. Yet another arrangement is acceptable in which the arriving packet size is submitted only for one or more specific channels (e.g., channels having high priority levels). Yet another arrangement is acceptable in which the arriving packet size is submitted for the plurality of logical channels collectively in units of the mobile stations 3.

Like the transmission request reporting time, the time at which the segmentation status is submitted may be when the mobile station 3 has got a packet that needs to be transmitted, or once every predetermined period, or when segmentation has been performed.

FIG. 27 is a drawing of transfer information (primitive) between the RLC layer and the MAC layer obtained by extending the 3GPP TS25.321. In FIG. 27, "Request", "Indication", "Response", and "Confirm" are defined as parameters. Under the heading of "Request" for MAC-DATA, Data, Buffer Occupancy (BO), User Equipment Identifier (UE-ID), Type Indicator, and RLC Entity Info are listed. Further, under the heading of "Indication" for MAC-DATA, Data, Transport Block Number (No_TB), TD (Note), and Error Indication are listed. In addition, under the heading of "Indication" for MAC-STATUS, Packet Data Unit Number (No_PDU), Packet Data Unit Size (PDU_Size), Tx Status, and Status_Report_REQ are listed. Under the heading of "Response" for MAC-STATUS, Buffer Occupancy (BO), RLC Entity Info, and Arrived Packet Size are listed.

As explained above, according to the thirteenth embodiment, the buffer status report is used as the transmission request, and the segmentation status is contained in the "Request" parameter by extending the 3GPP TS25.321, as the transfer information between the layers. Thus, it is possible to transfer the information that is required in the scheduling process, without having to apply a significant modification to conventional wireless interfaces and conventional inter-layer interfaces.

In the thirteenth embodiment, the example is explained in which the communication system according to the twelfth embodiment described above is applied to the 3GPP Long Term Evolution. However, by using the delivery acknowledged amount accumulated value instead of the Arrived Packet Size, it is possible to apply this arrangement to the communication system according to the second embodiment described above.

Fourteenth Embodiment

Figure 28:
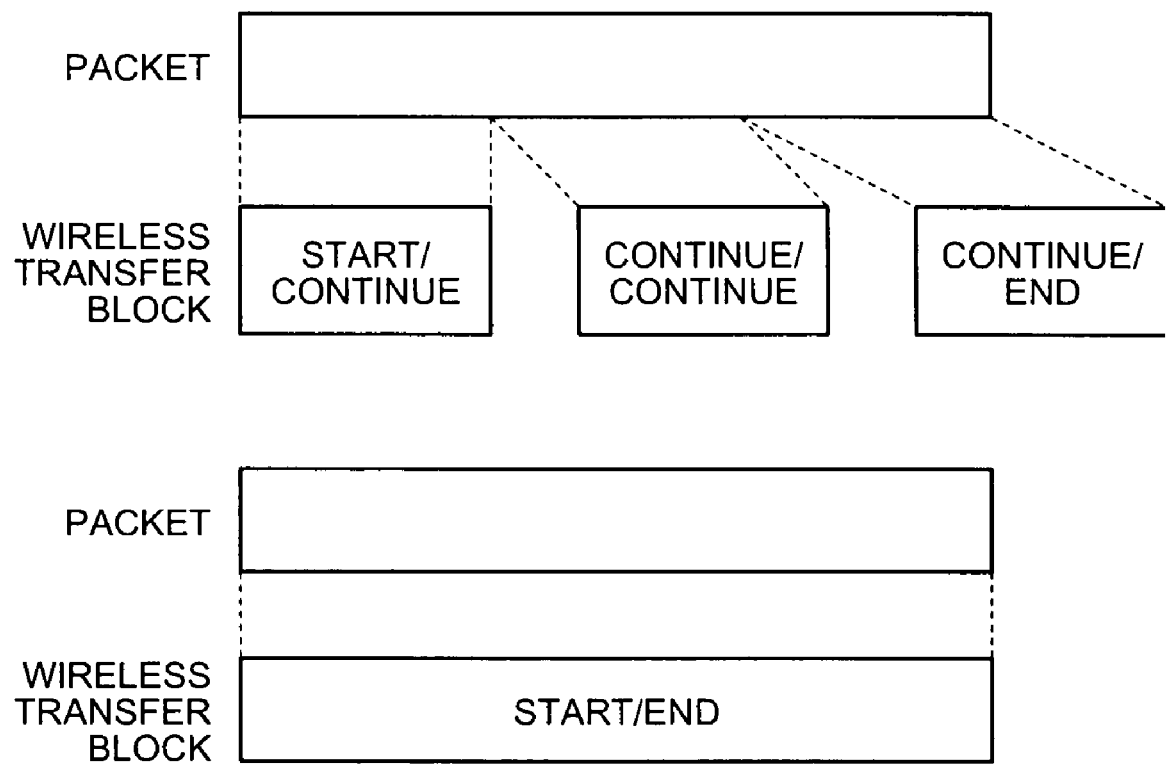
FIG. 28 is a drawing for explaining packet position information.

A fourteenth embodiment of the present invention will be explained with reference to FIG. 28. In the eleventh embodiment described above, each of the mobile stations 3 notifies the base station 2 of the transmitted data amount accumulated value indicating an accumulated value of the sizes of the wireless transfer blocks that have been transmitted to the base station 2, so that the scheduler unit 219 included in the base station 2 performs the scheduling process based on the transmitted data amount accumulated value that has been indicated in the notification. According to the fourteenth embodiment, however, an example will be explained in which packet position information is used instead of the transmitted data amount accumulated value, the packet position information indicating a positional relationship between each of the wireless transfer blocks that have been transmitted from the mobile stations 3 to the base station 2 and the packet.

The communication system according to the fourteenth embodiment is the same as the communication system according to the first embodiment shown in FIG. 1. Thus, the explanation thereof will be omitted. Also, the mobile station 3 and the base station 2 according to the fourteenth embodiment are the same as the mobile station 3 and the base station 2 according to the second embodiment shown in FIGS. 9 and 10; however, there are differences as follows: The control unit 319 included in the mobile station 3 stores therein the transmitted data amount accumulated value of the mobile station 3 and updates the transmitted data amount accumulated value and the packet position information when each of the wireless transfer blocks has been transmitted. Also, the control unit 319 exercises control so that the packet position information that has been updated by the control unit 319 is attached to each of the wireless transfer blocks that have been generated by the wireless transfer block generating unit 313 included in the mobile station 3.

In this situation, the packet position information is information indicating in what position within the packet the wireless transfer block is positioned. As shown in FIG. 28, in the case where the wireless transfer block that has been transmitted from the mobile station 3 to the base station 2 includes the beginning and the end of the packet, the packet position information is defined as "start and end". In the case where the wireless transfer block that has been transmitted from the mobile station 3 to the base station 2 includes the beginning of the packet but does not include the end of the packet, the position information is defined as "start and continue". In the case where the wireless transfer block that has been transmitted from the mobile station 3 to the base station 2 does not include the beginning of the packet but includes the end of the packet, the position information is defined as "continue and end". In the case where the wireless transfer block that has been transmitted from the mobile station 3 to the base station 2 includes neither the beginning of the packet nor the end of the packet, the position information is defined as "continue and continue". It is possible to obtain the packet position information based on the transmitted data amount accumulated value and the packet size.

Next, an operation of the communication system according to the fourteenth embodiment of the present invention will be explained. First, an operation in which the mobile station 3 that has not received a transmission instruction from the base station 2 notifies the base station 2 of a transmission request so that the base station 2 performs a scheduling process will be explained.

When the mobile station 3 has received, from an upper layer processing unit (not shown), data to be transmitted, the packet generating unit 311 included in the mobile station 3 generates a packet from the data to be transmitted and outputs the generated packet to the packet buffer 312. The packet buffer 312 included in the mobile station 3 buffers the packet.

When the predetermined transmission request reporting time has come, the control unit 319 included in the mobile station 3 generates a transmission request. In this situation, the information to be put into the transmission request may simply be information of at least one bit indicating whether there is a transmission request (whether there is a packet that needs to be transmitted). Another arrangement is acceptable in which the transmission request contains a buffer status report explained in the tenth embodiment above. The control unit 319 outputs the generated transmission request to the transmission request transmitting unit 320. The transmission request transmitting unit 320 transmits the transmission request to the base station 2, via the wireless signal transmitting and receiving unit 316. In this situation, an arrangement is acceptable in which the mobile station 3 continuously transmits a transmission request until the mobile station 3 receives a transmission instruction for the wireless transfer block from the base station 2.

When having received the transmission request via the wireless signal transmitting and receiving unit 211 included in the base station 2, the transmission request receiving unit 218 outputs the received transmission request to the scheduler unit 219. The scheduler unit 219 stores therein the information contained in the transmission request in correspondence with the mobile station 3 that transmitted the transmission request.

When the predetermined scheduling time has come, the scheduler unit 219 included in the base station 2 performs the scheduling process for the mobile station 3 of which the transmission request is stored. In this situation, in the case where there are two or more mobile stations 3 of which the transmission requests are stored, an arrangement is acceptable in which the wireless resources are allocated while giving a higher priority to one of the mobile stations 3 that has a larger upstream wireless communication link quality information value measured by the base station 2 or to one of the mobile stations 3 that has transmitted a transmission request a larger number of times.

The transmission instruction transmitting unit 217 included in the base station 2 transmits, to each of the mobile stations 3, the information of the wireless transfer block size (wireless transfer block size information) that has been determined by the scheduler unit 219 based on the wireless communication link quality information and the buffer status report and the information that has been scheduled during the scheduling process, as a transmission instruction.

Next, an operation that forms one of the characteristics of the fourteenth embodiment will be explained, in which the mobile station 3 that received a transmission instruction from the base station 2 prior to a predetermined scheduling time transmits, to the base station 2, the wireless transfer blocks that constitute the packet and the packet position information so that the base station 2 performs the scheduling process.

When having received the transmission instruction via the wireless signal transmitting and receiving unit 316 included in the mobile station 3, the transmission instruction receiving unit 318 outputs the received transmission instruction to the control unit 319. The control unit 319 outputs the wireless transfer block size contained in the transmission instruction to the wireless transfer block generating unit 313, as the wireless transfer block generation information. Also, the control unit 319 adds the wireless transfer block size contained in the transmission instruction to the stored transmitted data amount accumulated value so as to update the transmitted data amount accumulated value and the packet position information. When all the wireless transfer blocks that constitute one packet have been registered as transmitted, the control unit 319 initializes the transmitted data amount accumulated value.

Based on the wireless transfer block generation information, the wireless transfer block generating unit 313 included in the mobile station 3 generates wireless transfer blocks from the packet that is buffered in the packet buffer 312. After attaching the packet position information that has been updated by the control unit 319 to the generated wireless transfer blocks, the wireless transfer block generating unit 313 outputs the generated wireless transfer blocks to the re-transmission control unit 314.

When having received the wireless transfer blocks, the re-transmission control unit 314 included in the mobile station 3 performs a process that is required when the re-transmission process is performed. After that, the re-transmission control unit 314 outputs the wireless transfer blocks to the wireless transfer block transmitting unit 317. The wireless transfer block transmitting unit 317 transmits the wireless transfer blocks to the base station 2 via the wireless signal transmitting and receiving unit 316.

The wireless transfer block receiving unit 213 included in the base station 2 extracts the packet position information out of the signal that has been received via the wireless signal transmitting and receiving unit 211 and outputs the extracted packet position information to the scheduler unit 219. The scheduler unit 219 stores therein the information contained in the packet position information in correspondence with the mobile station 3 that transmitted the packet position information.

When the predetermined scheduling time has come, the scheduler unit 219 included in the base station 2 performs a scheduling process of determining the priority level of each of the packets based on a corresponding one of the pieces of packet position information that are respectively stored in correspondence with the mobile stations 3 and allocating a wireless resource to each of the mobile stations 3 according to the determined priority levels. In this situation, the priority level of each of the packets is determined based on the packet position information in the following order: "continue and continue">"start and continue">"continue and end"="start and end". The scheduling process is the same as the operation explained above with reference to the flowchart in FIG. 6. Thus, the explanation thereof will be omitted. The transmission instruction transmitting unit 217 transmits, to each of the mobile stations 3, the information of the wireless transfer block size (wireless transfer block size information) that has been determined by the scheduler unit 219 based on the wireless communication link quality information and the buffer status report and the information that has been scheduled during the scheduling process, as a transmission instruction.

The wireless transfer block receiving unit 213 extracts the wireless transfer blocks out of the signals that have been received via the wireless signal transmitting and receiving unit 211 and outputs the extracted wireless transfer blocks to the re-transmission control unit 214. The re-transmission control unit 214 judges whether each of the wireless transfer blocks has properly been received. In the case where each of the wireless transfer blocks has properly been received, the re-transmission control unit 214 outputs the wireless transfer block to the packet reproducing unit 215. Also, the re-transmission control unit 214 notifies the re-transmission control signal transmitting unit 212 that the wireless transfer block has properly been received.

When all the wireless transfer blocks that constitute the packet have properly been received and the packet has been reproduced, the packet reproducing unit 215 included in the base station 2 transmits the reproduced packet to the wired network 1 via the wired signal transmitting unit 216.

On the contrary, in the case where any one of the wireless transfer blocks has not properly been received, the re-transmission control unit 214 included in the base station 2 discards such a wireless transfer block and notifies the re-transmission control signal transmitting unit 212 that the wireless transfer block has not properly been received.

In the case where the re-transmission control signal transmitting unit 212 included in the base station 2 has been notified that any one of the wireless transfer blocks has not properly been received, the re-transmission control signal transmitting unit 212 transmits a re-transmission request as the re-transmission control information to the mobile station 3 via the wireless signal transmitting and receiving unit 211. On the contrary, in the case where the re-transmission control signal transmitting unit 212 has been notified that each of the wireless transfer blocks have properly been received, the re-transmission control signal transmitting unit 212 transmits a delivery acknowledgment as the re-transmission control information to the mobile station 3 via the wireless signal transmitting and receiving unit 211.

Based on the re-transmission control information that has been received via the wireless signal transmitting and receiving unit 316 and the re-transmission control signal receiving unit 315, the re-transmission control unit 314 included in the mobile station 3 determines whether a re-transmission process should be performed in units of wireless transfer blocks. In the case where the re-transmission control information is a re-transmission request for requesting that the wireless transfer block should be re-transmitted, the re-transmission control unit 314 performs the predetermined re-transmission process on the wireless transfer block for which the re-transmission has been requested.

As explained above, according to the fourteenth embodiment, the base station 2 determines the sizes of the wireless transfer blocks based on the measured wireless communication link quality information and the buffer status report. The base station 2 also determines the priority levels based on the packet position information that is the information indicating the positional relationship between each of the wireless transfer blocks that have been transmitted from the mobile stations 3 to the base station 2 and the packet. The base station 2 allocates the wireless resources to the wireless transfer blocks that constitute each of the packets to be transmitted by the mobile stations 3, based on the determined priority levels. The base station 2 then transmits the transmission instructions containing the sizes of the wireless transfer blocks and the allocation of the wireless resources to the mobile stations 3. Each of the mobile stations 3 generates the wireless transfer blocks by dividing the packet to be transmitted based on the wireless transfer block sizes contained in the transmission instructions. Each of the mobile stations 3 then attaches the packet position information that is the information indicating the positional relationship within the packet to each of the generated wireless transfer blocks and transmits the wireless transfer blocks to the base station 2 based on the allocation of the wireless resources contained in the transmission instructions. As a result, in the case where each packet is divided into a plurality of wireless transfer blocks and transmitted, it is possible to lower the possibility of wasting the wireless transfer blocks that are already acknowledged as having been delivered, in the situation where some wireless transfer blocks fail to reach the transmission destination and the packet therefore fails to be reproduced. Consequently, it is possible to effectively utilize the wireless communication link. Further, because it is possible to express the four different states with the packet position information, it is possible to reduce the amount of the control information of which the base station 2 is notified by the mobile station 3, compared to the example explained in the tenth embodiment or the eleventh embodiment.

In the case where the communication system according to the fourteenth embodiment is applied to the 3GPP Long Term Evolution, the Segmentation Info Field described in 3GPP TS36.322 may be used as the packet position information. With this arrangement, it is possible to transfer the information that is required in the scheduling process without having to apply a significant modification to conventional wireless interfaces and conventional inter-layer interfaces.

Another arrangement is acceptable in which, when the mobile station 3 has received a transmission request, the mobile station 3 selects a logical channel having a higher priority level based on the transmitted data amount accumulated value that has been stored therein so that the wireless transfer blocks are generated from the data in the logical channel.

Yet another arrangement is acceptable in which, like in the third embodiment described above, the scheduler unit 219 takes the "stay permitted remaining period" into consideration. In this situation, the mobile station 3 notifies the base station 2 of the "stay permitted remaining period", together with the transmitted data amount accumulated value.

Fifteenth Embodiment

In a fifteenth embodiment of the present invention, a process that is performed in the case where, with respect to the priority levels of the mobile stations 3 that have been determined by the scheduler unit 219 included in the base station 2 according to the first to the fourteenth embodiments, two or more of the mobile stations 3 have an equal priority level will be explained.

For example, according to the first embodiment above, the priority levels are determined based on the delivery acknowledged amount accumulated values each indicating an accumulated value of the sizes of the wireless transfer blocks for each of which a delivery acknowledgment has been made, the delivery acknowledgment indicating that the wireless transfer block has reached the mobile station 3. The wireless resources are then allocated while prioritizing the mobile stations 3 in such a manner that the highest priority is given to the mobile station 3 having the largest delivery acknowledged amount accumulated value.

As another example, according to the second embodiment above, the priority levels are determined based on the delivery acknowledged amount accumulated values each indicating an accumulated value of the sizes of the wireless transfer blocks that have properly been received among the wireless transfer blocks transmitted by each of the mobile stations 3. The wireless resources are then allocated while prioritizing the mobile stations 3 in such a manner that the highest priority is given to the mobile station 3 having the largest delivery acknowledged amount accumulated value.

However, the description of the first and the second embodiments does not describe which one of the mobile stations 3 the wireless resource is allocated to, in the case where two or more of the mobile stations 3 have the highest priority level according to the priority levels determined by the scheduler unit 219 included in the base station 2.

In the ninth embodiment above, in the case where two or more of the mobile stations 3 have an equal delivery acknowledged amount accumulated value, the scheduling process is performed while giving a higher priority to one of the mobile stations 3 having a larger packet size. In contrast, according to the fifteenth embodiment, in the case where two or more of the mobile stations 3 have an equal delivery acknowledged amount accumulated value, the scheduling process is performed while giving a higher priority to one of the mobile stations 3 having a larger wireless communication link quality information value.

Similarly, in the case where the delivery acknowledged amount accumulated value or the packet position information is expressed by using an index, like in the tenth or the fourteenth embodiment described above, it is also acceptable to perform the scheduling process on two or more of the mobile stations 3 having an equal priority level according to the delivery acknowledged amount accumulated value or the packet position information, while giving a higher priority to one of the mobile stations 3 having a larger wireless communication link quality information value.

Further, it is acceptable to perform the scheduling process while giving a higher priority to one of the mobile station 3 having a larger wireless communication link quality information value, not only in the case where the delivery acknowledged amount accumulated values are exactly equal, but also in the case where a difference range is smaller than a predetermined threshold value, the difference range being defined as a result of comparing the delivery acknowledged amount accumulated values corresponding to the mobile stations 3 with one another (difference).

In the third embodiment described above, the priority level of each of the wireless transfer blocks is calculated by using the expression below, based on the stay permitted remaining period and the delivery acknowledged amount accumulated value:

$$P\text{total} = \alpha \times P\text{act} + B \times P\text{delay}$$

In the expression above, "Pact" denotes a priority level based on the delivery acknowledged amount accumulated value, whereas "Pdelay" denotes a priority level based on the stay permitted remaining period. "$\alpha$" denotes a coefficient (weight) for the priority level based on the delivery acknowledged amount accumulated value, whereas "B" denotes a coefficient (weight) for the priority level based on the stay permitted remaining period.

Further, according to the third embodiment, it is also acceptable to determine the priority levels based on the wireless communication link quality information and the delivery acknowledged amount accumulated values. Thus, of a plurality of mobile stations 3 having an equal delivery acknowledged amount accumulated value, the mobile station 3 having a larger wireless communication link quality information value is arranged to have a higher priority level. Thus, it is possible to achieve the same advantageous effect as in the fifteenth embodiment. However, according to the third embodiment, there is a possibility that the priority level of the mobile station 3 having a small delivery acknowledged amount accumulated value and a large wireless communication link quality information value may be equal to the priority level of the mobile station 3 having a large delivery acknowledged amount accumulated value and a small wireless communication link quality information value.

In contrast, the fifteenth embodiment is different from the third embodiment described above in that the priority levels are first determined based on the delivery acknowledged amount accumulated values, and only in the case where two or more of the mobile stations 3 have an equal delivery acknowledged amount accumulated value or in the case where the difference range of two or more of the mobile stations 3 is within the threshold value, the priority levels are determined based on the wireless communication link quality information.

As explained above, according to the fifteenth embodiment, in the case where two or more of the mobile stations 3 have an equal priority level, according to the priority levels that have been determined by the scheduler unit 219 by using the delivery acknowledged amount accumulated values, the packet sizes, or the stay permitted remaining periods and the delivery acknowledged amount accumulated values, the priority levels among the mobile stations 3 having the equal priority level are determined based on the wireless communication link quality information. Thus, it is possible to determine the priority levels in a more detailed manner.

In the fifteenth embodiment, only in the case where two or more of the mobile stations 3 have an equal delivery acknowledged amount accumulated value or in the case where the difference range of two or more of the mobile stations 3 is within the threshold value, the priority levels are determined based on the wireless communication link quality information. However, instead of using the wireless communication link quality information as it is, another arrangement is acceptable in which the wireless resources are allocated while a higher priority is given to a mobile station for which the difference between an instantaneous wireless communication link quality information value and an average wireless communication link quality information value is larger. Yet another arrangement is acceptable in which the priority levels are determined by using other appropriate indexes (e.g., the stay permitted remaining periods).

Sixteenth Embodiment

In the third embodiment described above, the priority levels are determined based on the stay permitted remaining periods and the delivery acknowledged amount accumulated values, the stay permitted remaining periods each indicating the time period from a current time to a time until which the wireless transfer blocks are permitted to stay. Thus, it is possible to inhibit discarding of the wireless transfer blocks caused by the packet's exceeding the stay permitted period. As a result, in the case where each packet is divided into a plurality of wireless transfer blocks and transmitted, it is possible to lower the possibility of wasting the wireless transfer blocks that are already acknowledged as having been delivered, in the situation where some wireless transfer blocks fail to reach the transmission destination and the packet therefore fails to be reproduced. Consequently, it is possible to effectively utilize the wireless communication link.

In the description of the third embodiment above, however, the example of the downstream communication from the base station 2 to the mobile station 3 is explained. Thus, to apply the method according to the third embodiment to an upstream communication from the mobile station 3 to the base station 2, it is necessary for the mobile station 3 to notify the base station 2 of the stay permitted remaining period. In contrast, according to a sixteenth embodiment of the present invention, in an upstream communication from the mobile station 3 to the base station 2, it is possible to achieve the same advantageous effect as in the third embodiment, without the mobile station 3 having to notify the base station 2 of the stay permitted remaining period.

The communication system according to the sixteenth embodiment is the same as the communication system shown in FIG. 1. Thus, the explanation thereof will be omitted. Also, the configurations of the base station 2 and the mobile station 3 that perform the upstream communication are the same as the configurations of the base station 2 and the mobile station 3 according to the second embodiment shown in FIGS. 10 and 9. Thus, the explanation thereof will be omitted.

First, an operation according to the sixteenth embodiment in which the mobile station 3 that has not received a transmission instruction from the base station 2 notifies the base station 2 of a transmission request so that the base station 2 performs the scheduling process will be explained.

When the packet generating unit 311 included in the mobile station 3 has received, from an upper layer processing unit (not shown), data to be transmitted, the packet generating unit 311 generates a packet from the data to be transmitted and outputs the generated packet to the packet buffer 312. The packet buffer 312 included in the mobile station 3 buffers the packet.

When the predetermined transmission request reporting time has come, the control unit 319 included in the mobile station 3 generates a transmission request. In this situation, the information to be put into the transmission request may simply be information of at least one bit indicating whether there is a transmission request. Another arrangement is acceptable in which the transmission request contains a buffer status report explained in the tenth embodiment above. The control unit 319 outputs the generated transmission request to the transmission request transmitting unit 320. The transmission request transmitting unit 320 transmits the transmission request to the base station 2, via the wireless signal transmitting and receiving unit 316. In this situation, an arrangement is acceptable in which the mobile station 3 continuously transmits a transmission request until the mobile station 3 receives a transmission instruction for the wireless transfer block from the base station 2.

When having received the transmission request via the wireless signal transmitting and receiving unit 211 included in the base station 2, the transmission request receiving unit 218 outputs the received transmission request to the scheduler unit 219. The scheduler unit 219 stores therein the information contained in the transmission request in correspondence with the mobile station 3 that transmitted the transmission request. Further, with respect to the mobile station 3, the scheduler unit 219 starts measuring the time period (transmission request reception elapsed period) that has elapsed since the reception of the transmission request from the mobile station 3, by using a clocking function (timer) included in the base station 2. In this situation, in the case where the mobile station 3 has continuously been transmitting a transmission request, the scheduler unit 219 measures the transmission request reception elapsed period starting with the reception of the transmission request that was received from the mobile station 3 the earliest. In other words, when the scheduler unit 219 has received a transmission request, the scheduler unit 219 judges whether the process of measuring the transmission request reception elapsed period has already been started for the mobile station 3 that transmitted the transmission request. Only in the case where the process of measuring the transmission request reception elapsed period has not yet been started, the scheduler unit 219 starts the process of measuring the transmission request reception elapsed period for the mobile station 3.

When the predetermined scheduling time has come, the scheduler unit 219 included in the base station 2 performs a scheduling process of determining the priority level of each of the packets based on a corresponding one of the transmission request reception elapsed periods that have respectively been measured in correspondence with the mobile stations 3 and allocating the wireless resource to each of the mobile stations 3 according to the determined priority levels. In this situation, the scheduler unit 219 determines the priority levels in such a manner that the longer the transmission request reception elapsed period is, the higher is the priority level.

The transmission instruction transmitting unit 217 transmits, to each of the mobile stations 3, the information of the wireless transfer block size (wireless transfer block size information) that has been determined by the scheduler unit 219 based on the wireless communication link quality information and the information that has been scheduled during the scheduling process, as a transmission instruction.

As explained above according to the sixteenth embodiment, the transmission request reception elapse period from the time at which the base station 2 receives the transmission request transmitted by each of the mobile stations 3 to the current time at which the scheduling process is performed is measured, so that the priority level of each of the packets is determined based on the transmission request reception elapsed period. Thus, it is possible to inhibit discarding of the wireless transfer blocks caused by the packet's exceeding the stay permitted period, without each of the mobile stations 3 having to provide the notification of the stay permitted period remaining period. As a result, in the case where each packet is divided into a plurality of wireless transfer blocks and transmitted, it is possible to lower the possibility of wasting the wireless transfer blocks that are already acknowledged as having been delivered, in the situation where some wireless transfer blocks fail to reach the transmission destination and the packet therefore fails to be reproduced. Consequently, it is possible to effectively utilize the wireless communication link.

According to the sixteenth embodiment, the priority level of each of the packets is determined based on the transmission request reception elapsed period from the time at which the transmission request is received to the current time at which the scheduling process is performed; however, in the case where the mobile station 3 has continuously been transmitting a transmission request, another arrangement is acceptable in which the scheduler unit 219 included in the base station 2 stores therein how many times a transmission request has been received, so that the scheduler unit 219 performs the scheduling process while giving a higher priority to the mobile station 3 from which a transmission request is received a larger number of times.

In the case where the base station 2 is able to find out the stay permitted period for the packet of which a transmission is being requested by the mobile station 3, another arrangement is acceptable in which the scheduler unit 219 calculates the stay permitted remaining period based on the time at which the transmission request is received, the current time, and the permitted stay period, so that the calculated stay permitted remaining period is used as the priority level of the packet. In this situation, even if there are two or more packets having an equal elapsed period from the time at which the transmission request is received to the current time, it is possible to inhibit discarding of the wireless transfer blocks caused by the packets' exceeding the stay permitted period, by performing the scheduling process while giving a higher priority to one of the mobile stations 3 having a shorter stay permitted remaining period.

According to the sixteenth embodiment, the time period from the time at which the transmission request is received from the mobile station 3 to the current time at which the scheduling process is performed by the scheduler unit 219 is defined as the transmission request reception elapsed period; however, the transmission request reception elapsed period is not limited to this example. For example, in the case where each of the mobile stations 3 attaches packet position information to each of the wireless transfer blocks as explained in the fourteenth embodiment above, another arrangement is acceptable in which the transmission request reception elapsed period is defined as the time period from the time at which a wireless transfer block to which packet position information indicating that the beginning of the packet is included but the end of the packet is not included is attached (the wireless transfer block is the first one of the wireless transfer blocks obtained by dividing the packet) is received to the current time at which the scheduler unit 219 performs the scheduling process. In this situation, the scheduler unit 219 judges whether the packet position information attached to each of the wireless transfer blocks indicates that the beginning of the packet is included. In the case where the scheduler unit 219 has judged that the packet position information indicates that the beginning of the packet is included, the scheduler unit 219 starts measuring the transmission request reception elapsed period for the mobile station 3 that transmitted the wireless transfer block, by using the clocking function. With this arrangement, it is possible to inhibit discarding of the wireless transfer blocks caused by the packet's exceeding the stay permitted period without the mobile station 3 having to provide the notification of the stay permitted remaining period. As a result, in the case where each packet is divided into a plurality of wireless transfer blocks and transmitted, it is possible to lower the possibility of wasting the wireless transfer blocks that are already acknowledged as having been delivered, in the situation where some wireless transfer blocks fail to reach the transmission destination and the packet therefore fails to be reproduced. Consequently, it is possible to effectively utilize the wireless communication link.

Seventeenth Embodiment

According to the sixteenth embodiment described above, the elapsed period since the reception of the transmission request (transmission request reception elapsed period) starts being measured at the time when the base station 2 receives a transmission request that has been transmitted by a mobile station 3 by using the clocking function included in the device. During the scheduling process, the priority level of each of the packets is determined based on the transmission request reception elapsed period. Thus, it is possible to inhibit discarding of the wireless transfer blocks caused by the packet's exceeding the stay permitted period. As a result, it is possible to achieve the same advantageous effect as in the third embodiment, without each of the mobile stations 3 having to provide the notification of the stay permitted remaining period.

According to the sixteenth embodiment above, however, the base station 2 needs to measure the transmission request reception elapsed period for each of the transmission requests that have respectively been received from a plurality of mobile stations 3. In contrast, according to a seventeenth embodiment of the present invention, urgency of each of the transmission requests is put into the buffer status report explained in the tenth embodiment above. As a result, it is possible to perform the scheduling process while giving a higher priority to a mobile station 3 having a shorter stay permitted remaining period, without the base station 2 having to measure the transmission request reception elapsed period for each of the mobile stations 3.

The communication system according to the seventeenth embodiment is the same as the communication system shown in FIG. 1. Thus, the explanation thereof will be omitted. Also, the configurations of the base station 2 and the mobile station 3 that perform the upstream communication from the mobile station 3 to the base station 2 are the same as the configurations of the base station 2 and the mobile station 3 according to the second embodiment shown in FIGS. 10 and 9. Thus, the explanation thereof will be omitted.

First, an operation according to the seventeenth embodiment in which a mobile station 3 notifies the base station 2 of a transmission request, so that the base station 2 performs the scheduling process will be explained. In this situation, according to the seventeenth embodiment, a buffer status report is used as the transmission request, like in the tenth embodiment.

When the mobile station 3 has received, from an upper layer processing unit (not shown), data to be transmitted, the packet generating unit 311 included in the mobile station 3 generates a packet from the data to be transmitted and outputs the generated packet to the packet buffer 312. The packet buffer 312 included in the mobile station 3 buffers the packet. Also, the control unit 319 starts measuring a stay permitted period of the new packet by using the clocking function included in the mobile station 3. The control unit 319 keeps track of the stay permitted period of each of the packets at all times.

The control unit 319 included in the mobile station 3 judges the level of urgency of the stay permitted remaining period of each of the packets, based on a predetermined evaluation criterion. In this situation, the evaluation criterion is provided by an upper layer. For example, in the case where the ratio between a stay permitted period and a stay permitted remaining period has become 10%, it is considered as urgent. The ratio between a stay permitted period and a stay permitted remaining period does not have to be judged by using the limited value. It is acceptable to use other values. Needless to say, it is acceptable to use other evaluation criteria, too. It is also acceptable to express the level of urgency by using information of at least one bit that indicates whether it is urgent.

When the predetermined transmission request reporting time has come, the control unit 319 included in the mobile station 3 generates a buffer status report as explained in tenth embodiment above. When generating the buffer status report, the control unit 319 attaches the level of urgency described above to the buffer status report. In this situation, when the control unit 319 attaches the level of urgency to the buffer status report, if the entire buffer status report can be expressed by using six bits, five bits may be used for the buffer status report explained in the tenth embodiment above, while the remaining one bit may be used for reporting the level of urgency. The control unit 319 outputs the generated buffer status report to the transmission request transmitting unit 320.

The transmission request transmitting unit 320 transmits the transmission request to the base station 2, via the wireless signal transmitting and receiving unit 316. In this situation, an arrangement is acceptable in which the mobile station 3 continuously transmits a transmission request until the mobile station 3 receives a transmission instruction for the wireless transfer block from the base station 2. Also, in the case where the mobile station 3 has already received the transmission instruction for the wireless transfer block from the base station 2, yet another arrangement is acceptable in which the mobile station 3 transmits the transmission request to the base station 2 by attaching the transmission request to the wireless transfer block.

When having received the transmission request via the wireless signal transmitting and receiving unit 211 included in the base station 2, the transmission request receiving unit 218 outputs the received transmission request to the scheduler unit 219. The scheduler unit 219 stores therein the level of urgency contained in the transmission request in correspondence with the mobile station 3 that transmitted the transmission request.

When the predetermined scheduling time has come, the scheduler unit 219 included in the base station 2 performs a scheduling process of determining the priority level of each of the packets based on a corresponding one of the levels of urgency that are respectively stored in correspondence with the mobile stations 3 and allocating a wireless resource to each of the mobile stations 3 according to the determined priority levels. In this situation, in the case where there are two or more mobile stations 3 of which the level of urgency is not high, the scheduling process is performed by using other indicators of the priority levels. Examples of other priority level indicators include the delivery acknowledged amount accumulated value described in the second embodiment.

As explained above, according to the seventeenth embodiment, the control unit 319 included in the mobile station 3 calculates the level of urgency based on the stay permitted remaining period of each of the packets, puts the level of urgency into the buffer state report, and transmits the buffer status report containing the level of urgency to the base station 2. The scheduler unit 219 included in the base station 2 determines the priority level of each of the packets based on the level of urgency of the stay permitted remaining period of the packet contained in the buffer status report that has been transmitted from the mobile station 3. Thus, it is possible to inhibit discarding of the wireless transfer blocks caused by the packet's exceeding the stay permitted period. As a result, in the case where each packet is divided into a plurality of wireless transfer blocks and transmitted, it is possible to lower the possibility of wasting the wireless transfer blocks that are already acknowledged as having been delivered, in the situation where some wireless transfer blocks fail to reach the transmission destination and the packet therefore fails to be reproduced. Consequently, it is possible to effectively utilize the wireless communication link.

According to the seventeenth embodiment, one of the bits used for the buffer status report is used for reporting the level of urgency. However, another arrangement is acceptable in which a buffer status report value having a specific value is defined as urgent. For example, in the case where the buffer status report is expressed by using six bits, 111111 may be defined as urgent. If the buffer status report were expressed by using five bits, the granularity would correspond to 32 (fifth power of 2) different combinations. However, with the arrangement above, in the case where only one specific value using the six bits is defined as urgent, the granularity corresponds to 63 ((the sixth power of 2)−1) different combinations. Thus, it is possible to achieve the granularity that is two times minus 1 as large as the example with the five bits. Consequently, it is possible to determine the priority levels in a more detailed manner.

INDUSTRIAL APPLICABILITY

As explained above, the communication system according to the present invention is useful as a communication system that uses a wireless communication link. In particular, the communication system according to the present invention is applicable for a communication system that uses wireless transfer blocks obtained by dividing a packet.

The invention claimed is:

1. A communication system in which a mobile station communicates with a target station via a base station that is connected to a network, wherein
the base station includes:
a wireless transfer block generating unit that divides a packet to be transmitted into a plurality of wireless transfer blocks,
a scheduler unit that determines a priority of a wireless transfer block based on a delivery acknowledged amount accumulated value indicating an accumulated value of sizes of wireless transfer blocks for which a delivery acknowledgment is obtained which indicates that the wireless transfer block reached the mobile station, and allocates wireless resources to the wireless transfer blocks constituting the packet based on determined priority, and
a wireless transfer block transmitting unit that transmits the wireless transfer blocks generated by the wireless transfer block generating unit by using the wireless resources allocated by the scheduler unit; and
the mobile station includes:
a re-transmission control unit that transmits the delivery acknowledgment to the base station when the wireless transfer block is properly received from the base station and transmits a re-transmission request to the base station when the wireless transfer block is not properly received from the base station, and
a packet reproducing unit that reproduces the packet from the wireless transfer blocks received from the base station.

2. The communication system according to claim 1, wherein when the base station is connected to the network via a base station control device,
the base station control device transmits divided segments obtained by dividing the packet to the base station,
the wireless transfer block generating unit of the base station generates the wireless transfer blocks from the divided segments, and
the packet reproducing unit of the mobile station reproduces the divided segments from the wireless transfer blocks received from the base station and reproduces the packet from reproduced divided segments.

3. The communication system according to claim 1, wherein the scheduler unit of the base station determines the priority based on a stay permitted remaining period indicating a time period from a current time to a time until which the wireless transfer blocks are permitted to stay and the delivery acknowledged amount accumulated value.

4. The communication system according to claim 1, wherein the scheduler unit of the base station selects transmission quality in transmitting the wireless transfer blocks to which the wireless resources are allocated, based on the priority.

5. The communication system according to claim 4, wherein the transmission quality is any one of modulation method, encoding ratio, and transmission power.

6. The communication system according to claim 1, wherein the scheduler unit of the base station selects an upper limit value of number of times of re-transmission for the wireless transfer blocks, based on the priority.

7. The communication system according to claim 1, wherein the scheduler unit of the base station selects a value indicating how many wireless transfer blocks the packet is divided into and transmission quality, based on a packet length of the packet and wireless communication link quality information.

8. The communication system according to claim 1, wherein
the mobile station further includes a handover requesting unit that measures wireless communication link quality between the mobile station and the base station to which the mobile station is currently connected and between the mobile station and another base station adjacent to the base station to which the mobile station is currently connected and transmits a handover request for requesting a handover based on measured wireless communication link quality,
the base station further includes a handover control unit that, upon receiving a handover execution permission, executes a handover process for the mobile station that transmitted the handover request, and
upon receiving the handover request, the scheduler unit sets at least one of higher priority and higher transmission quality for undelivered wireless transfer blocks constituting a packet that is currently being transmitted to the mobile station that transmitted the handover request regardless of the delivery acknowledged amount accumulated value and outputs the handover execution permission to the handover control unit after a transmission of the packet that is currently being transmitted to the mobile station that transmitted the handover request is finished.

9. The communication system according to claim 8, wherein
the handover requesting unit of the mobile station calculates a degradation speed of the wireless communication link quality based on the measured wireless communication link quality, estimates a handover permitted delay period during which the mobile station is able to communicate with the base station to which the mobile station is currently connected based on calculated degradation speed, and transmits the handover request including estimated handover permitted delay period,
the scheduler unit of the base station calculates a delivery completion required period that is required to transmit the undelivered wireless transfer blocks constituting the packet that is currently being transmitted to the mobile station that transmitted the handover request, when the delivery completion required period is equal to or shorter than the handover permitted delay period included in the handover request, sets at least one of higher priority and higher transmission quality for the undelivered wireless transfer blocks constituting the packet that is currently being transmitted to the mobile station that transmitted the handover request regardless of the delivery acknowledged amount accumulated value, outputs the handover execution permission to the handover control unit after a transmission of the packet that is currently being transmitted to the mobile station that transmitted the handover request is finished, and when the delivery completion required period is longer than the handover permitted delay period included in the handover request, immediately outputs the handover execution permission to the handover control unit.

10. The communication system according to claim 9, wherein when the delivery completion required period is equal to or shorter than the handover permitted delay period included in the handover request, the scheduler unit of the base station adjusts the priority and the transmission quality according to the delivery completion required period and the handover permitted delay period.

11. The communication system according to claim 1, wherein when two or more mobile stations have an equal priority determined based on delivery acknowledged amount accumulated values each indicating an accumulated value of sizes of wireless transfer blocks for each of which a delivery acknowledgment indicating that the wireless transfer block has reached a corresponding one of the mobile stations has been made, the scheduler unit of the base station determines the priority based on wireless communication link quality information.

12. A base station configured to be connected to a wired network via a wired communication link and connected to a mobile station via a wireless communication link, the base station comprising:
a wireless transfer block generating unit that divides a packet to be transmitted into a plurality of wireless transfer blocks;
a scheduler unit that determines a priority of a wireless transfer block based on a delivery acknowledged amount accumulated value indicating an accumulated value of sizes of wireless transfer blocks for which a delivery acknowledgment is obtained which indicates that the wireless transfer block reached the mobile station, and allocates wireless resources to the wireless transfer blocks constituting the packet based on determined priority; and
a wireless transfer block transmitting unit that transmits the wireless transfer blocks generated by the wireless transfer block generating unit by using the wireless resources allocated by the scheduler unit.

13. The base station according to claim 12, further comprising a handover control unit that, upon receiving a handover execution permission, executes a handover process for the mobile station that transmitted a handover request, wherein
the mobile station measures wireless communication link quality between the mobile station and the base station to which the mobile station is currently connected and between the mobile station and another base station that is positioned adjacent to the base station to which the mobile station is currently connected, and
upon receiving the handover request, the scheduler unit sets at least one of higher priority and higher transmission quality for undelivered wireless transfer blocks constituting a packet that is currently being transmitted to the mobile station that transmitted the handover request regardless of the delivery acknowledged amount accumulated value and outputs the handover execution permission to the handover control unit after a transmission of the packet that is currently being transmitted to the mobile station that transmitted the handover request is finished.

14. A base station configured to be connected to a mobile station via a wireless communication link, the base station comprising:
a scheduler unit that determines sizes of wireless transfer blocks based on a packet length included in a transmission request received from the mobile station and wireless communication link quality information, determines a priority based on a delivery acknowledged amount accumulated value indicating an accumulated value of sizes of wireless transfer blocks properly received among the wireless transfer blocks transmitted by the mobile station, and allocates wireless resources to the wireless transfer blocks constituting the packet to be transmitted by the mobile station based on determined priority; and
a transmission instruction transmitting unit that transmits a transmission instruction including the sizes of the wireless transfer blocks and the allocation of the wireless resource determined by the scheduler unit to the mobile station.

15. A base station configured to be connected to a mobile station via a wireless communication link, the base station comprising:
a scheduler unit that determines sizes of wireless transfer blocks based on information indicating whether there is a packet to be transmitted included in a transmission request received from the mobile station and wireless communication link quality information, determines a priority based on a transmission request reception elapsed period that is an elapsed time from a reception of the transmission request from the mobile station to a current time, and allocates wireless resources to the wireless transfer blocks constituting the packet to be transmitted by the mobile station based on determined priority; and
a transmission instruction transmitting unit that transmits a transmission instruction including the sizes of the wireless transfer blocks and the allocation of the wireless resource determined by the scheduler unit to the mobile station.

16. The base station according to claim 15, wherein the scheduler unit determines the priority by using an elapsed time period from a time at which a wireless transfer block with the packet position information indicating that the wireless transfer block includes the beginning of the packet to be transmitted attached is received from the mobile station to the current time as the transmission request reception elapsed period.

17. A base station configured to be connected to a mobile station via a wireless communication link, the base station comprising:
a scheduler unit that determines sizes of wireless transfer blocks based on a buffer status report received from the mobile station and wireless communication link quality information, wherein the buffer status report includes urgency information indicating whether it is urgent to transfer a packet, determines a priority based on the urgency information included in the buffer status report received from the mobile station, and allocates wireless resources to the wireless transfer blocks constituting the packet to be transmitted by the mobile station based on determined priority; and
a transmission instruction transmitting unit that transmits a transmission instruction including the sizes of the wireless transfer blocks and the allocation of the wireless resource determined by the scheduler unit to the mobile station.

18. A mobile station that is connected to a base station via a wireless communication link, the mobile station comprising:
a transmission request transmitting unit that transmits a transmission request including a buffer status report to the base station, wherein the buffer status report includes urgency information indicating whether it is urgent to transfer a packet;
a wireless transfer block generating unit that generates wireless transfer blocks by dividing a packet to be transmitted based on sizes of the wireless transfer blocks included in a transmission instruction provided by the base station; and
a wireless transfer block transmitting unit that transmits the wireless transfer blocks generated by the wireless transfer block generating unit to the base station based on an allocation of a wireless resource included in the transmission instruction provided by the base station, wherein
the transmission request transmitting unit puts urgency information indicating whether it is urgent to transfer the packet into the buffer status report.

* * * * *